(12) United States Patent
Sisley et al.

(10) Patent No.: US 8,576,953 B2
(45) Date of Patent: Nov. 5, 2013

(54) IDENTIFICATION OF TARGET SIGNALS IN RADIO FREQUENCY PULSED ENVIRONMENTS

(75) Inventors: Brandon M. Sisley, Liberty Township, OH (US); Brad A. Prichard, Bloomington, IN (US); Douglas N. Morgan, Bloomington, IN (US); Craig A. Rouland, Solsberry, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1054 days.

(21) Appl. No.: 12/211,483

(22) Filed: Sep. 16, 2008

(65) Prior Publication Data

US 2009/0067481 A1 Mar. 12, 2009

Related U.S. Application Data

(63) Continuation-in-part of application No. 11/900,141, filed on Aug. 31, 2007.

(51) Int. Cl.
  *H03D 3/22* (2006.01)
  *H04L 27/22* (2006.01)
(52) U.S. Cl.
  USPC ............ 375/329; 375/279; 375/316; 375/322
(58) Field of Classification Search
  USPC .................................................. 375/259, 329
  See application file for complete search history.

(56) References Cited

U.S. PATENT DOCUMENTS

| 4,597,107 | A | | 6/1986 | Ready et al. |
| 4,876,737 | A | * | 10/1989 | Woodworth et al. ........ 455/12.1 |
| 6,124,758 | A | * | 9/2000 | Korte et al. ............... 330/124 R |
| 6,426,675 | B1 | * | 7/2002 | Salzmann ..................... 330/129 |
| 7,940,866 | B2 | | 5/2011 | Yuan et al. |
| 8,031,059 | B2 | | 10/2011 | Rollins et al. |
| 2005/0265292 | A1 | * | 12/2005 | Atsuta ........................... 370/335 |
| 2005/0281214 | A1 | * | 12/2005 | Misra et al. ................... 370/321 |
| 2006/0063543 | A1 | * | 3/2006 | Matoba et al. ................ 455/509 |
| 2006/0238350 | A1 | * | 10/2006 | Tessier ....................... 340/572.7 |
| 2007/0192048 | A1 | * | 8/2007 | Hu et al. ......................... 702/69 |
| 2008/0304602 | A1 | * | 12/2008 | Kim et al. ..................... 375/343 |
| 2009/0037959 | A1 | * | 2/2009 | Suh et al. ........................ 725/62 |
| 2009/0046815 | A1 | * | 2/2009 | Oh et al. ........................ 375/340 |
| 2009/0060044 | A1 | * | 3/2009 | Suh et al. ................. 375/240.16 |
| 2010/0179761 | A1 | * | 7/2010 | Burtz et al. ....................... 702/6 |
| 2011/0103463 | A1 | * | 5/2011 | Kim et al. ................ 375/240.01 |

* cited by examiner

*Primary Examiner* — Erin File
(74) *Attorney, Agent, or Firm* — Christopher A. Monsey

(57) ABSTRACT

A system and method for processing signals are disclosed. The method may be performed, at least partially, by the system. In one embodiment, the method comprises sending a first plurality of data including transmission parameters to a transmission system for transmitting of a first plurality of signals, receiving a second plurality of signals including signals based on the power level of the first plurality of signals, detecting in the second plurality of signals the signals corresponding to the first plurality of signals, outputting a second plurality of data based on the power levels of the second plurality of signals corresponding to the first plurality of signals, and receiving the second plurality of data and associating the first plurality of data and the second plurality of data based on the time when the first plurality of signals was transmitted and the second plurality of signals was received

30 Claims, 46 Drawing Sheets

THEORETICAL QPSK MODULATION AND CVR RECEPTION SIGNALS

ACTUAL PSK RF SIGNAL

FIG-4 ACTUAL CVR VIDEO SIGNAL

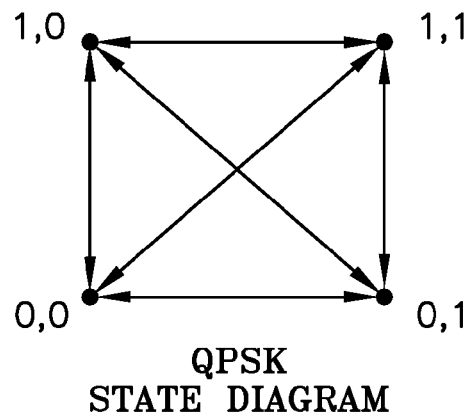
QPSK
STATE DIAGRAM
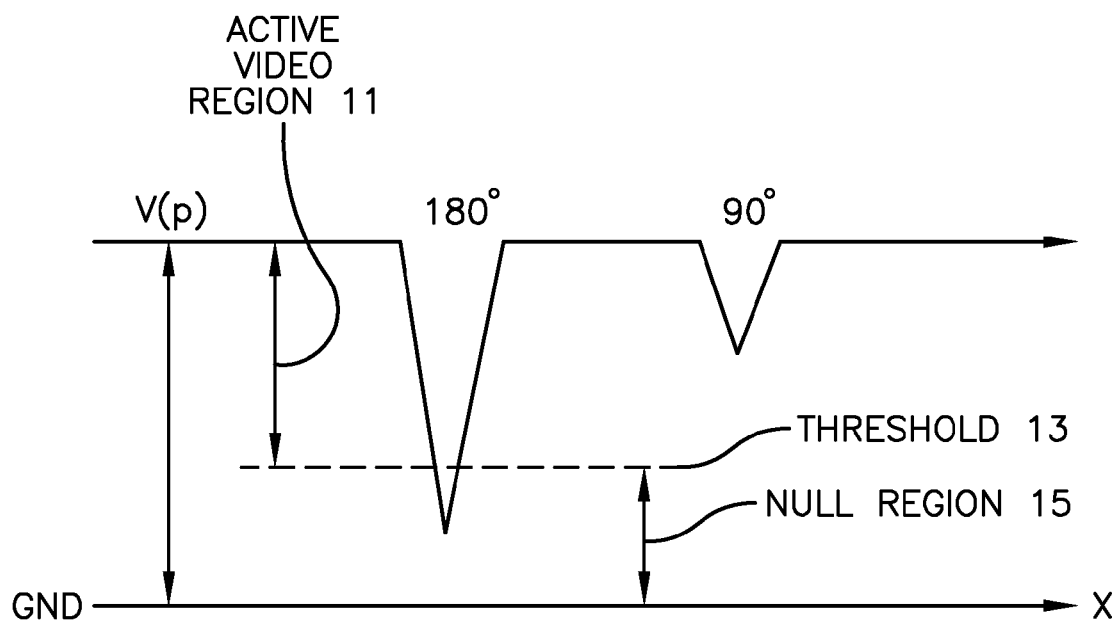
FIG-5

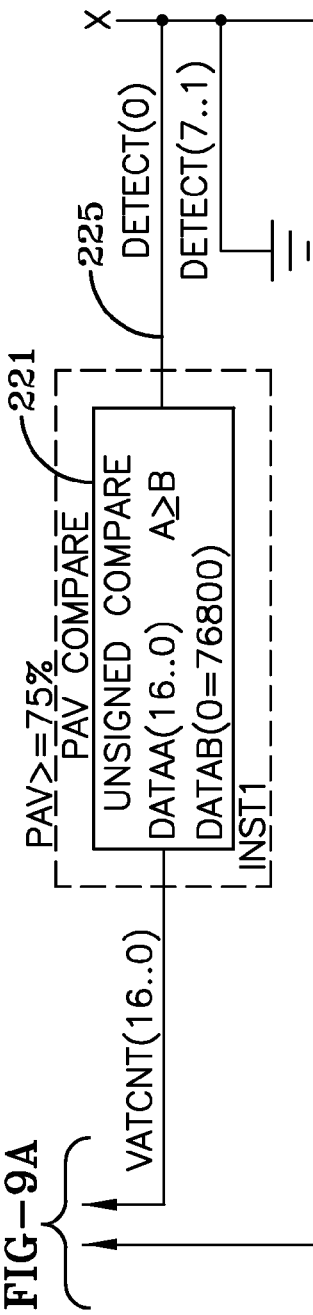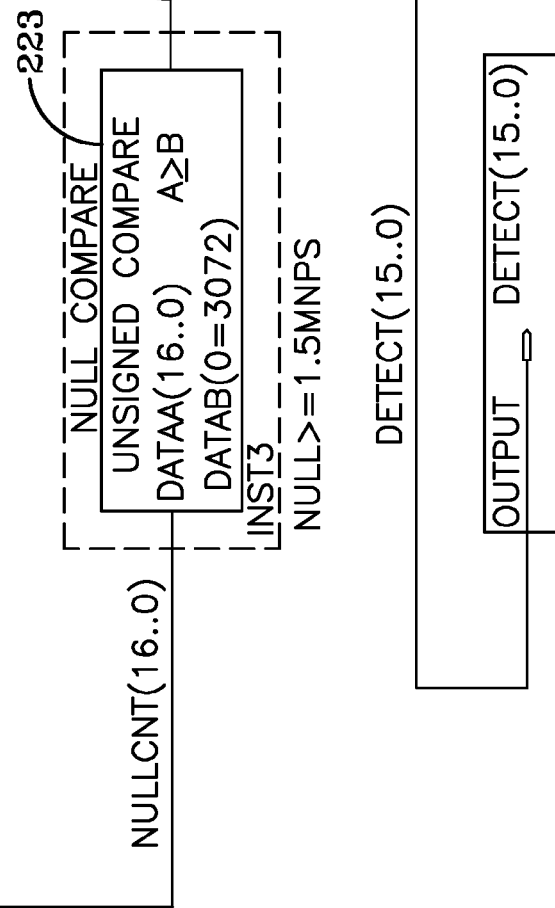
FIG-9A
FIG-9B

| Extension | Name | Data Content | File Type |
|---|---|---|---|
| .head | Test header | Test name, date, personnel, program version, SATCOM system antenna, channels, modulation, data rate, setting comments, notes | Text file |
| .set | Test settings | frequency, attenuation, sweep dimensions, sweep type, azimuth start, azimuth increment, azimuth stop, etc. | Text file |
| .eahu | EAST AHU test data | Time, pointing angle, AHU data | LabVIEW binary data |
| .wahu | WEST AHU test data | Time, pointing angle, AHU data | LabVIEW binary data |
| .eeb | EAST Environmental Baseline data | Time, pointing angle, AHU data | LabVIEW binary data |
| .web | WEST Environmental Baseline data | Time, pointing angle, AHU data | LabVIEW binary data |
| .flt | Filter Settings | List receiving antennas or beam ports to have data filtered out for Analysis and Report Program | Text file |
| .cut | Source Antenna Cutout profile | Display the transmit cutout profile of a single transmitter/target signal source, data can be loaded in Analysis and Report Program | Text file |

IDENTIFICATION OF TARGET SIGNALS IN RADIO FREQUENCY PULSED ENVIRONMENTS

CROSS-REFERENCE TO RELATED APPLICATIONS

The present application is a continuation-in-part application of, and claims priority to, U.S. patent application Ser. No. 11/900,141 filed Aug. 31, 2007, titled IDENTIFICATION OF TARGET SIGNALS IN RADIO FREQUENCY PULSED ENVIRONMENTS, the entire disclosure of which is expressly incorporated by reference herein.

STATEMENT REGARDING FEDERALLY SPONSORED RESEARCH OR DEVELOPMENT

The invention described herein was made in the performance of official duties by an employee of the Department of the Navy and may be manufactured, used, licensed by or for the United States Government for any governmental purpose without payment of any royalties thereon.

FIELD OF THE DISCLOSURE

The invention relates generally to the identification or the presence of a specific type of modulated signals such as, for example, phase modulation. In particular, the invention includes a system and method of using signal processing schemes to determine the presence of modulated signals and to correlate the intensity of the signals with the orientation of a signal source.

BACKGROUND

Many applications use crystal video receivers (CVR), diode detector circuits, or other circuits that simply create a signal, commonly called video, that represents the power level of the received signal. Such receiver circuitry is commonly used to process radio frequency (RF) pulse signals because of its simplicity and low cost. These receivers have difficulty yielding meaningful results when dealing with continuous wave (CW) modulated signals. Because of this, CW modulated signals are either avoided or removed from the CVR and similar receivers reception path. Increasing use of communication systems both mobile and stationary has led to an ever changing and complex RF spectrum. Digital modulation schemes that use phase shift key (PSK) are among the most popular. Other problems in complex RF environments include coupling and electromagnetic interference. A detection system that can isolate specific target signals based on the modulation scheme of source transmitters may be used to manage electromagnetic interference (EMI) in a complex RF environment.

SUMMARY

A signal detection system and method for characterizing signals in a multiple signals environment are disclosed herein. In one embodiment, the system comprises a first data processing portion and a first signal processing portion. The first data processing portion outputs a first plurality of data including a plurality of transmission parameters adapted to control transmission of a first plurality of signals from a transmitter. The first signal processing portion receives a second plurality of signals and outputs a second plurality of data. The second plurality of signals correspond to at least one of the first plurality of signals and a third plurality of signals. The first signal processing portion includes one or more predetermined values for detecting the second plurality of signals corresponding to the first plurality of signals and for outputting the second plurality of data based on the power levels of the second plurality of signals corresponding to the first plurality of signals. The first data processing portion receives the second plurality of data output from the first signal processing portion.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein:

FIG. 5 shows another representation of a signal with QPSK modulation;
FIGS. 9A and 9B show a block diagram of an integrated circuit according to one embodiment of the invention;
FIGS. 16-21 show functional block diagrams of a data processing unit including programs and files comprising portions of the detection system of FIG. 10;
FIGS. 25-26 show exemplary data structures according to the detection method of FIGS. 22-24;
FIGS. 34-45 show screen displays of an analysis program for analyzing data acquired with the detection system of FIG. 10.

DETAILED DESCRIPTION

CVRs are used as RF signal processors that convert, by crystal detection, an RF modulated signal to an audio or video signal corresponding to the envelope of the signal's RF energy and amplify it to detection values. CVRs are used in a variety of RF receivers including radar detection systems. PSK is a digital communication modulation type in which the phase of the transmitted signal is varied to convey information. There are several different methods used to accomplish PSK. Each method sends a "symbol" based on the desired digital data. Each symbol differs only in the phase of the RF carrier. There are several PSK schemes that differ by the number of discrete "symbols" and how they implement the transition between the symbols. Equation 1 describes a PSK modulated signal that represents an individual symbol.

$$\sin(\omega_c t + \Phi_d) \quad (1)$$

Referring to Equation 1, $\omega_c$ is the carrier frequency, t is time and $\Phi_d$ is the symbol phase shift determined by digital data. It is common practice to rewrite Equation 1 using orthogonal symbols in-phase (I) and quadrature-phase (Q). Modulators create a PSK signal by varying the amplitude off the I and Q signals. Equation 1 can be written as shown by Equation 2 and Equation 3 to produce Equation 4 as shown below.

$$I = \sin(\omega_c t) \quad (2)$$

$$Q = \cos(\omega_c t) \quad (3)$$

$$\sin(\omega_c t + \Phi d) = I^* \cos(\Phi_d) + Q^* \sin(\Phi_d) \quad (4)$$

Some common PSK types are binary-PSK (BPSK), quadrature-PSK (QPSK) and 8PSK also called octal-PSK. BPSK has two different symbols corresponding to one bit of data that are 180° apart. QPSK has four different symbols corresponding to two bits of data placed 90° apart. 8 PSK has four different symbols corresponding to three bits of data placed 45° apart.

Figure 1:
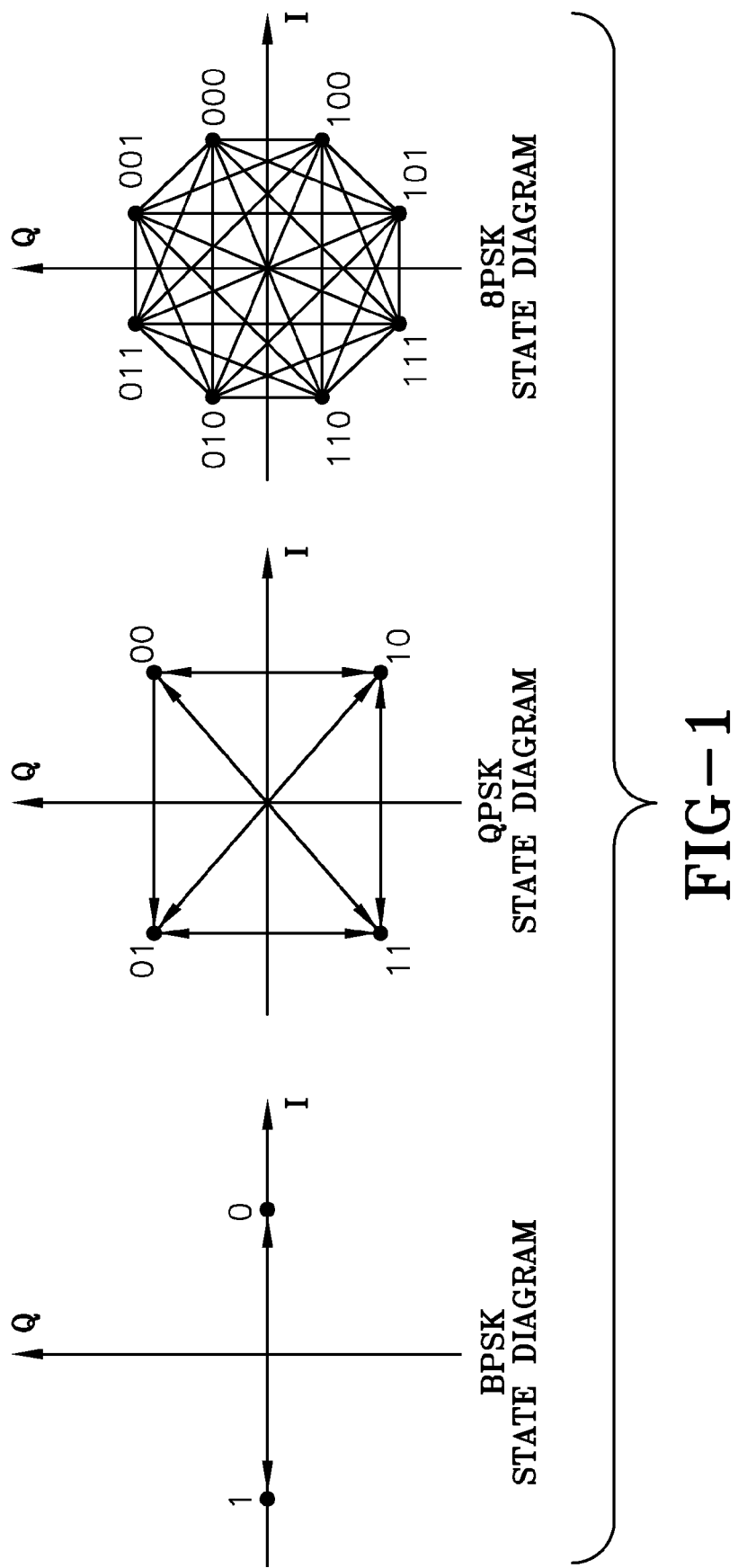
FIG. 1 shows a phase shift key (PSK) state diagram.

The I vs. Q state maps of these modulation types are displayed in FIG. 1. The resultant signal magnitude and phase is represented with a vector emanating from the origin of a desired location on the state diagram. As shown in FIG. 1, each symbol PSK modulation method theoretically has the same magnitude or power. However, when transitioning from one symbol to another, the power level changes. When making a 180° transition, the power drops to zero as the state transition path goes through the origin. Since CVRs are essentially transforming power into a video signal, the video signal drops at symbol transitions.

Figure 2:
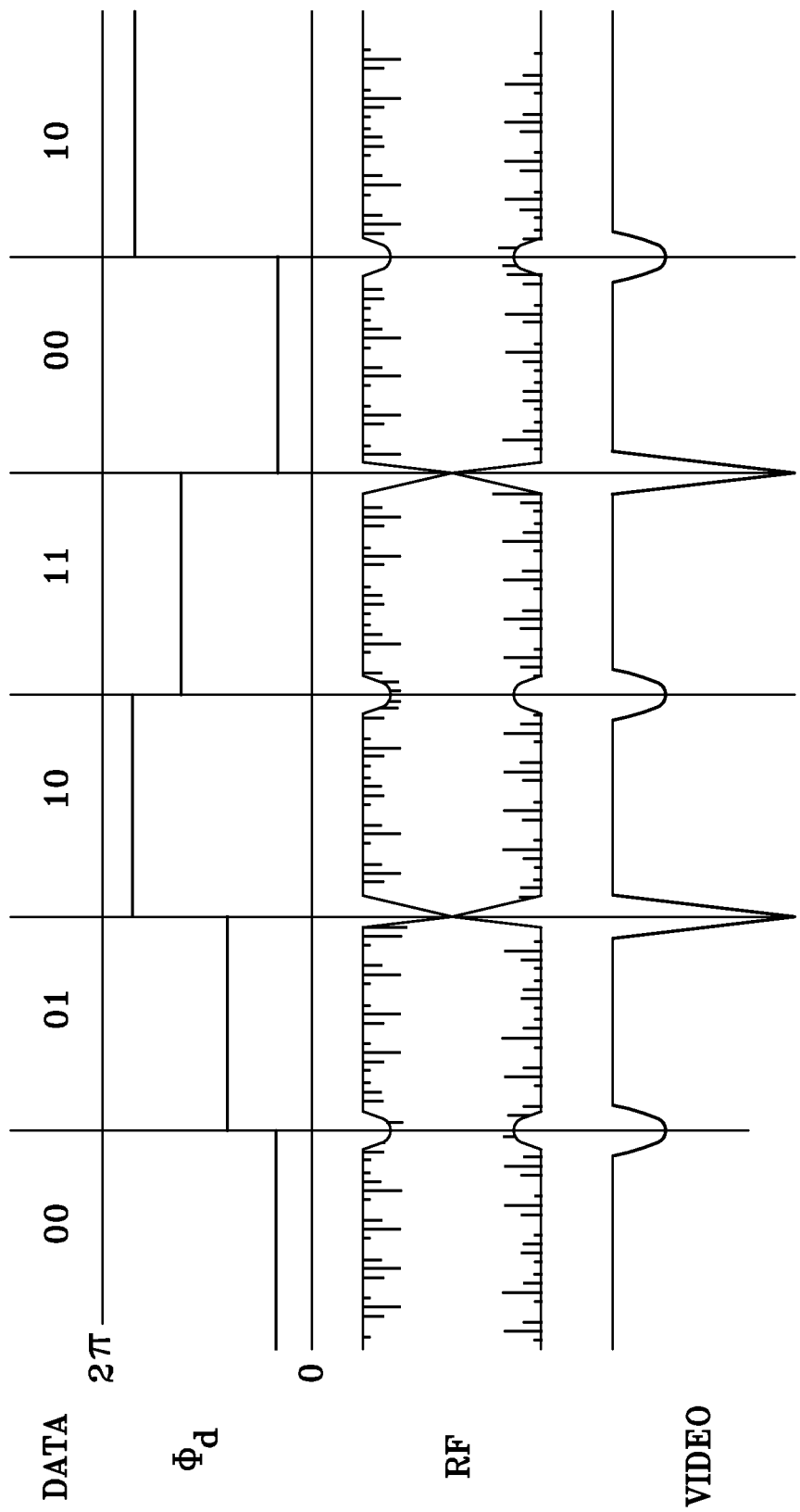
FIG. 2 shows a quadrature phase shift key (QPSK) modulation and CVR reception signals.
Figure 3:
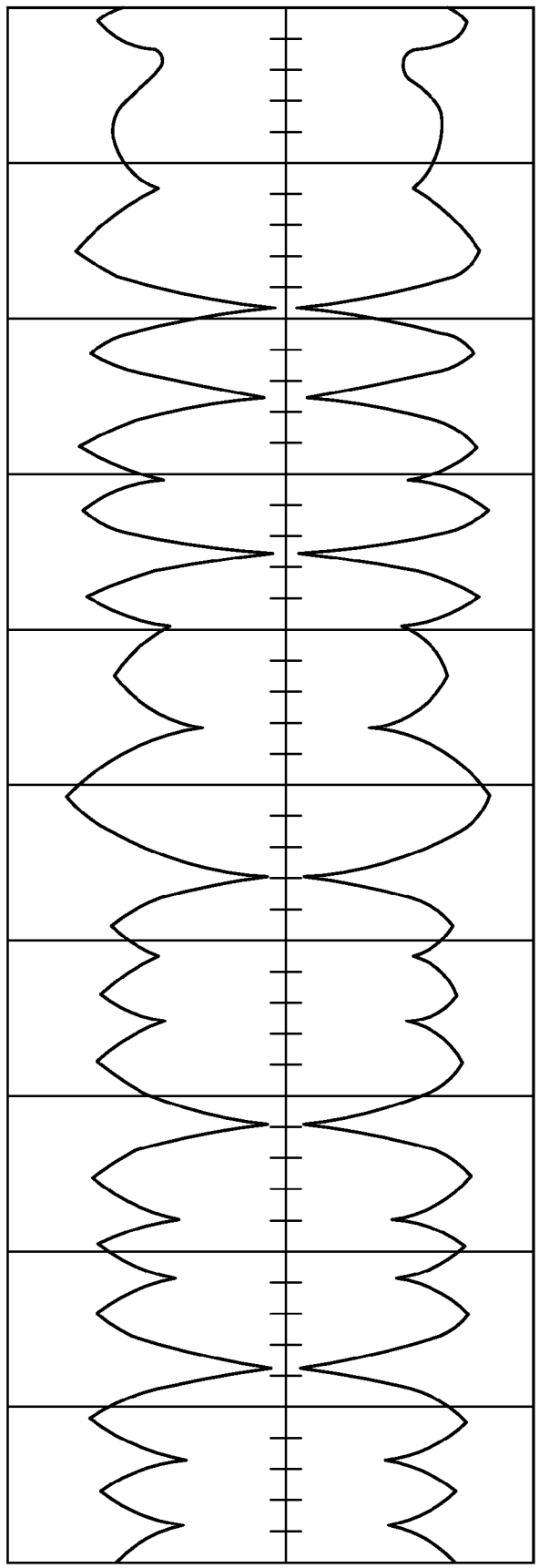
FIG. 3 shows a sample PSK RF signal.
Figure 4:
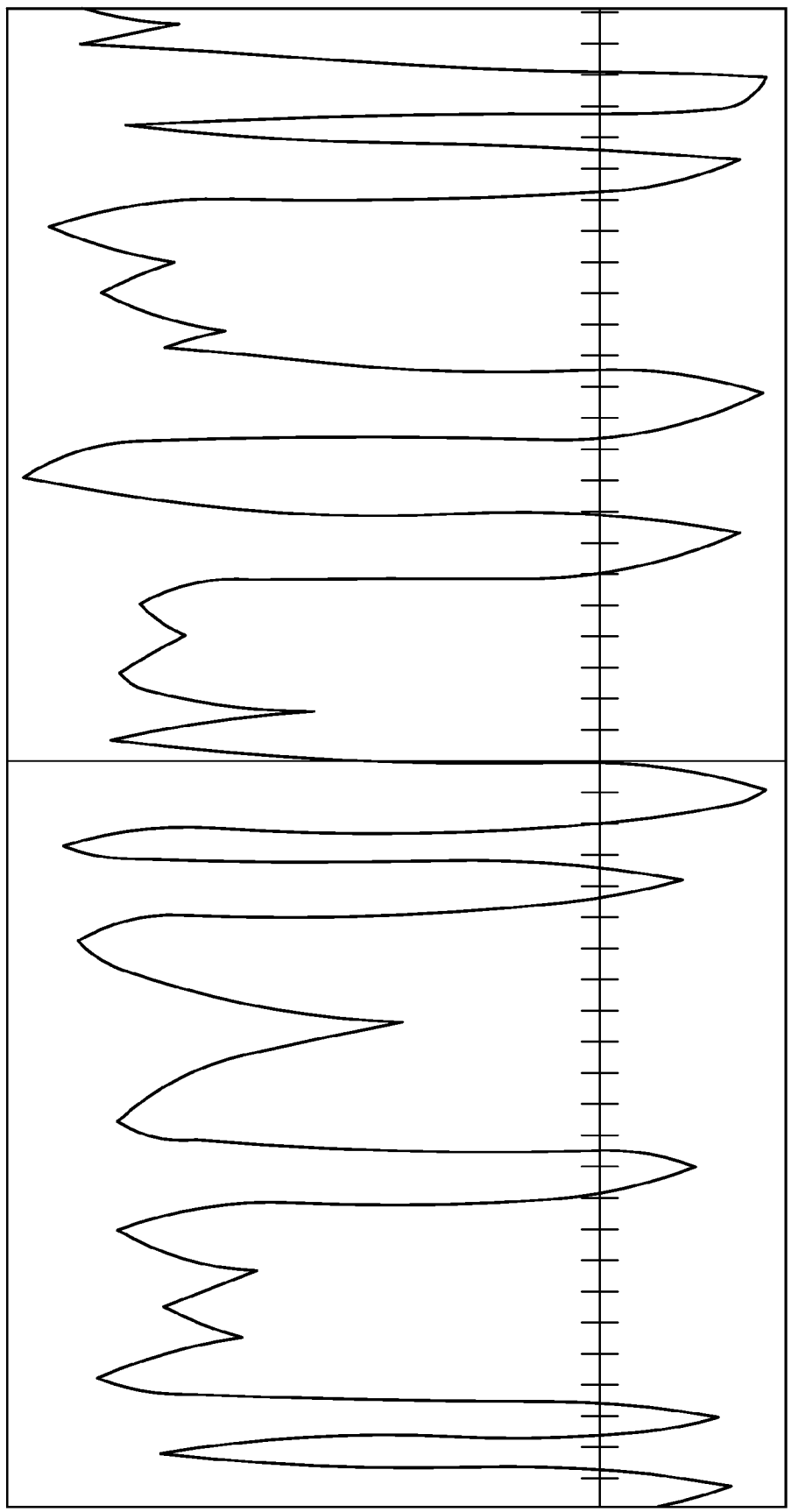
FIG. 4 shows an exemplary CVR video signal.

FIG. 2 shows a QPSK modulation and CVR reception signals demonstrating how a CVR turns QPSK signals into a video signal. Theoretically, the carrier phase shift at the symbol transitions would be instantaneous. However, when implemented with real world circuitry, time is required to perform the phase shift which also causes fluctuations in the overall power level of the signal. FIG. 3 shows an oscilloscope sample of an actual PSK signal (the actual RF carrier wave is not seen due to bandwidth limitations of the oscilloscope) and FIG. 4 shows an oscilloscope sample of an actual PSK signal after conversion to a CVR video signal output.

FIG. 5 shows another representation of a signal with QPSK modulation. Active video in this embodiment is defined as an active video region 11 and a null region 15 is an inactive video area. Active video or null signals can be Boolean signals that represent the portions of video that adhere to a predefined condition or conditions. In particular, active video signal in this example is identified when a signal voltage value exceeds a reference threshold value 13, in this case a voltage threshold determined based at least in part on noise levels found in a sampled signal. Null portions can be identified as portion of video below the reference threshold value 13.

Research was conducted to examine the impacts of multiple PSK signals on CVR video. The research consisted of capturing CVR video with a variety of PSK signal being injected into the CVR. The following aspects of PSK signals were studied: RF carrier frequency; RF carrier amplitude; modulation type (BPSK, QPSK, 8PSK, 16PSK and OQPSK) and symbol rate. Research showed at slow to medium data rates, a video signal was characterized by short nulls at symbol transitions that had a large phase shift and minor dips in voltage level for small phase transitions. This makes the presence of the PSK modulated signal detectable by looking for percent of active video ranges to be between 70% and 95%. Non-communication signals normally have a much lower duty cycle. At higher data rates, the traditional video response of the CVR begins to break down due to response limitations of the CVR. The null periods become much longer and the percent of active video starts to decrease. However, since symbol transitions happen much faster, the number of nulls greatly increases. At the higher data rates, the presence of PSK modulated signal is detectable by the large number nulls. Based on this research, a signal detection algorithm was created to detect a PSK signal which has been processed by a CVR.

One exemplary detection algorithm was implemented for a PSK signal. First, a voltage threshold was set just above a CVR video noise floor. Video above the threshold was considered active video while voltage output from the CVR below the threshold is considered inactive video. Periods of inactive video are referred to in this embodiment as "nulls". Next, an examination of CVR video output signal is conducted for a predetermined amount of time, for this example approximately two milliseconds (ms). A percentage of active video and nulls per unit time, e.g., seconds, is analyzed. If the percent of active video is above a threshold (e.g., 75 percent) or if the nulls per second are above a set number (e.g., 1.5 million nulls per second (MNPS)), then a signal is declared to be a PSK modulated signal.

Figure 6:
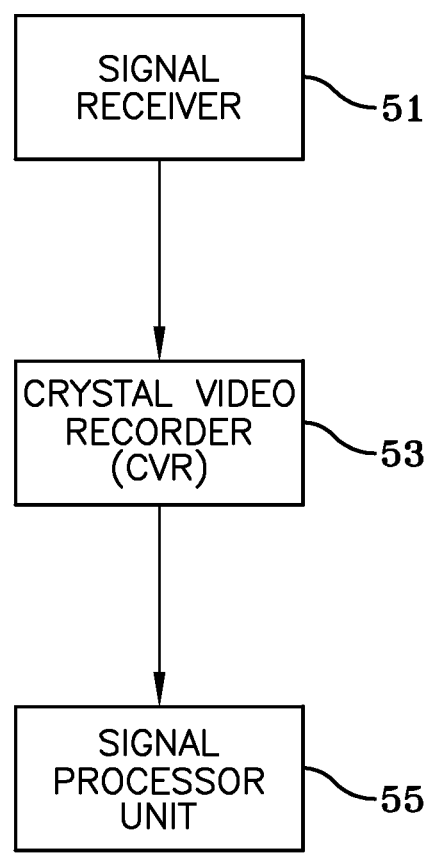
FIG. 6 shows a block diagram with one exemplary embodiment of the invention.

FIG. 6 shows an exemplary embodiment of the invention where a signal receiver 51, e.g., a radio frequency antenna, is coupled to a CVR 53. The output of the CVR 53 is input into a signal processor unit 55 with an exemplary embodiment of the invention.

Figure 7:
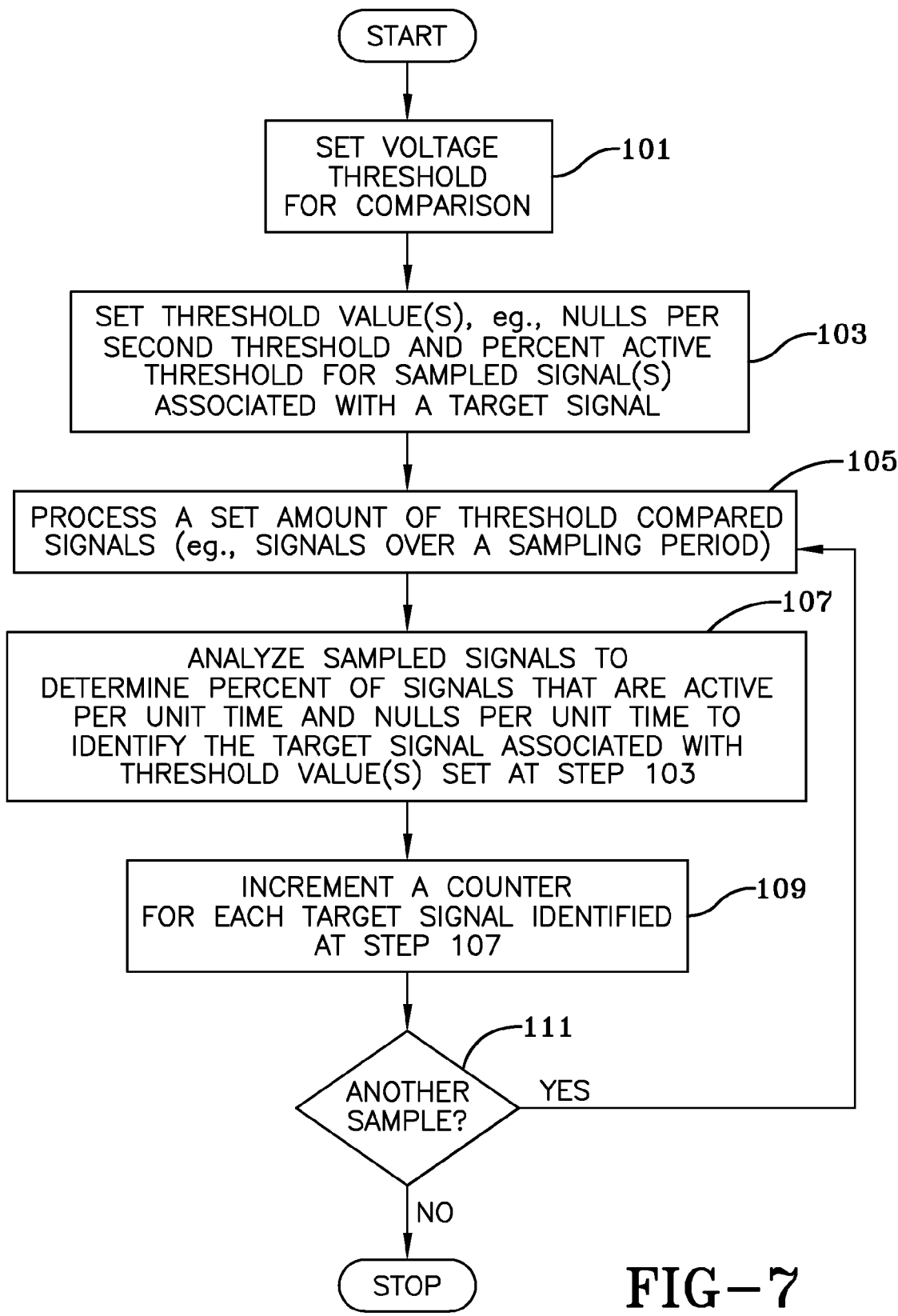
FIG. 7 shows an exemplary method of processing signals in accordance with one embodiment of the invention.

FIG. 7 shows an exemplary processing sequence for identifying a target signal in a radio frequency pulsed environment using a CVR system. At processing step 101, a voltage threshold is set which is determined based upon ambient noise signal levels produced by the CVR where signals above the threshold are considered active CVR video signals. Hysteresis may be applied to the threshold level to reduce or eliminate the effects of noisy signals at the threshold level. Hysteresis causes the threshold to be slightly higher when video is below the threshold. At processing step 103, phase related signal characteristics of nulls per second and percent active CVR video signals (e.g., 1.5 MNPS and 80% active CVR video signals) are set. At processing step 105, a sample of the CVR video signal is taken over a sampling period such as 2 ms. At processing step 107, a statistical analysis of the CVR video signal is performed including determination of percent active and nulls per second using the phase related signal characteristics from processing step 103. In other words, analysis at this step can include analyzing threshold compared signals to determine signal characteristics such as percent of signal that is active per unit time and nulls per unit time thus calculating characteristic values for each sampled signal. At processing step 109, measured signal characteristics are compared to thresholds set in step 103 to determine and report the presence of PSK signal. In other words, for example, processing at this step can include comparison of signal characteristics or values produced from statistical analysis from Step 107 to threshold values set at Step 103 to determine and report the identification or presence of a target signal, such as e.g., a PSK signal. Incidence and other characteristics such as amplitude of target signals can be recorded in a counter at this step. At processing step 111, a determination is made of whether another signal is to be processed or reprocessed (e.g., analyze another signal for PSK detection); if yes, then processing resumes at processing step 105; if no, then processing halts. Results from this process include a determination of whether or not a target signal, e.g. a PSK signal, was present in the sampled signal, e.g., CVR video signal. Additional data can be recorded at step 109 such as nulls per unit time and percent active video (e.g., assuming a voltage signal threshold X for a video signal input, time period actually above the voltage signal threshold X divided by a specified time period). For example, if a signal threshold of 6 mv is exceeded for 30 ms over a 60 ms measurement time period, analysis would calculate a 50% percent active video statistic.

Phase related signal characteristics set at step 103 can also be on duration of pulses such as max high duration, average high duration, modulation type (e.g., BPSK, QPSK, 8PSK, 16PSK, OQPSK) or antenna power levels at a transmitter which is producing a target signal versus signals received at a receiver antenna.

Figure 8:
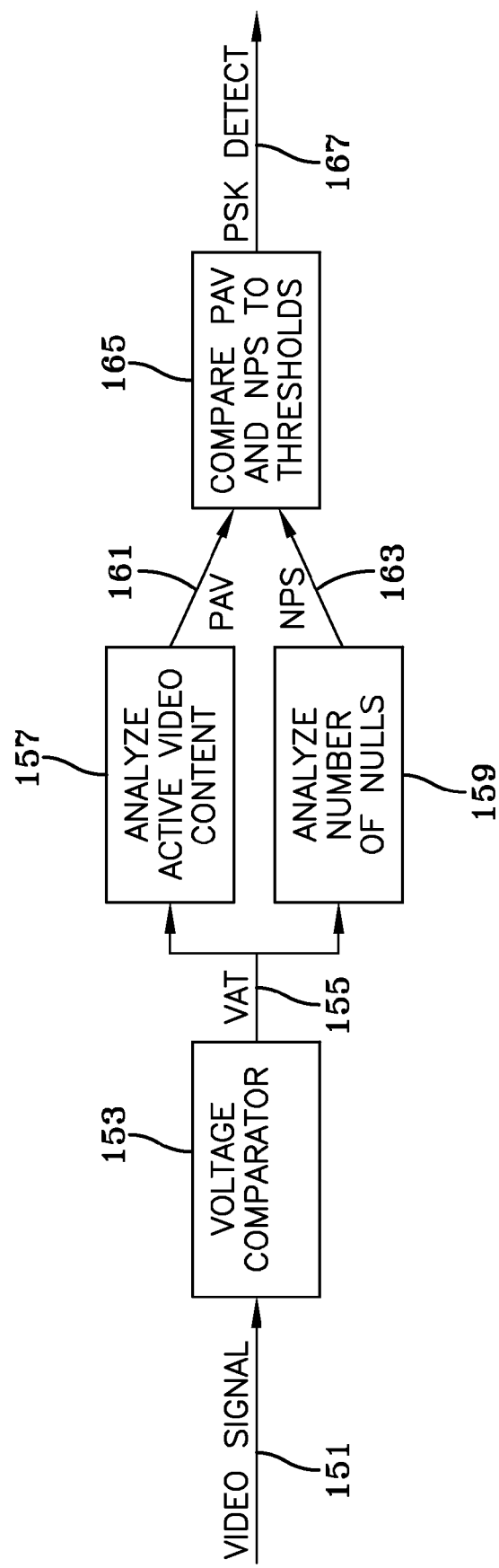
FIG. 8 shows a functional block diagram of one embodiment of the invention.

FIG. 8 shows a functional block diagram of one embodiment of a PSK detection processing sequence. Video Signal 151 is the output of a CVR or similar receiver which creates video based on received RF power level. Signal processor system 153 compares the video voltage level to a threshold to create a Boolean VAT signal 155. Signal processor 153 could consist of either or both analog or digital circuitry. Hysteresis could be used in threshold to eliminate effects of noise close to threshold level. The threshold level is placed above ambient noise levels to demark levels of meaningful reception and no signal. VAT signal 155 represents Voltage Above Threshold (VAT) by identifying the active video regions. Both signal processor systems 157 and 159 analyze the VAT signal 155 to calculate signal characteristics. System processor 157 analyzes the signal for a set amount of time for the active video content and creates a measure. Percent Above Video (PAV) 161 represents such a active video measure. System Processor 159 analyzes the signal for the same set amount of time as used by system processor 157 to create a measure of the number of nulls. Nulls Per Second (NPS) 163 represents a null measurement. The signal characteristic measurements 161 and 163 are analyzed by system processor 165 to compare measure values to known references to calculate whether or not the original signal contained PSK modulation. The references or threshold levels are based on known characteristics of PSK signals such as PAV>=75% or NPS>=1.5 million. These references may change based on individual CVR receiver response characteristics. PSK Detect signal 167 is a Boolean signal that represents whether or not a PSK signal was detected. System processors 157, 159, and 165 could be implemented using either or a combination of analog circuitry, digital circuitry, or software.

Figure 9A:
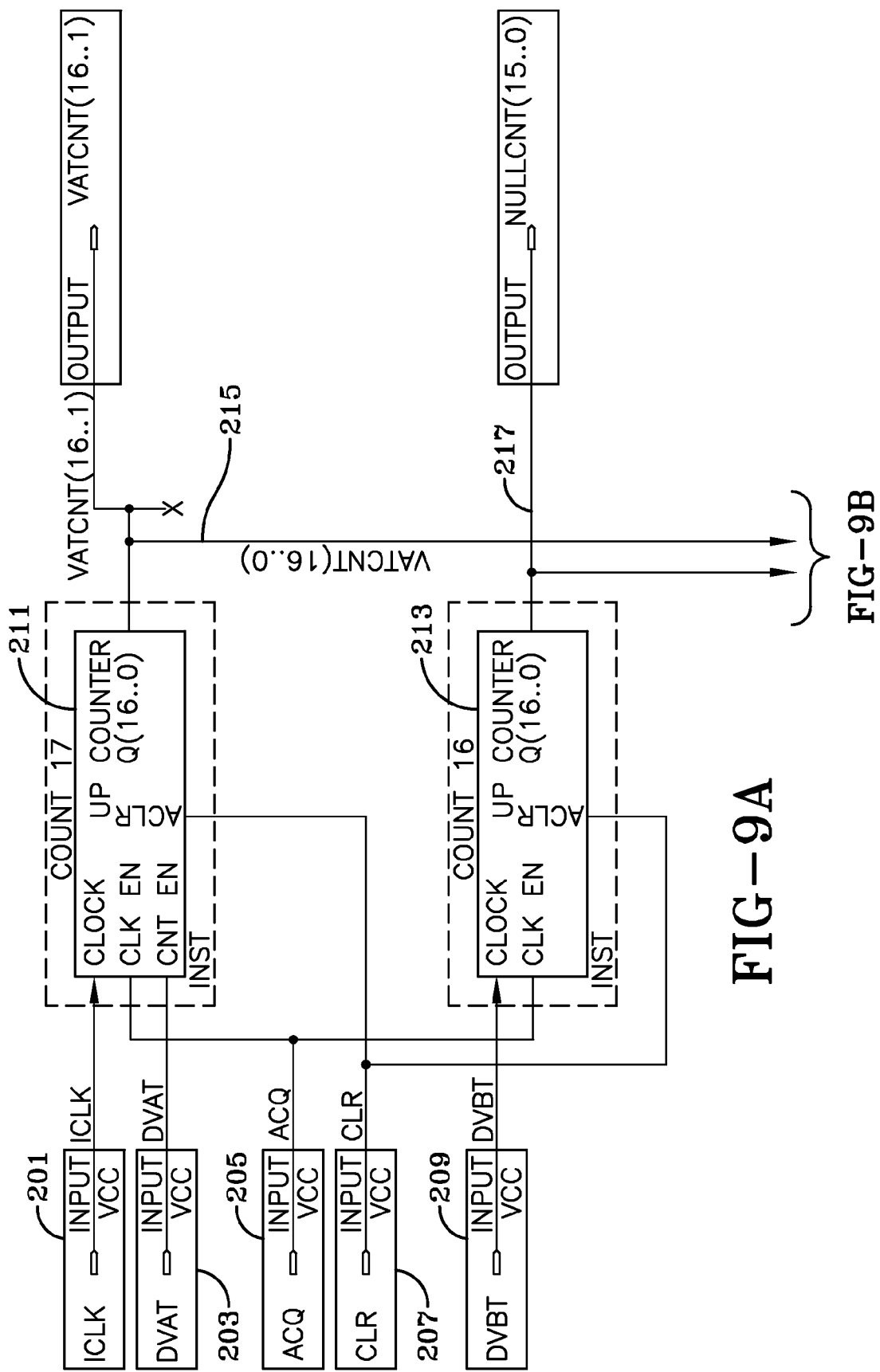

FIGS. 9A-9B show block diagrams of an integrated circuit with one embodiment of portions of the invention. Signal inputs ICLK 201, DVAT 203, ACQ 205 and CLR 207 are coupled with a signal processor system 211. Inputs ACQ 205, CLR 207 and DVBT 209 are coupled with signal processor system 213. Signal inputs referenced herein in this embodiment are defined as follows:

ICLK=Inverse Clock (clock signal)
DVAT=Digitized Video Above Threshold (e.g., 1 bit analog to digital (A-D) of CVR video)
ACQ=Acquire (signal which is used to define the sample period time)
CLR=Clear (resets the video statistic count to 0 for start of next ACQ period)
DVBT=Digital Video Below Threshold (The inverse of DVAT)

Inputs DVAT 203 and DVBT 209 are from a signal processor (not shown) which digitizes outputs from a CVR; the signal processor (not shown) receives RF signals and output signals based upon power levels of received power signals comprising active signals and null signals where the active signals are relatively higher than said null signals by a predetermined value; in this case the predetermined value is a noise level of signals received by the signal processor (not shown).

Signal processor 211 is a signal processing system that outputs a data, in this case VACNT 215 (Video Above Count), which is a count of the number of samples above a specified threshold during a predetermined sample period detected in signal input DVAT 203. Signal processor 213 is a signal processing system adapted to output data, in this case signal NULLCNT 217 (Null Count), determined based upon nulls per unit time observed in signal input DVBT 209.

Signal VATCNT 215 is coupled to an input of PAV Compare Signal Processor 221. Signal processor 221 compares signal VATCNT 215 with a predetermined value, in this case PAV>=75%, and outputs signal DETECT(0) 225 if VATCNT 215 exceeds the predetermined value (e.g., PAV>=75%). In this case, the number actually compared is the count number that would equal 75%: total number of samples*0.75.

Signal NULLCNT 217 is coupled to an input of NULL compare signal processor 223. Signal processor 223 compares NULLCNT 217 with a different predetermined value, in this case NULL>=1.5 MNPS, and output, signal DETECT(8) 227 if NULLCNT 217 exceeds the predetermined value (e.g., NULL>=1.5 MNPS). In this case, NULLCNT 217 is actually compared to a number that represents the number of nulls required create 1.5 MNPS: 1.5e6*sample time. Signals DETECT(0) and DETECT(8) may be pooled to determine whether a PSK signal has been detected.

A software, hardware or machine implemented detection algorithm can be used to detect the presence of other phase modulated signals in CVR video. Detection algorithms can be software, hardware or a mixed software/hardware implementation. A benefit of the invention is to detect with very simple circuitry the presence of a particular type of modulation which is useful in test systems and signal processing, particularly in cases where filtering of signals is not possible. It should be noted that the invention will work for other modulation types, such as many other Quadrature Amplitude Modulation (QAM) schemes, thus the invention is not limited to use in PSK schemes. It should also be noted that the invention can be used with wired system such as phone lines, cable lines, LAN, Internet, etc.

The detection method and system shown in FIGS. 6-9 may be used to characterize a signals environment. In the embodiments of a detection system and method described herein, the unique characteristics of a signal from a source antenna may be used to characterize electromagnetic interference in a signals environment. An EMI characterization system, as described in detail further below, may be used to show graphically EMI intensities in relation to different orientations of the source antenna. The data collected by the detection system may be analyzed to determine the level of antenna coupling between two systems. Tests can be used to perform general characterizations or to evaluate different source antenna or signal environment modifications. Such modifications may include positioning of antennas, design of signal barriers, selection of RF levels, and any other changes and modifications that affect RF levels received by the target antennas.

The detection system is described herein with reference to a source antenna and two target, or victim, antennas. The source antenna may be controlled by the detection system, thereby enabling mapping of EMI intensity at each of a multitude of orientations, or positions, of the source antenna. In another embodiment, the detection system receives orientation information from the source antenna without controlling the source antenna. The information received may be presented to a user, together with the intensity data, in a graph or a data table, in a computer display, and/or printed, to enable the user to recognize areas or regions around the target antenna of high, low and medium intensity interference at different source antenna orientations. The information received is correlated in time with the data obtained from the target antenna.

Figure 10:
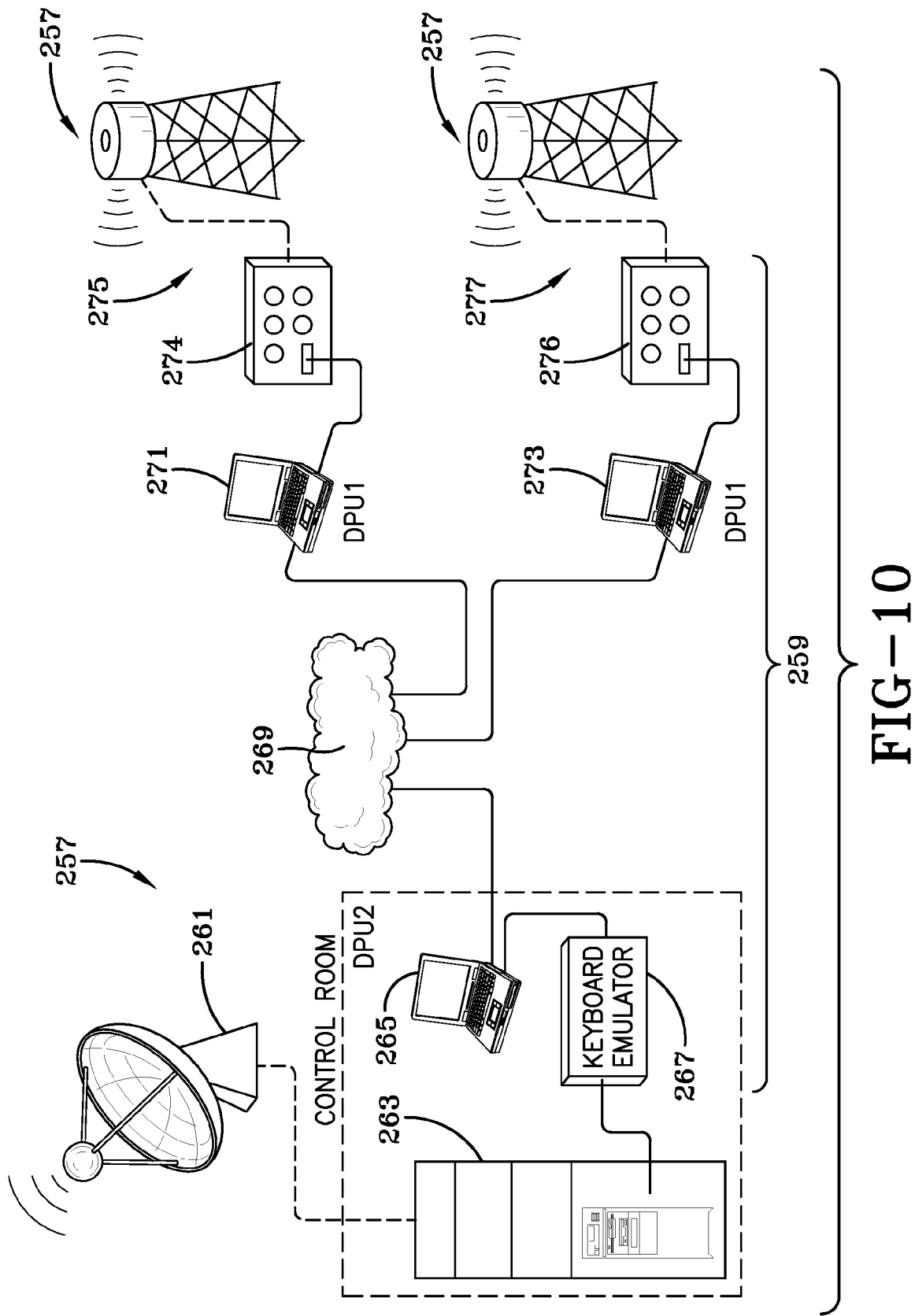
FIG. 10 shows a signals environment and an exemplary detection system.

FIG. 10 shows a communication system and an exemplary detection system according to one embodiment of the invention. Communication system 257 includes source antenna 261 coupled to control unit 263 which is adapted to control the orientation, power, and other characteristics of source antenna 261. Communication system 257 further includes target antenna 275 and target antenna 277. Optionally, a global positioning system (GPS) may be coupled to identify antenna locations. A GPS may be desirable in situations where source antenna 261 and/or target antenna 275, 277 are mounted in movable or flexible structures such as, for example, atop high-rise buildings. Location information provided by the GPS may be used with EMI data to compensate for the motion of antenna 261, 275, 277. Data associated with transmissions, antenna movement, and the timing of such transmissions may be stored and combined with data received from AHU 274, 276.

Figure 12:
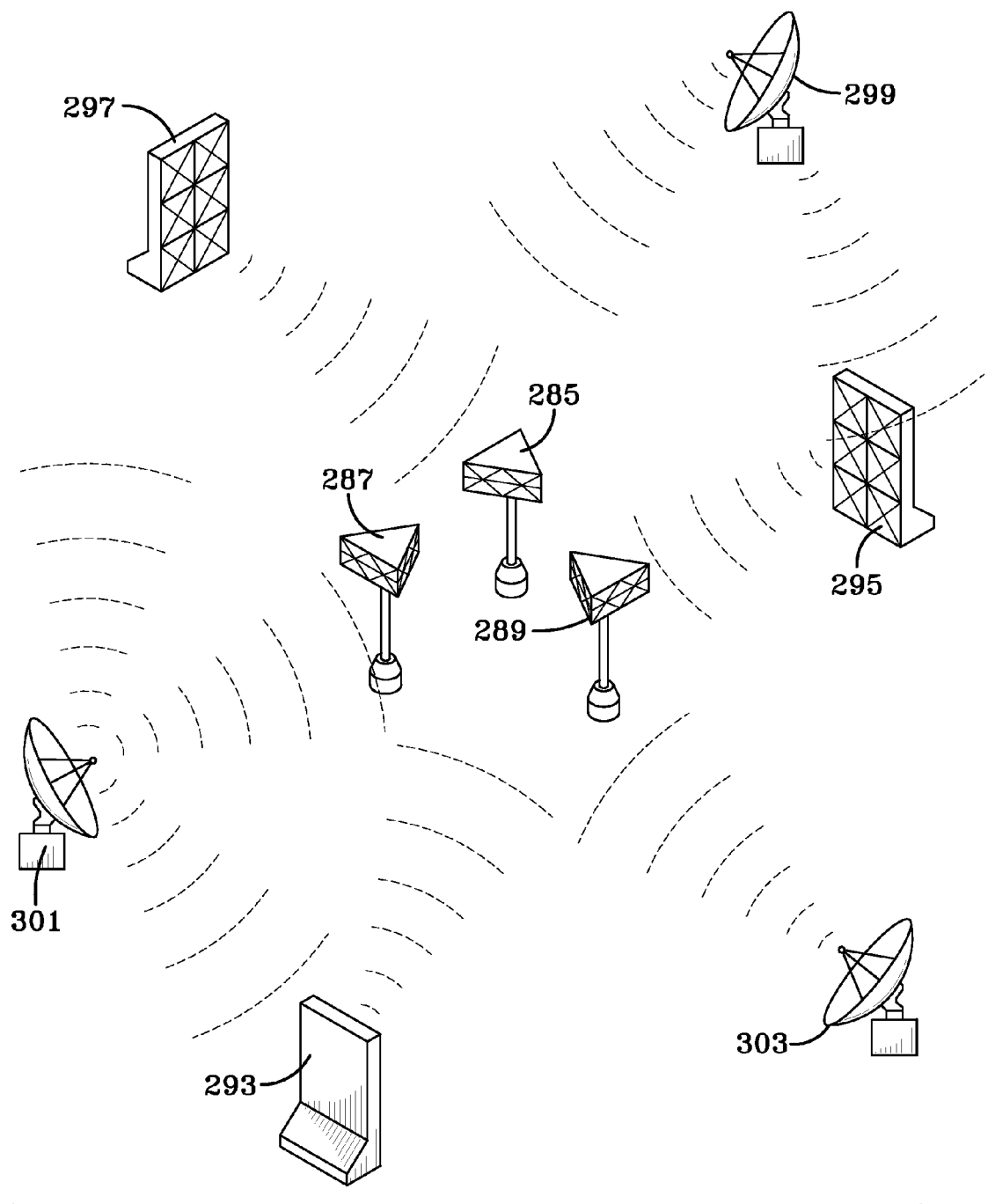
FIG. 12 shows a conceptual diagram of another signals environment.

FIG. 12 shows a plurality of antennas in a communication environment. Sources 293, 295, 297, 299, 301, and 303 represent a plurality of signals in the environment. Antenna's 285, 287 and 289 represent target antennas. Sources 293, 295, 297, 299, 301 and 303 generate a plurality of signals of varying characteristics. These signals, and their reflections, may be detected by, and may cause interference with, antennas 285, 287 and 289.

Referring again to FIG. 10, detection system 259 comprises detection control unit (DPU2) 265, keyboard emulator 267, communications system 269, and an antenna collection unit for each target antenna. An antenna collection unit may include an antenna control unit (DPU1) and an antenna hardware unit (AHU). FIG. 10 shows two antenna collection units which include DPU1 271 coupled to AHU 274 and DPU1 273 coupled to AHU 276. Keyboard emulator 267 couples to control unit 263 by any means known in the art such as a USB connector, PS/2 connector, and others. DPU2 265 provides instructions to keyword emulator 267 to control the transmission parameters of source antenna 261, e.g. transmission orientation parameters such as elevation and azimuth angle. In an alternative embodiment, DPU2 265 couples directly to control unit 263 by any known means such as, for example, a wireless connection, a USB connection, an RS-232 connection, and others, without emulating a keyboard.

DPU2 265 communicates with DPU1 271, 273 via communications system 269 to receive data from signals acquired by AHU 274, 276, respectively. AHU 274, 276 interfaces with target antenna 275, 277, respectively, and acquire signals received by it. Target antenna 275, 277 comprises one or more receivers which may receive similar or different signals. Signals may include target signals, non-target signals and background noise signals. AHU 274, 276 comprises one or more detector cards for receiving signals from each of the one or more receivers. A target antenna may include a single receiver in which case a corresponding AHU may include a single detector card. Communications system 269 may comprise components to establish hard-wired, wireless, internet, cellular and any other known connection means. In one embodiment described more fully below, DPU2 265 and DPU1 271, 273 are coupled in a client-server network. DPU2 265 and DPU1 271, 273 comprise an operating program having a graphical user interface (GUI) for setting-up DPU2 265 as a client and DPU1 271, 273 as server. Upon activation of the appropriate GUI controls, DPU2 265 commands, through DPU1 271, 273, AHU 274, 276 to acquire data. The client-server network may be a local area network (LAN). DPU1 271, 273 may comprise DPU1 and DPU2 may be laptop computers including I/O ports such as, for example, National Instruments' PCMCIA cards and/or RS-45 ports, for connecting with the LAN.

AHU 274, 276 include signal processors for characterizing video signals from target antenna 275, 277. Signal processors may be implemented in hardware, software and a combination of hardware and software. AHU 274, 276 may include target signal detection cards and hardware/software for further processing and transmitting signals output from the detection cards. While the invention is described with reference to PSK signal receivers, the invention is not so limited. The teachings provided herein may be applied to characterize EMI intensity of signals with other types of signal modulation. Detection system 259 is configured to characterize PSK signals. AHU 274, 276 may comprise signal processors which receive video signals and signal processors to produce PAV, NPS, average level, maximum level, PSK detect and other data. The type of data produced by the signal processor depends on the characteristics of the modulation type of the target signal.

Figure 11:
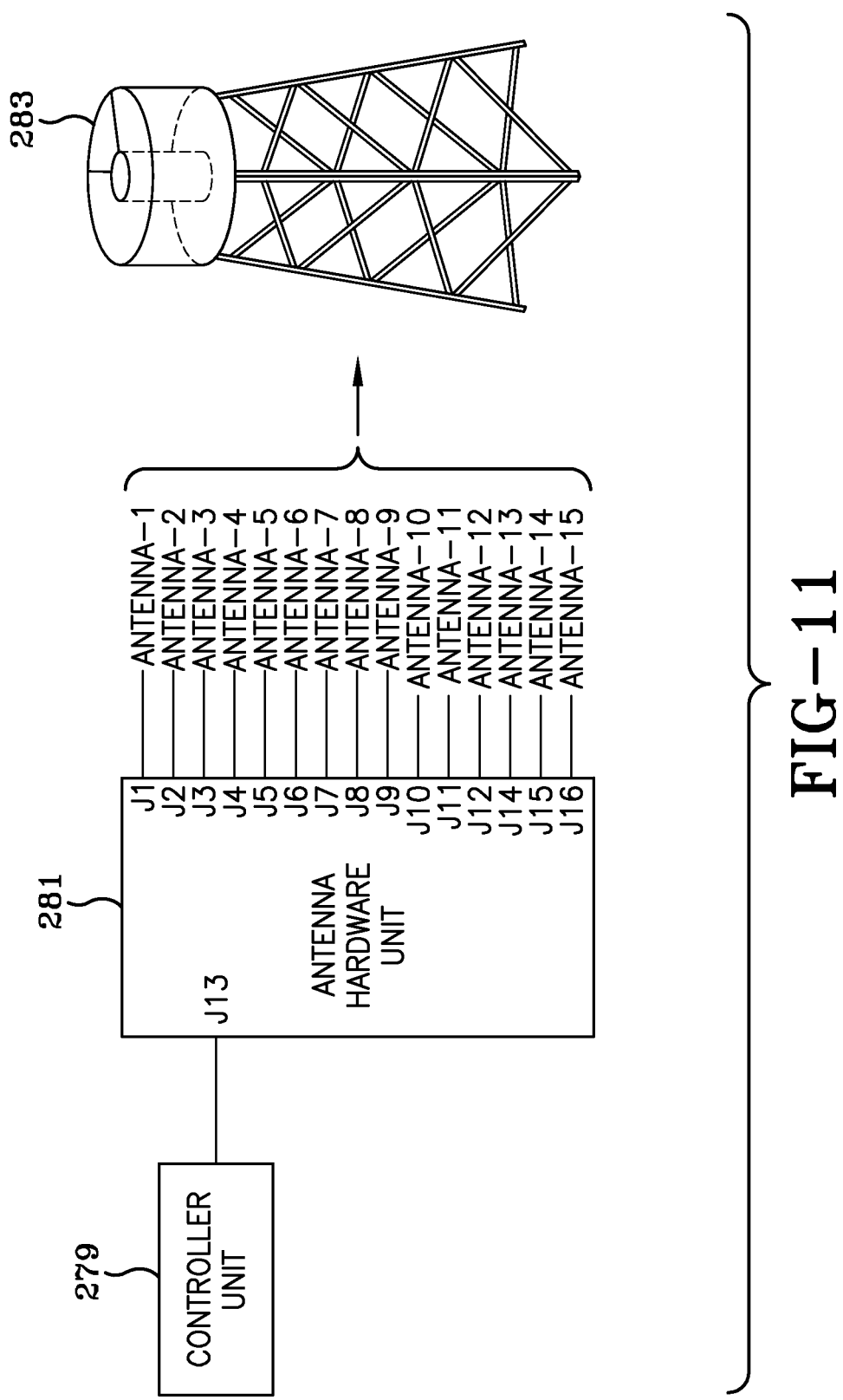
FIG. 11 shows a portion of an exemplary detection system and a target antenna.

FIG. 11 shows an embodiment of an antenna collection unit. AHU controller unit 279 receives signals from AHU 281. AHU 281 is coupled to receive, and receives, signals from target antenna 283. Each transmitter in target antenna 283 is connected to a terminal on AHU 281. Terminals are labeled J1-J16. Each terminal is connected to a signal processor for detecting a target signal.

Figure 13:
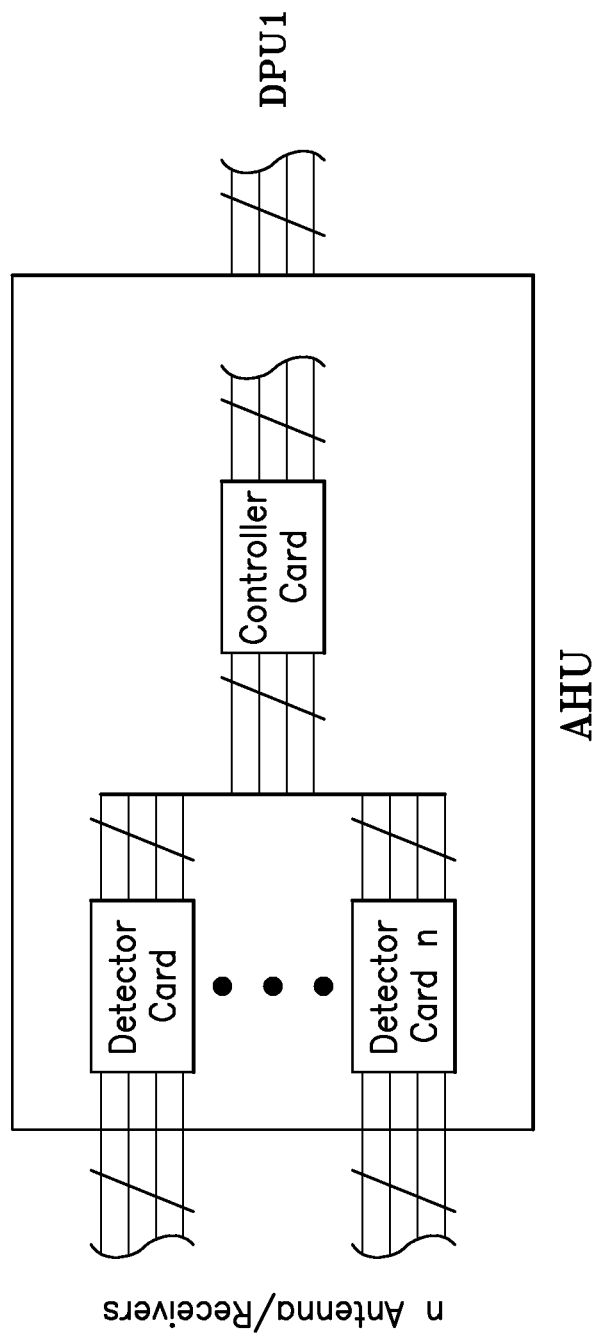
FIGS. 13-15 show block diagrams of portions of another embodiment of a detection system.
Figure 14:
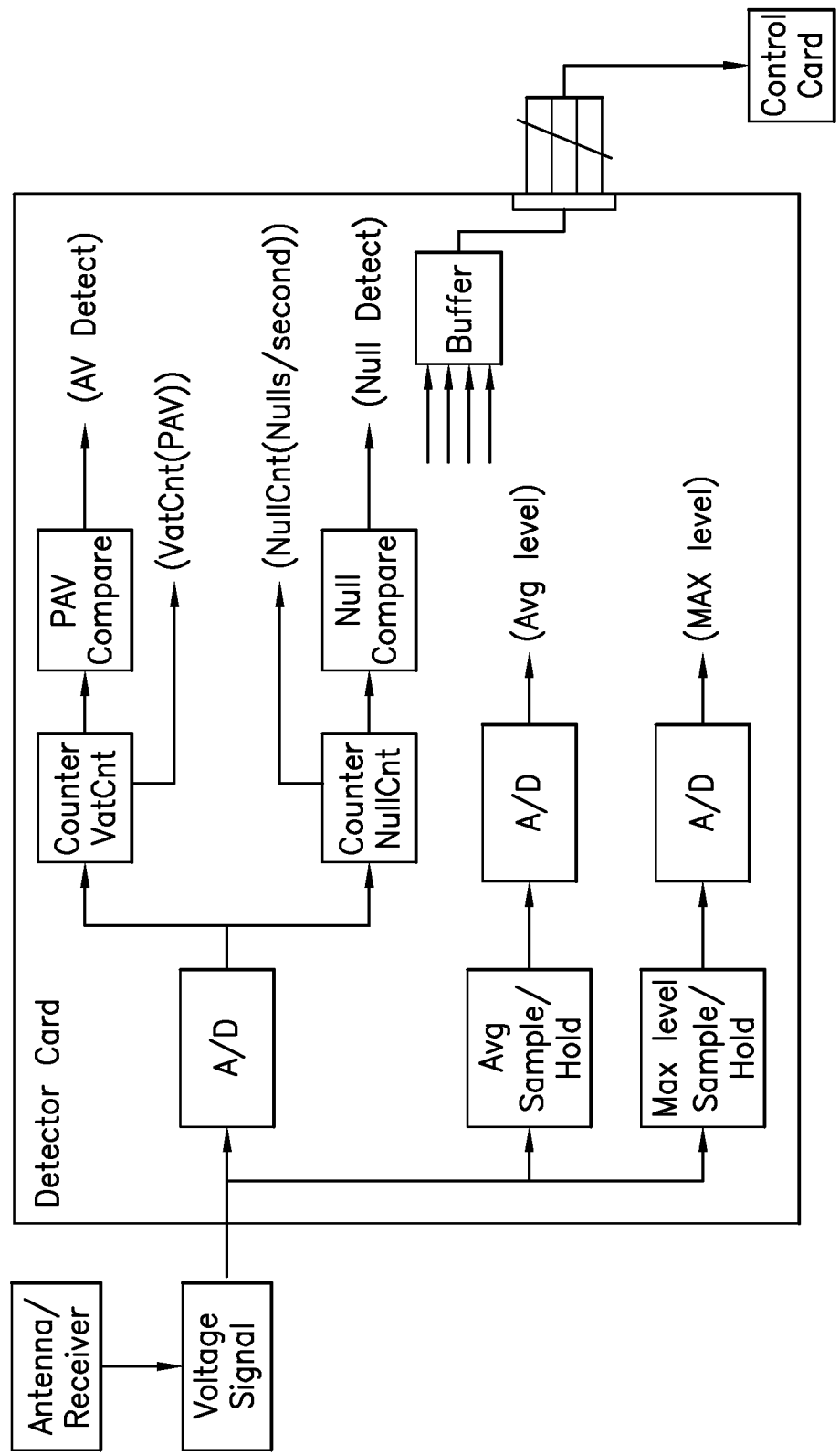
Figure 15:
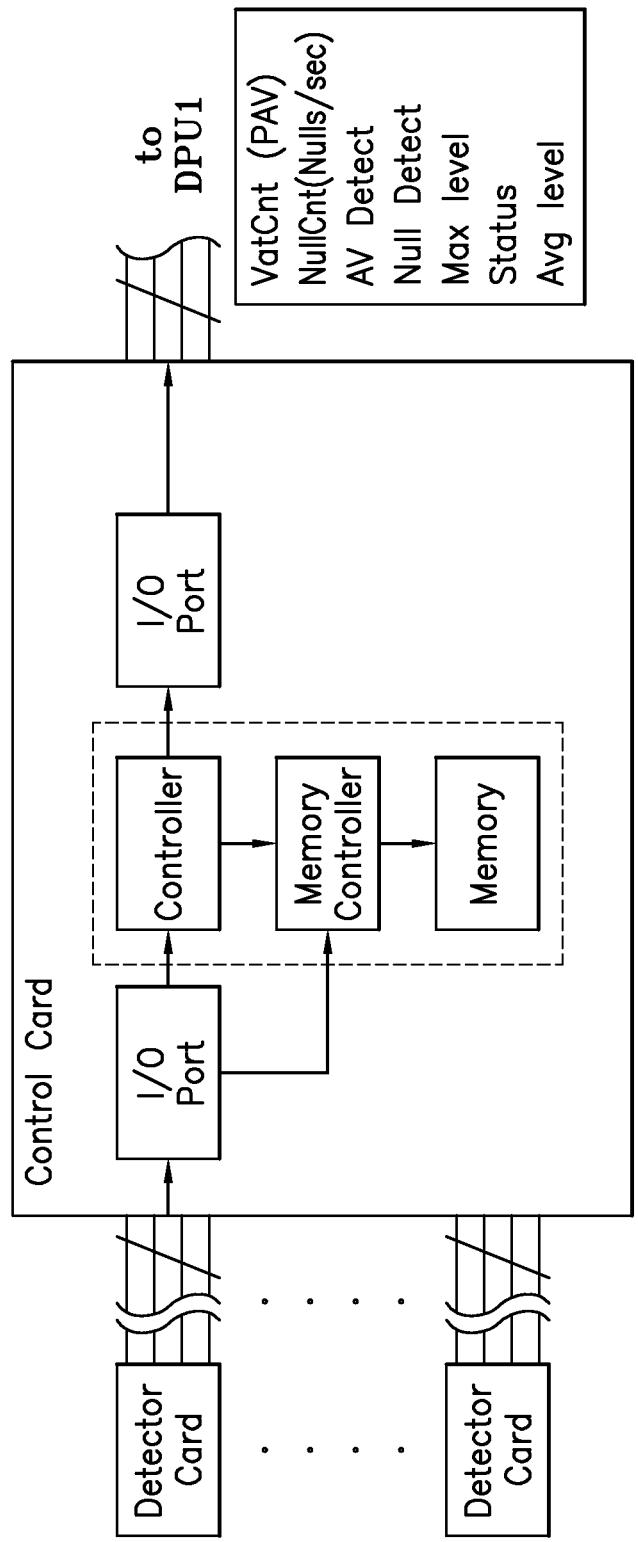

FIGS. 13-15 are block diagrams showing the configuration of an exemplary antenna collection unit. FIG. 13 shows a block diagram of an AHU. The AHU has a number n of detector cards receiving n antenna/receivers signals. The outputs of the detector cards are provided as inputs to a control card. The control card processes the plurality of signals produced by the detector cards and outputs AHU data to DPU1. While the AHU is generally described as including detector cards and control cards, the function of detector cards and control cards may be performed in a software implementation or in a combination of software and hardware implementation.

FIG. 14 shows a block diagram of a PSK detector card coupled to an antenna/receiver which produces a voltage signal from an RF signal and to a control card. A functional representation of a PSK detector card was provided previously with reference to FIG. 8. The detector card receives the voltage signal into an A/D converter and a pair of analog signal processors. The A/D converter samples the voltage signal and provides a digital output to a VAT counter and to a NULL detect counter. The VAT counter counts VAT pulses during a fixed time period and outputs the count to a PAV comparator which compares the VAT count to a reference value to produce an AV (average video) detect signal when the active video content exceeds the reference value. The NULL detect counter counts null signals over a fixed time period, typically a second, and outputs the count to a NULL comparator which compares the signals to a NPS reference and produces a NULL detect signal when the signal exceeds the NPS reference. The AV detect and NULL detect signals may be pooled to provide a PSK signal. Alternatively, the two signals may be provided to a control card without being pooled. The analog signal processors capture the average and max level of the voltage signal which is then digitized in a pair of A/D converters to produce average and maximum, or peak, power level signals. As is described below, the power level, or intensity, of a signal is used to correlate EMI to various source antenna orientations.

FIG. 15 shows a control card which receives inputs from a plurality of detector cards, processes the detector card signals, and outputs EMI characterization information to DPU1. The control card includes an input I/O port, a control processor, and an output I/O port. The control processor includes a controller, a memory controller, and a memory. In one embodiment, the control processor receives data from the detector cards and stores the data in memory until it receives a signal from a DPU1 instructing the control processor to output data throughout the output I/O to DPU1. In an alternative embodiment, the output I/O port is configured to communicate over a LAN, the internet, wirelessly or over a hardwire connection, directly with DPU2. In another embodiment, the AHU streams data continuously to DPU 2 and DPU2 associates EMI intensity data to source antenna orientation based on the timing of transmission.

Figure 16:
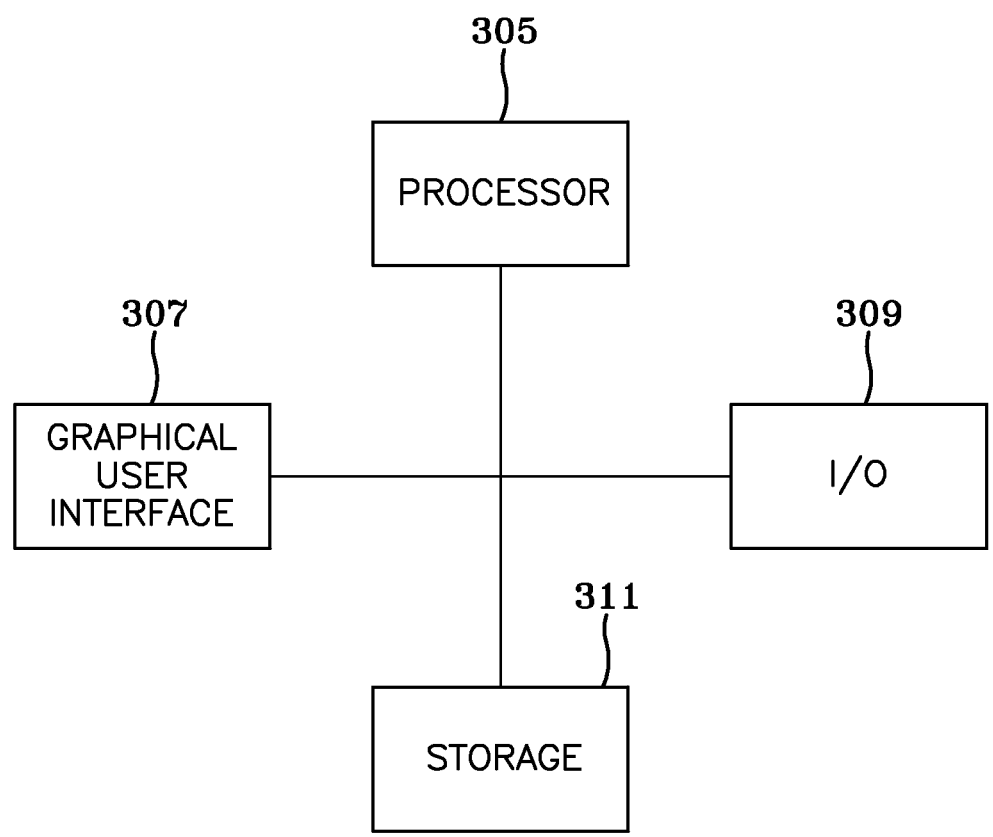
Figure 17:
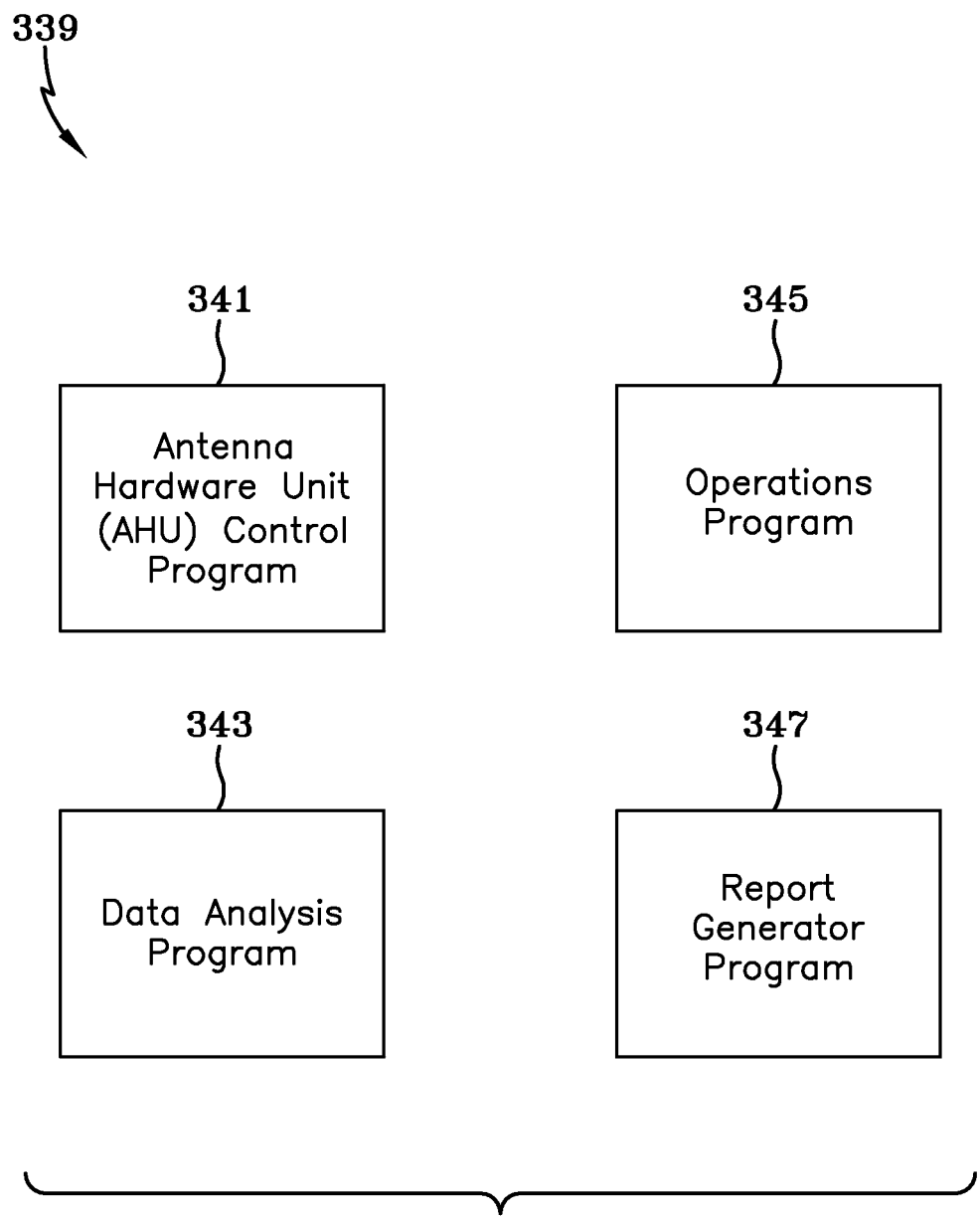

FIGS. 16-18 show components of a data processing unit configurable as a DPU1 and DPU2. The computing device includes processor 305, storage 311, I/O port 309, and GUI 307. Processor 305 executes instructions stored in storage 311 responsive to inputs received through GUI 307 and I/O port 309. One or more programs for implementing a method according to the invention are stored in storage 311. Programs may include AHU control program 341, analysis program 343, operations program 345, reporting program 347, and other programs such as a standard operating system and web browser. In one embodiment, the programs are developed in a data acquisition software platform such as LabVIEW™ software, available from National Instruments Corporation, Austin, Tex. Different programs use different types of files during testing of a signal environment. The files may be created by operations program 345 and may be loaded into any compatible computer for use with analysis and reporting program 343, 347. In one embodiment, files associated with a particular test share the same file name but have different file extensions.

Files table 349, shown in FIG. 18, displays file names, data content, file type, and extensions associated with each file. The header file records several different test event parameters such as the test name, the date of the test, personnel involved in conducting the test, program version, the type of system being tested including types of antennas and available channels, modulation, and data rates, setting comments and notes. The settings file defines the test range and resolution including test frequency, attenuation, sweep dimensions, sweep type, azimuth start, azimuth increment, azimuth stop, etc. Some or all of these test settings characterize control of source antenna 261. AHU test data files may be used to record the time, orientation of source antenna 261, and AHU data. Furthermore, a time/date stamp may be applied to acquired and transmitted data. The time/date stamp may be used to correlate EMI values to external events. As source antenna 261 cycles through or sweeps through a sequence of test points, data corresponding to such a test point is recorded in data files. The filter settings file may be used to filter data and thereby exclude the data from analysis and reporting. The source antenna 261 profile may also be used to obtain information about a single transmitter/signal source for analysis and reporting. Once these inputs are set, an operator can run a characterization test. In an alternative embodiment, the files may be created by AHU control program 341 or other programs configured to receive AHU data.

Figure 19:
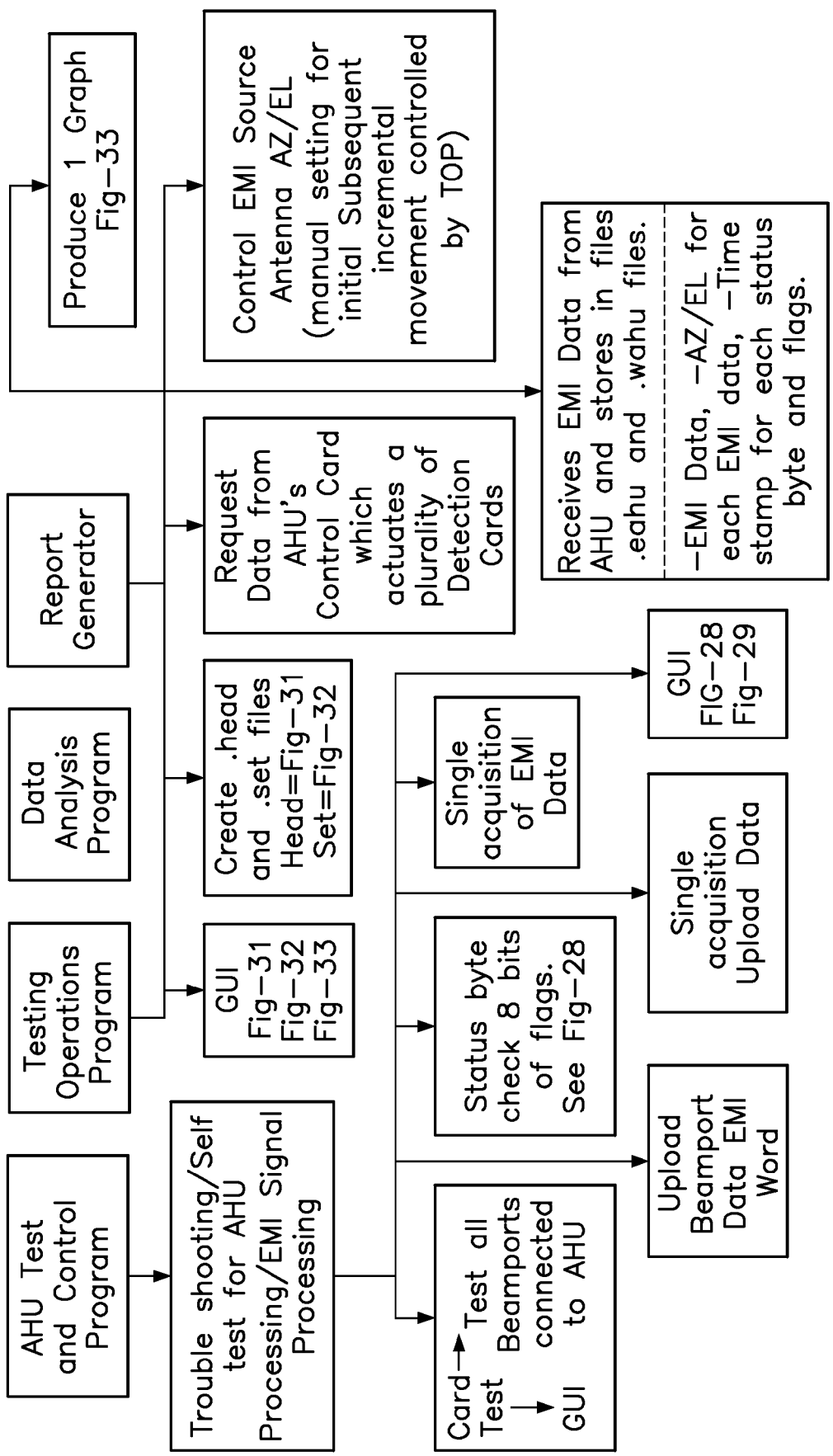
Figure 20:
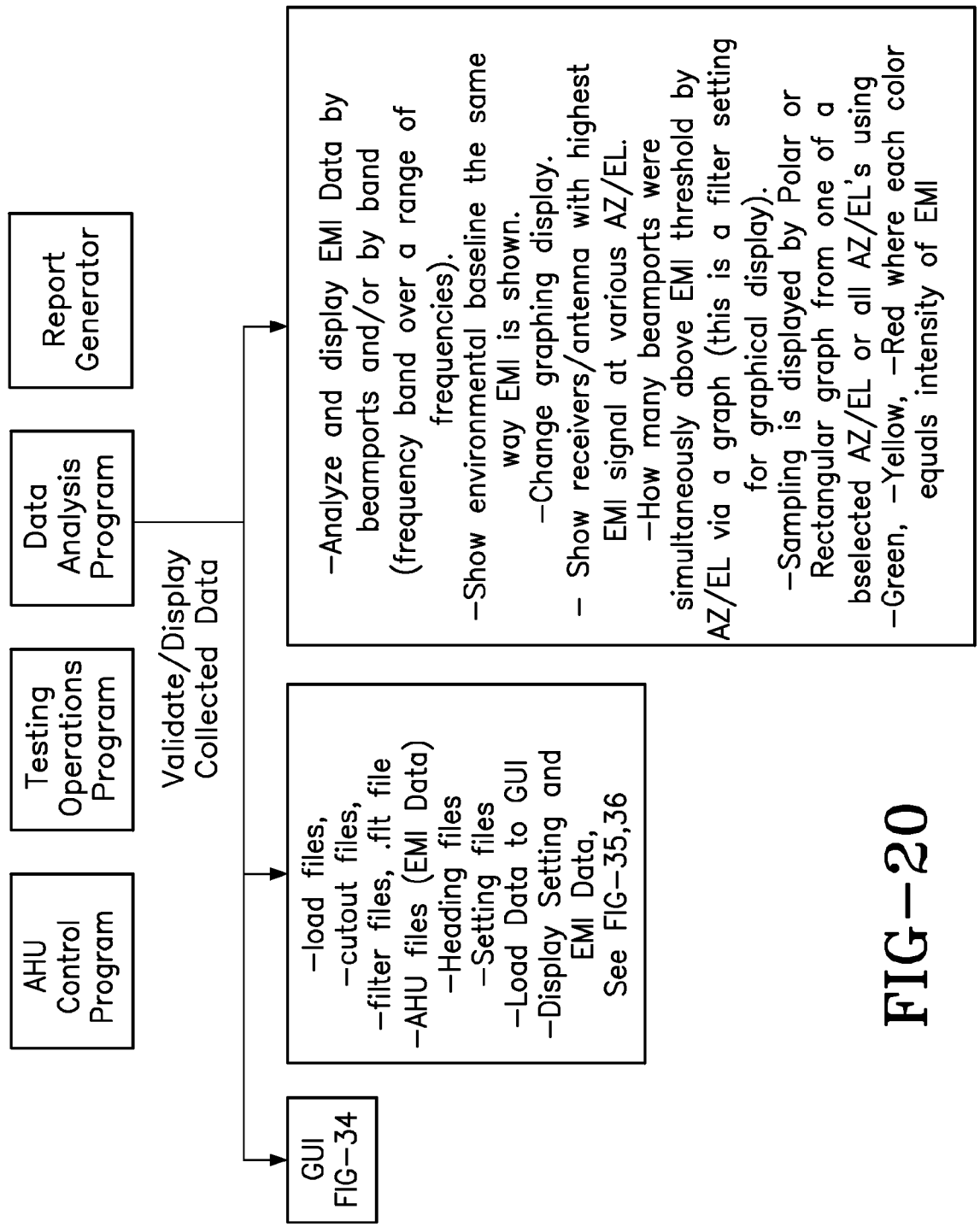
Figure 21:
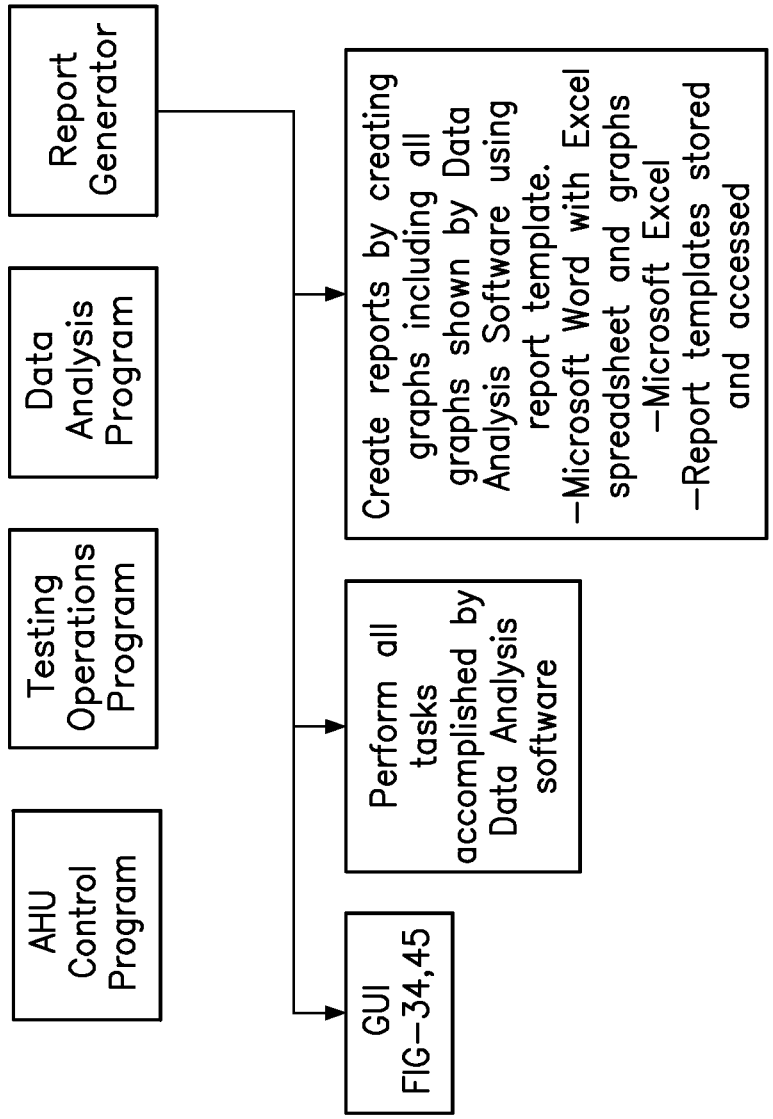

FIGS. 19-21 are introductory block diagrams depicting the functionality of AHU control program 341, operations program 345, analysis program 343 and reporting program 347. The programs are described in more detail below. AHU control program 341 is used to setup and troubleshoot the AHU. The program can test detection cards and communications between detection cards and receivers. Flags are used to indicate malfunctions. Operations program 345 is used to perform tests. The program creates test files, controls the source antenna, and directs the AHU to acquire and upload data. Analysis program 343 uploads data from the files and performs analysis including generation of graphical displays of EMI intensity and data validation. The analysis program can compare and filter data. Reporting program 347 performs all the analytical tasks performed by analysis program 343 and creates reports of data and graphs. Reports may be created with templates such as Microsoft™, Excel™ and Word™ templates available from Microsoft Corporation, Seattle, Wash.

Figure 22:
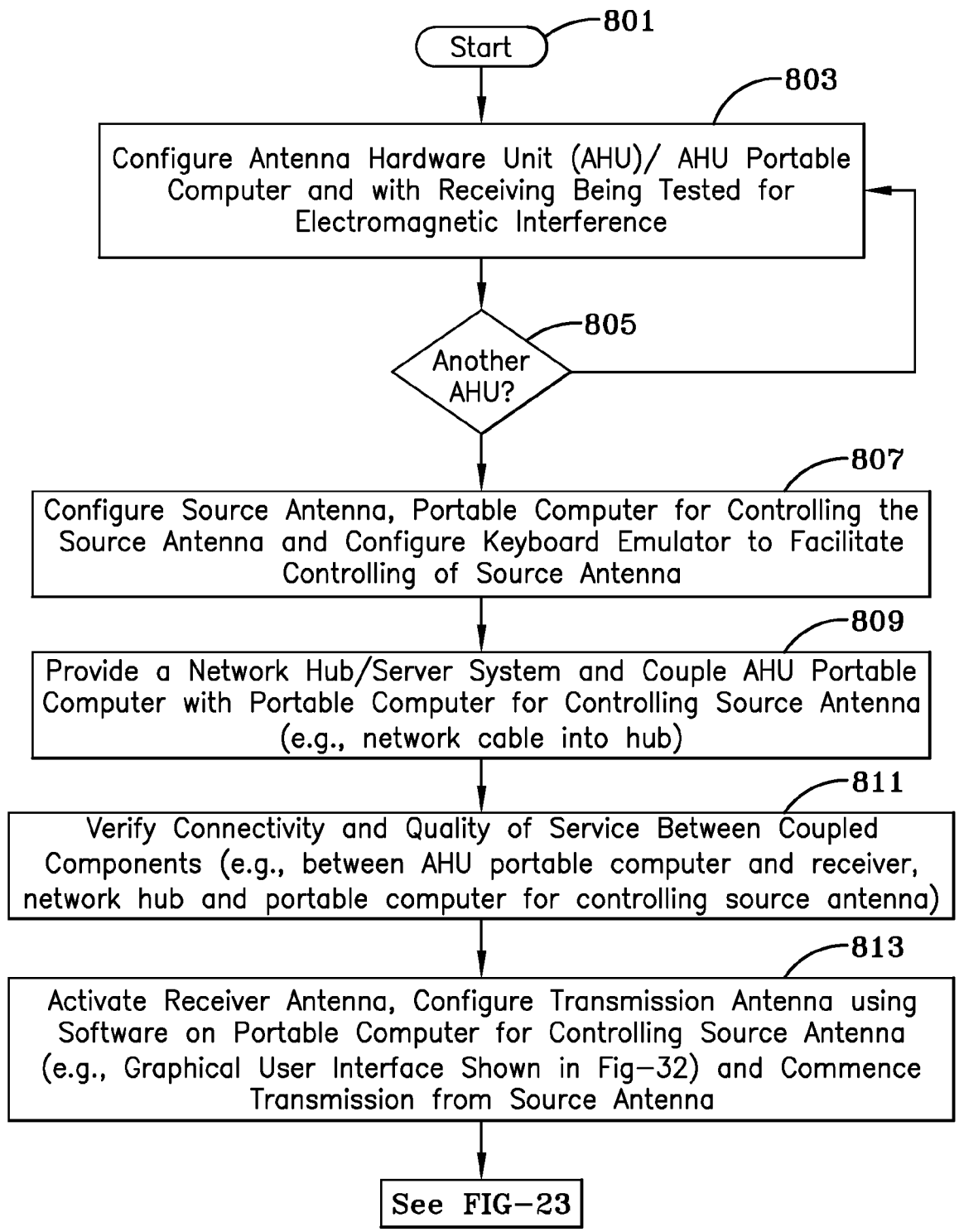
FIGS. 22-24 show flowcharts of an exemplary detection method.
Figure 23:
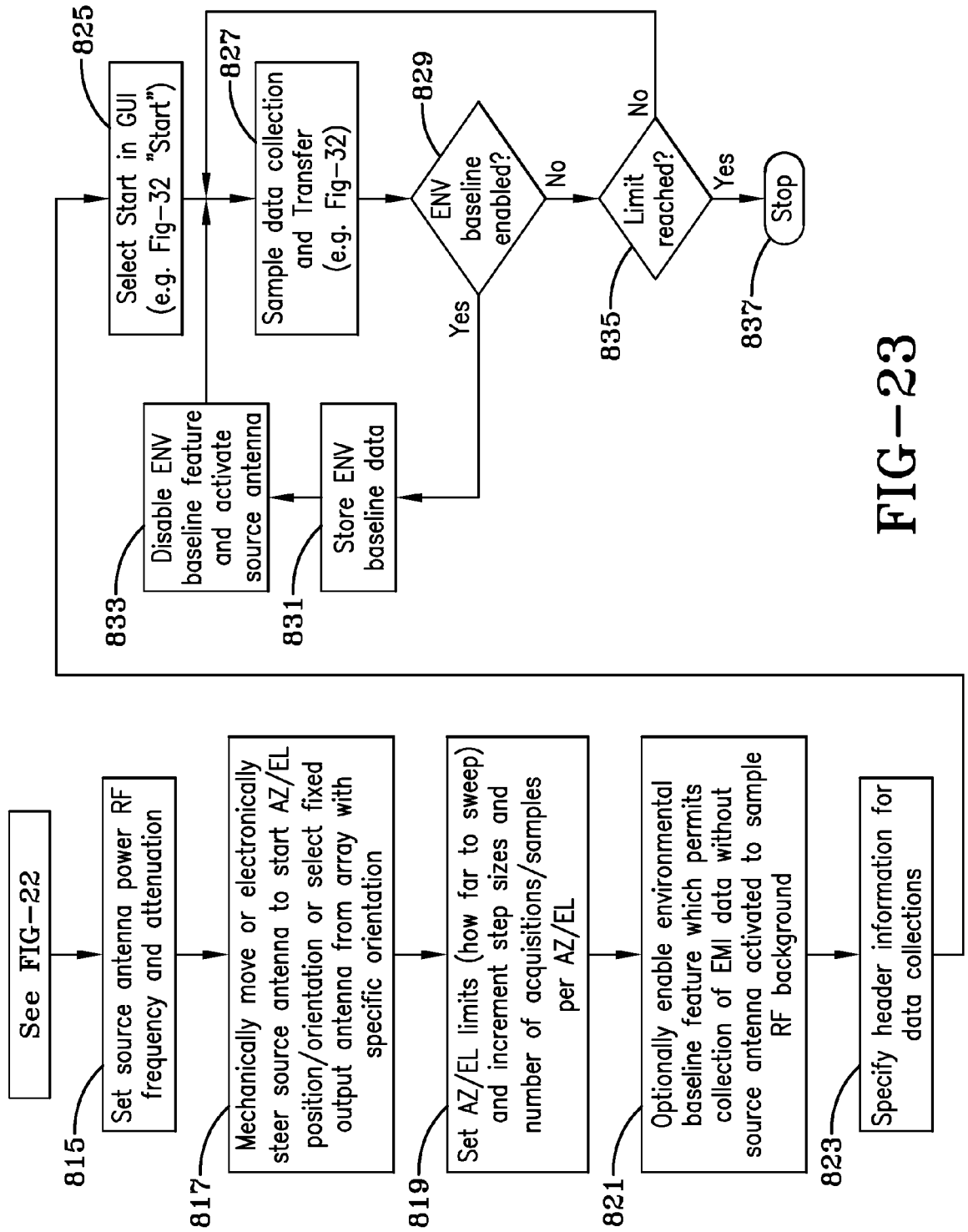

Having described the basic structure of detection system 259, its operation will now be described in detail. FIGS. 22-23 are flowcharts of one exemplary method for setting up and operating detection system 259. At step 801, hardware as previously described is provided. At step 803, a first antenna collection unit is configured. The antenna collection unit may comprise AHU 274, 276 and DPU1 271, 273 or DPU2 265. Setup may include testing EMI, self-testing of detection cards, testing of communications between receivers and detection cards and testing communications between AHU 274, 276 and DPU1 271, 273 or DPU2 265. AHU control program 341 may be used to direct some or all of the steps of the configuration process. The operator may manually send commands to AHU 274, 276 such as re-set, acquire, upload data, high sensitivity mode, turn RF limiter switch on and off, and the like. The operator can also read AHU 274, 276 status flags and acquisition data on command.

At step 805, the operator may choose to setup additional antenna collection units. At step 807, the source antenna controls are configured. DPU2 265 is coupled to source antenna control system 263 to enable control of source antenna 261 by DPU2 265. Coupling may require use of a keyboard emulator or setup of a wireless or hard-wire connection. Setup may also include providing to DPU2 265 source antenna 261 model/configuration parameters to enable DPU2 265 to emulate the proper keyboard characters and control source antenna 261. At 809, a network is set up for establishing logical communication between DPU2 265 and AHU 274, 276. A network may comprise an internet network including a hub and a client server system, a wireless network, or a hard-wired connection. At 811, connectivity and quality of service are tested. Connectivity may be tested between AHU 274, 276, DPU1 271, 273, DPU2 265, and communications system 269. Connectivity and quality of service testing of networks and computers is well known in the art.

Once connectivity is established and quality of service is verified to be sufficient, antennas may be activated and configured for transmission. At step 813, source and target antenna 261, 275, 277 are activated. Source antenna 261, or transmission antenna, is configured using GUI 307 and operations program 345. Activation means turning the antennas on, self-testing, and performing necessary standard functions to enable the antennas to receive instructions from DPU1 271, 273 and DPU2 265 and to perform those instructions.

Once source and target antenna 261, 275, 277 is activated, testing may begin. At step 815, source antenna 261 transmission characteristics are set up. DPU2 265 commands source antenna 261 to transmit at predetermined power, frequency and attenuation levels. These levels are defined in files associated with the test. At step 817, source antenna 261 is steered to a transmitting position. Source antenna 261 may comprise electronic steering mechanisms, may only have mechanical mechanisms without electronic guidance, and may comprise arrays from which fixed position antennas are selected. The antenna position may be defined in polar coordinates as an elevation and azimuth parameters (EL/AZ). Elevation may range from 0-90° while azimuth may range from 0-360°.

At step 819, an acquisition pattern is set up. Setup involves defining test parameters such as the position of source antenna 261 (elevation and azimuth), scanning patterns, amount of movement between steps in a pattern, transmission frequencies, etc. and defining target antenna acquisition patterns to acquire data in a coordinated manner with source antenna 261.

During a test, the position of antenna 261 may be changed in a pattern of incremental steps of variable size and number. A detailed EMI graph may be created using a large number of small steps, for example by steering source antenna 261 in 1° steps in EL and AZ to produce 90×360 steps. The pattern may be a raster pattern which steps source antenna 261 at an elevation through all the programmed AZ steps and then repeats the pattern at a different elevation until all the steps in the test are complete. Setting the sweep pattern involves programming through GUI 307 and operations program 345 the AZ/EL limits of the sweep pattern, and the number and size of steps. Setup is described fully below with reference to the functionality of operations program 345. The acquisition pattern also includes the number of acquisitions, or data samples, to receive from each target antenna.

Optionally, at step 821, an environmental baseline is set. The environmental baseline (EB) is defined to acquire background RF signals when source antenna 261 is not active. EB data is useful to determine which portion of the EMI is caused by source antenna 261 and which portion is caused by other sources. Setting the EB involves defining a desirable sampling frequency and pattern. Obtaining a high volume of EB data may require slowing the test.

At step 823, header information is provided. Header information identifies relevant information in the files which are created during each test. Once the header information is provided, testing may begin.

At step 825, testing starts responsive to the operator's input. Testing may be initiated by activating a "start" object in the appropriate GUI 307 page. At step 827, DPU2 265 directs source antenna 261 to initiate transmissions and the antenna collection units to acquire data according to the patterns set up in the previous steps. Acquired data is uploaded from the antenna collection units to DPU2 265 where it is saved in files.

At step 829, depending upon status of the EB feature, appropriate processing is performed. If EB is enabled, processing continues at step 831. If EB is disabled, processing continues at step 835. At step 831, EB data is stored in files. At step 833, EB is disabled and source antenna 261 is set to transmit. Depending on the test, EMI data acquisition may take several hours and it may be desirable to obtain EB data at various intervals but not after each repositioning step of source antenna 261. After the initial sampling of EB data, EMI data may be obtained until such time when the test requires re-sampling the EB. Then, the EB feature may be enabled to stop transmissions and acquire EB data. After acquiring EB data, the EB feature is once again disabled. EB data collection at periodic time intervals may be set up with operations program 345.

At step 835, depending upon status of the test, appropriate processing is performed. If the test pattern is complete, processing stops at step 837. If the test pattern is not complete, processing continues at step 827 to conduct additional data acquisition cycles until the test pattern is complete.

Figure 24:
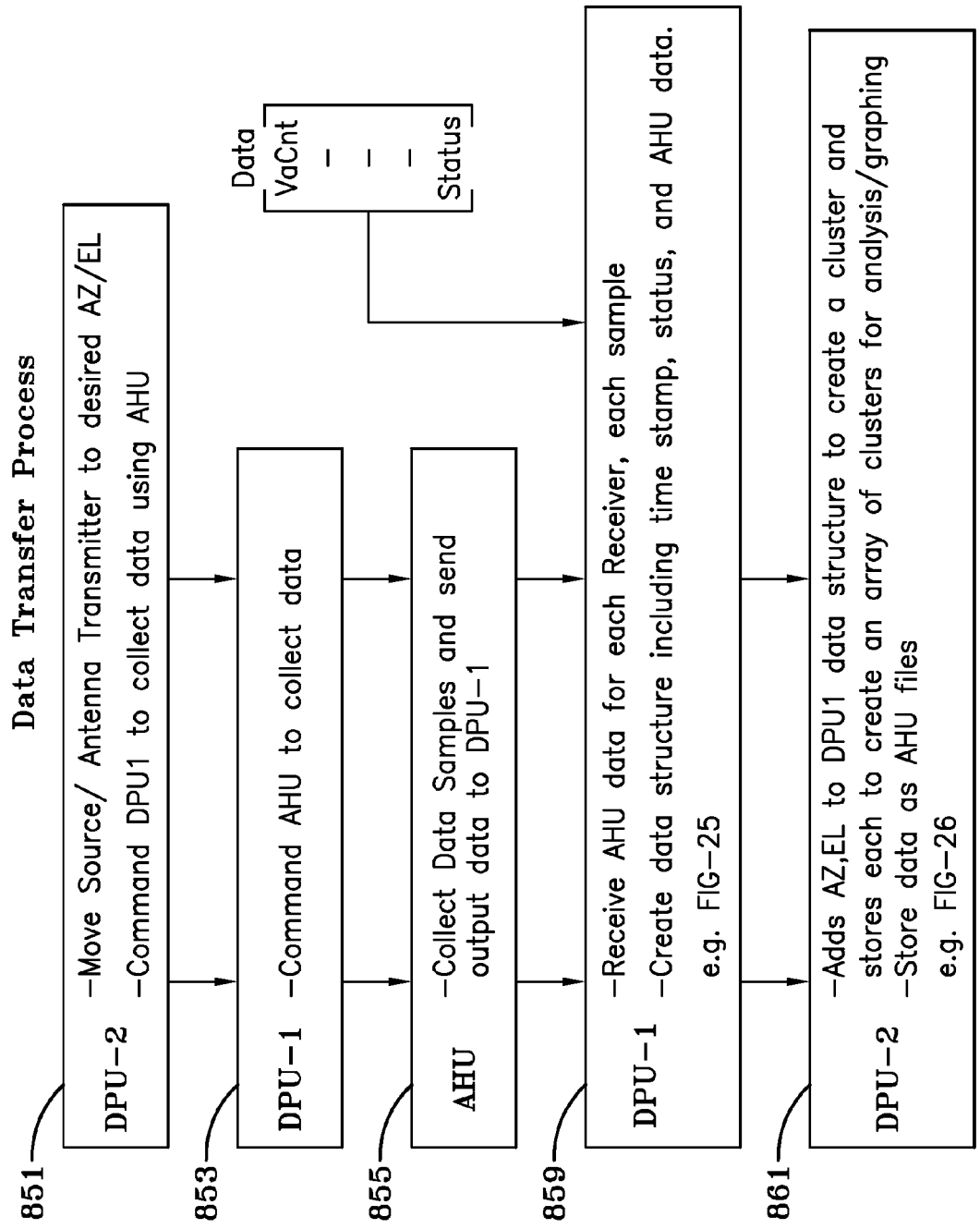
Figure 25:
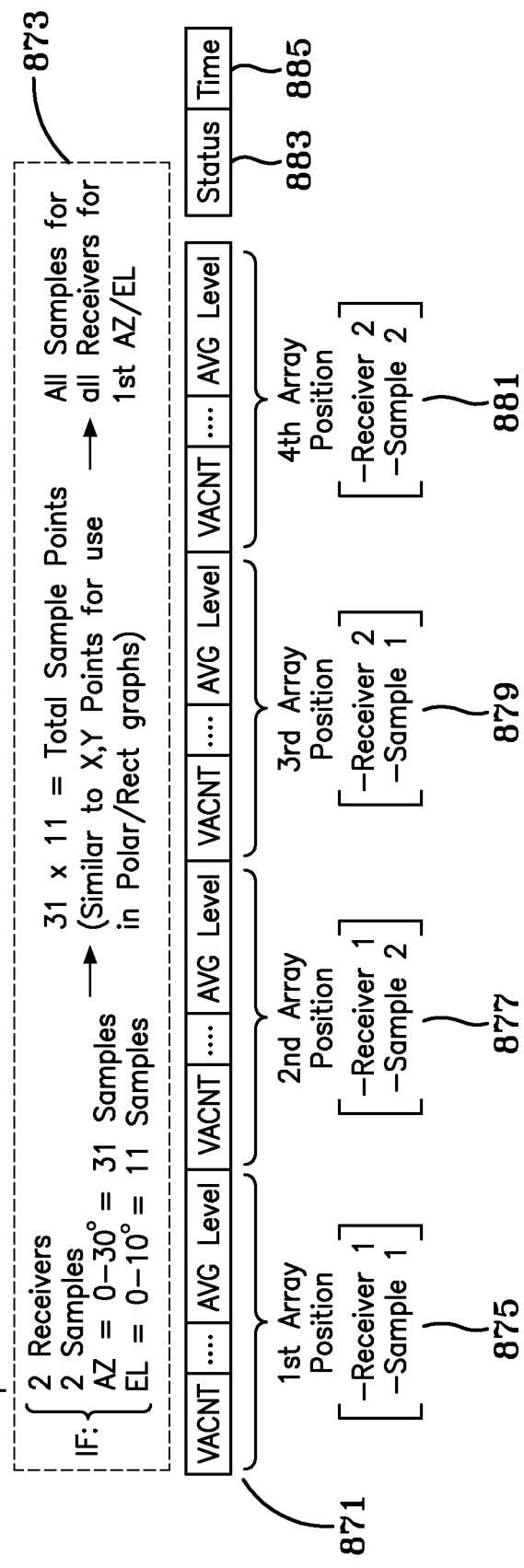

FIG. 24 shows a flowchart of a data transfer process. At step 851, DPU2 265 commands source antenna 261 to move to a desired AZ/EL. DPU2 265 also commands DPU1 271, 273 to load data from AHU 274, 276. At step 853, DPU1 271, 273 commands AHU 274, 276 to upload data. At step 855, AHU 274, 276 acquires data and sends the data back to DPU1 271, 273. At step 859, DPU1 271, 273 receives AHU 274, 276 data for each sample of each receiver in target antenna 275, 277. DPU1 271, 273 creates data structures which will contain time, status, and signal data. An exemplary DPU1 data structure is shown in FIG. 25. At step 861, DPU2 265 adds AZ/EL fields to the data structure and adds AZ/EL information to the DPU1 data to create a cluster. DPU2 265 stores each cluster to create an array of clusters as AHU files as shown in FIG. 18. An exemplary model of an array of cluster data structure is shown in FIG. 26.

FIG. 25 shows an exemplary sample data structure Table 871. Box 873 shows the system set up. The system includes two receivers. Two samples are acquired from each receiver at each source antenna position. The scanning pattern is from AZ 0-30° in one degree increments and EL from 0-10° in one degree increments. The scanning pattern produces 31×11 total sample points. 1st array position 875 contains data obtained from the first receiver during the first sample. Data includes results produced from PSK detection signals which are described in full detail with reference to the construction and operation of the PSK detection cards. 2nd array position 877 shows the same type of data which was obtained from the first receiver during the second sampling. 3rd and 4th array position 879, 881 contain first and second sample data the second receiver. Field 883, 885 shows the status and time of the acquisition. The process will be repeated 31×11 times to complete the test.

Figure 26:
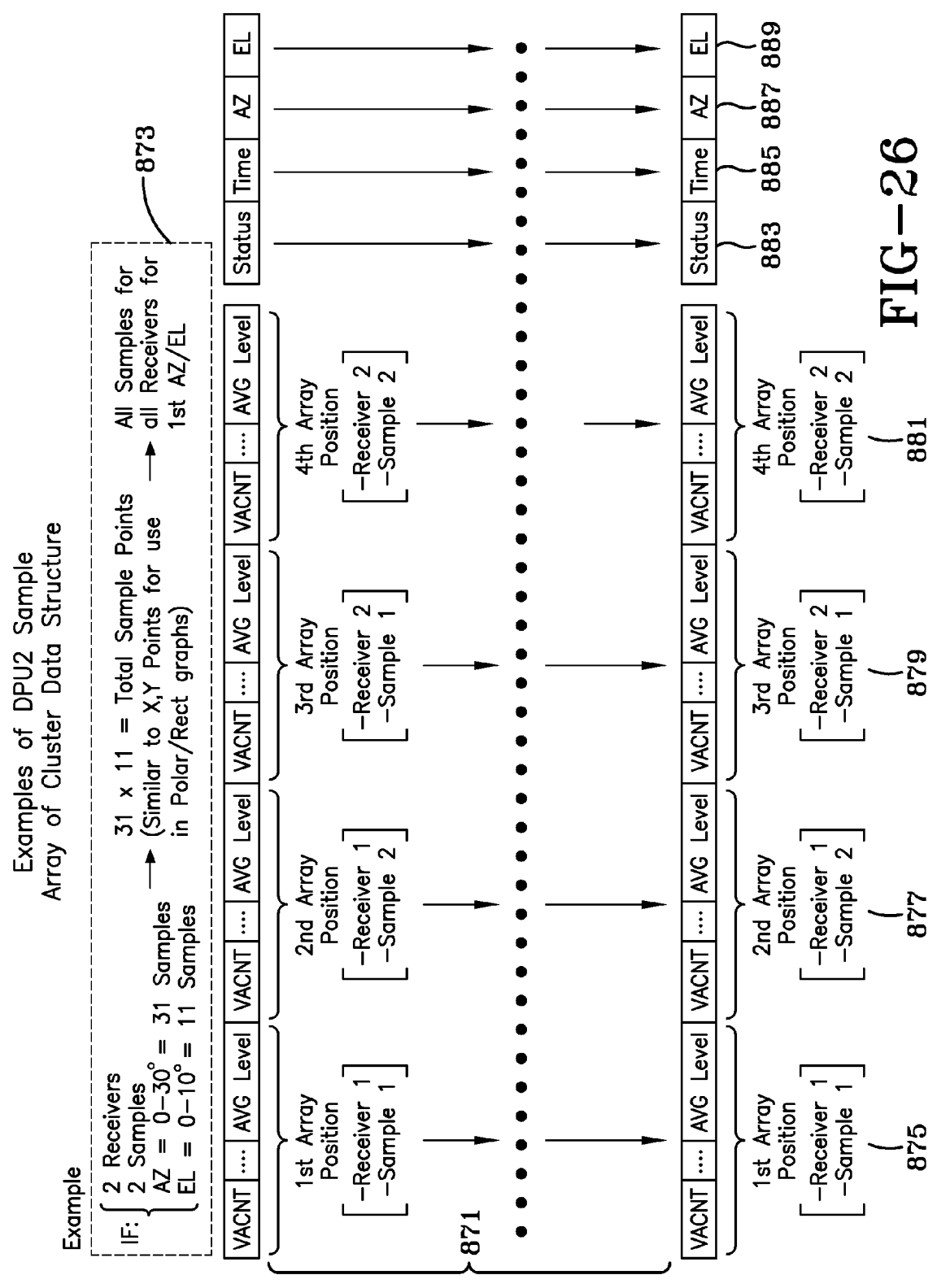

FIG. 26 shows an exemplary DPU2 array of cluster data structure. The array comprises a plurality of rows similar in construction to the DPU1 sample data structure with the addition of fields AZ 887 and EL 889. When the test is complete, the array will have 31×11 rows.

FIGS. 27-45 are screen displays of different pages of programs. A screen display is an image or bitmap representation of icons or digital objects. Screen displays may be presented, for example, in a display device and a printer. Each screen display has a plurality of objects for activating processes, displaying data, setting parameters and information, and selecting settings from drop-down lists or tables. Following are descriptions of each screen display with reference to specific figures. The descriptions include tables listing in column format the reference numeral, label, and functional description of each object.

Figure 27:
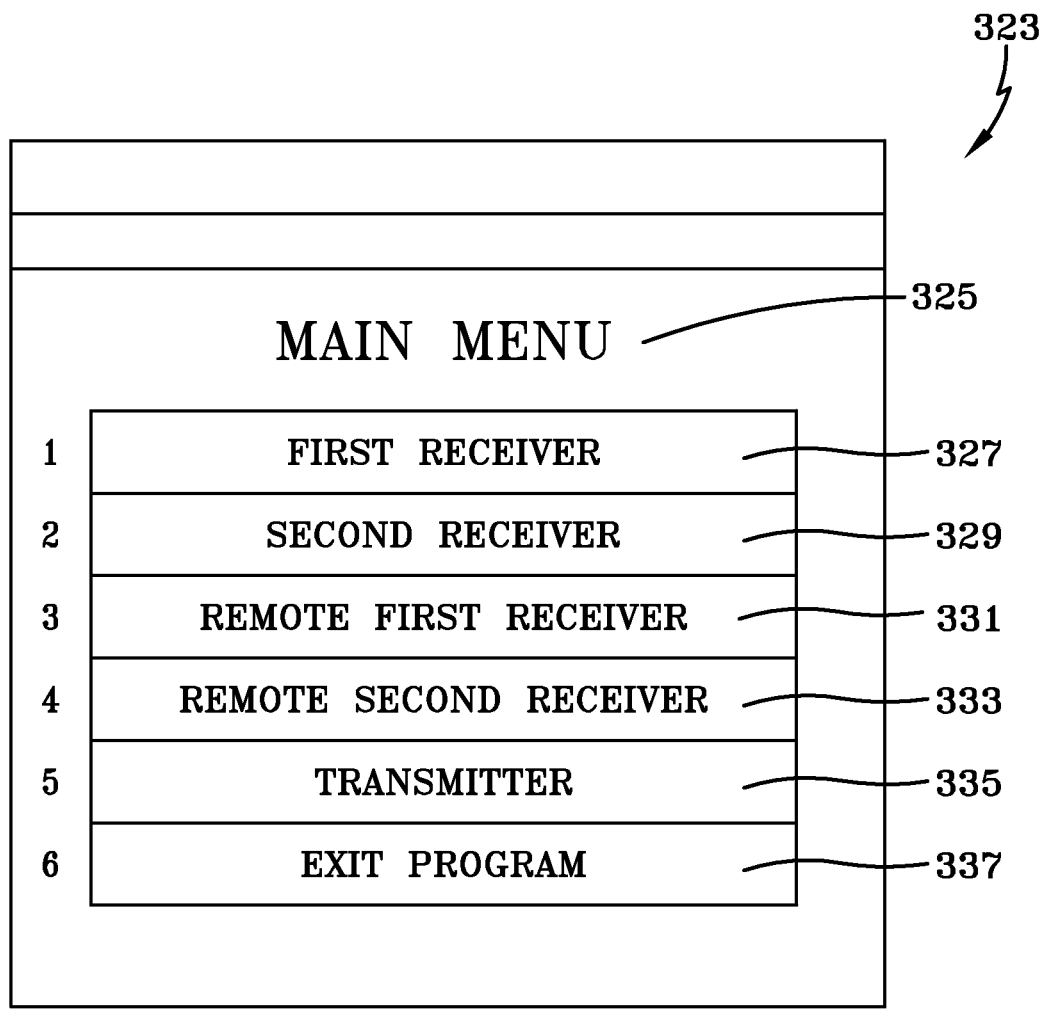
FIGS. 27-33 show screen displays of data acquisition programs for executing the detection method of FIGS. 22-24 in the detection system of FIG. 10.

FIG. 27 shows an exemplary screen display showing a main menu of GUI 307 for activating, or opening, operations program 345 and AHU control program 341. Menu 323 includes text box 325 indicating it is a main menu screen and a plurality of objects which may be activated to direct the operator to open various programs. In one embodiment, operations program 345 is installed in DPU1 271, 273 and in DPU2 265. First and/or second receiver 327, 329 are activated in DPU1 271, 273 to open AHU control program 341. First and/or second remote receiver 335, 337 are activated in DPU2 265 to open AHU remote client subprograms that allow the operator to use AHU control program 341 remotely from DPU2 265. In other words, DPU2 265 communicates with AHU 274, 276 through AHU control program 341 which is running in DPU1 271, 273. The look and function of the AHU remote client is identical to AHU control program 341 with the exception of the ability to save multiple acquisition data to a file. Transmitter 335 activates operations program 345 which is described in detail with reference to FIGS. 30-33.

GUI 307 may comprise a plurality of user interface portions for interfacing with various processing sequences. In one embodiment of a method for identifying target signals, first signals are transmitted by source antenna 261. Target antenna 275, 277 receives first signals along with other signals. Receivers in antenna 275, 277 create second signals in the form of video from the power levels, or envelope, of the signals received. AHU 274, 276 receives second signals and detects those of second signals corresponding to the first signals. AHU 274, 276 transmits second data corresponding to detected signals via communications system 269 to DPU2 265, either directly or through DPU1 271, 273. DPU2 265 associates data corresponding to the first signals with data corresponding to the detected signals. Information files may be created to contain the associated data and stored in DPU2 265 or DPU2 265 may transmit the information to a different processor. A processing sequence represents the association or relationship between first signals and detected signals. Representation may comprise display in a computer monitor, printing in a printer, and presentation in any other representation means. Prior to representation, information may be filtered in a plurality of ways. Cutouts may be provided to facilitate analysis. Each of the method steps may be performed, at least in part, by an operator using a user interface.

Figure 28:
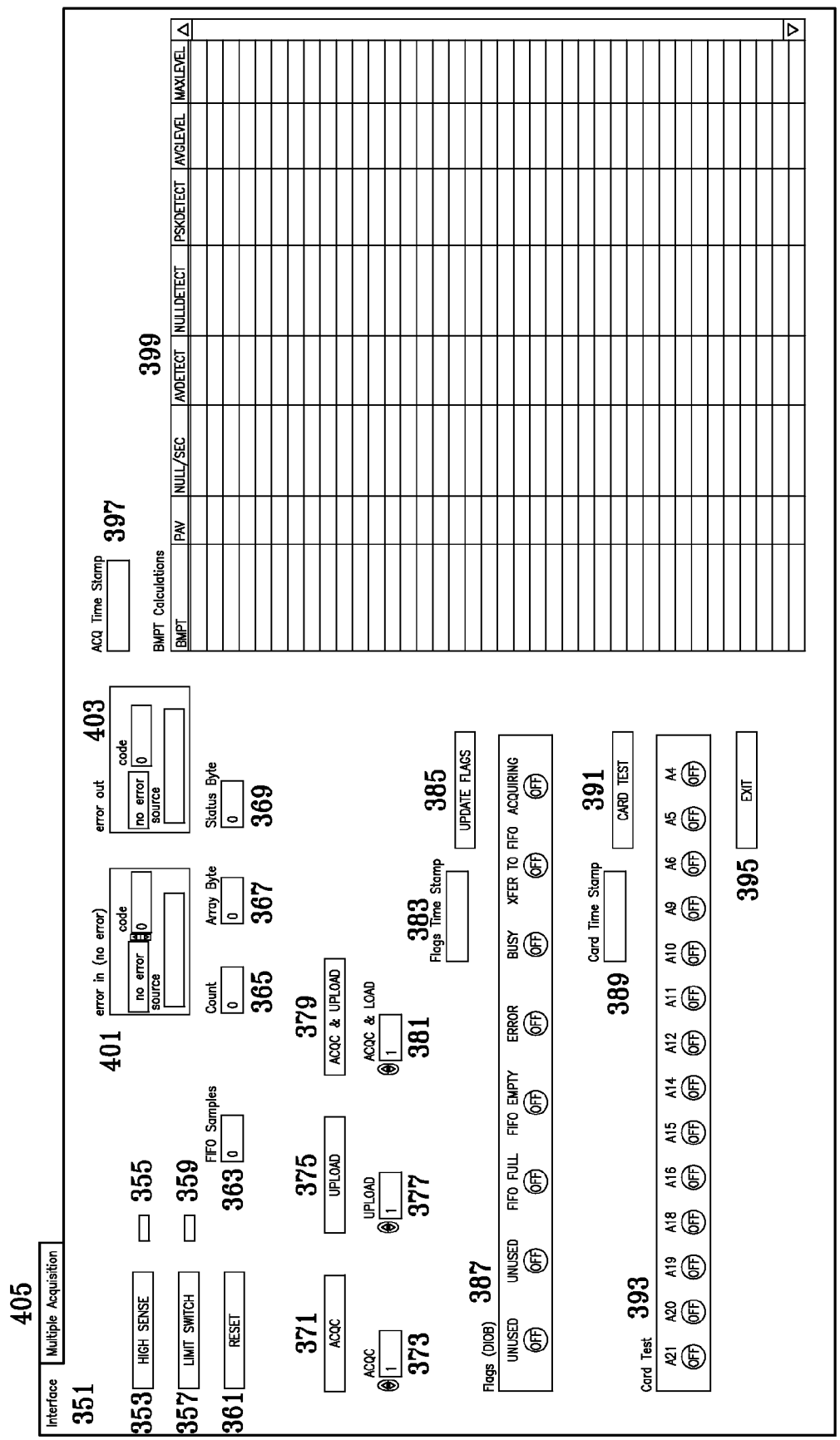
Figure 29:
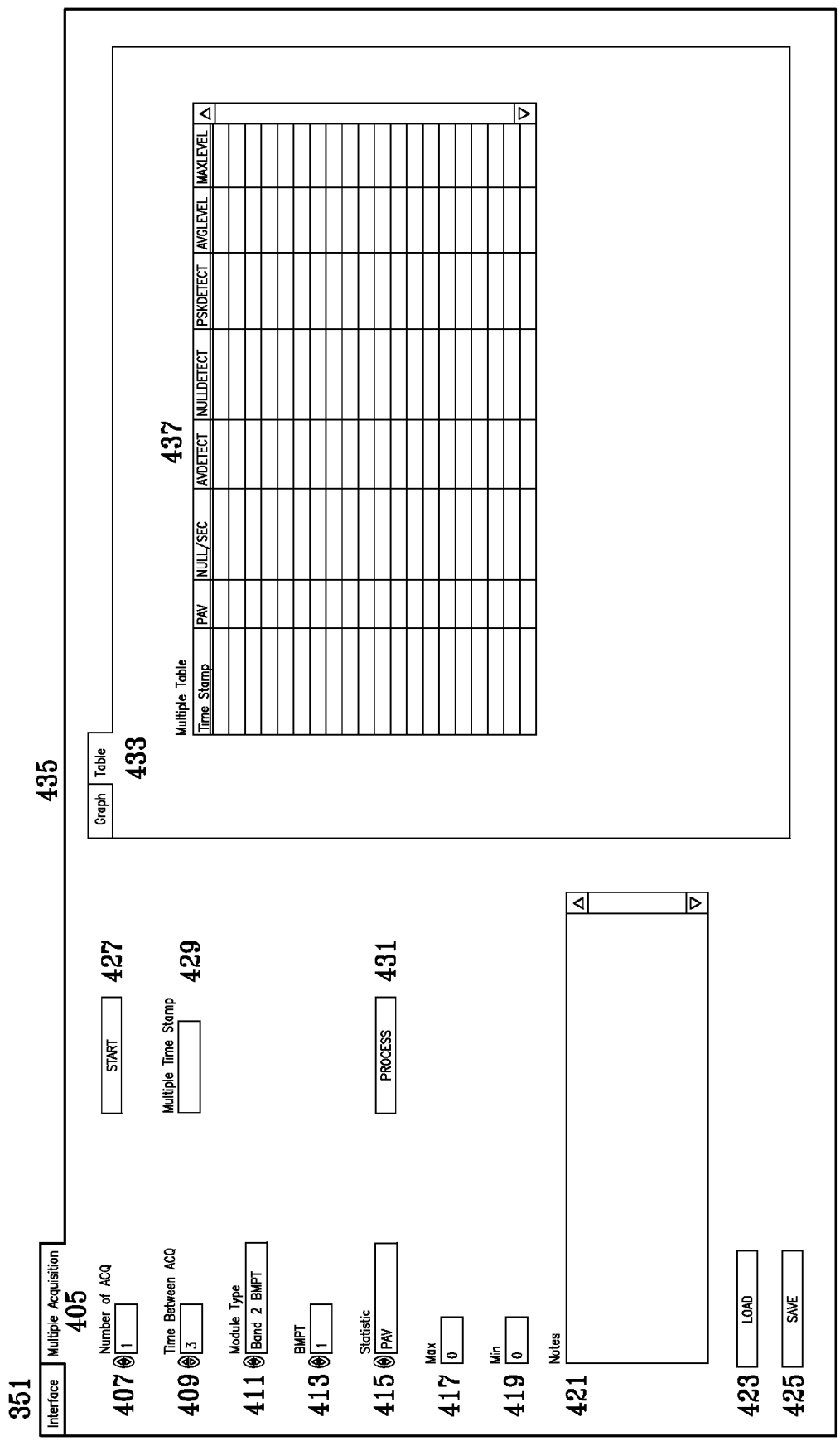

FIGS. 28-29 illustrate operation of AHU control program 341. AHU control program 341 can be operated locally on DPU1 271, 273 and can be activated remotely by enabling either first or second receiver 327, 329 in DPU1 271, 273 and then selecting either first or second remote receiver 331, 333 on DPU2 265. In one embodiment, GUI 307 displays in DPU2 265 pages similar to those associated AHU control program 341.

FIG. 28 shows exemplary user interface page 351 of AHU control program 341 consisting of one tab display with two options labeled "Interface" and "Multiple Acquisition." Interface page 351 has a plurality of objects, listed in Table 1, for enabling an operator to set target antenna 275, 277 parameters, test AHU 274, 276, and generally monitor the performance of AHU 274, 276. To initiate testing of an AHU, RF limiter switches are opened by activating LIMIT SWITCH 357. This removes RF input from the CVRs. ACQC 371 is activated to acquire signals several times. Since RF input is removed from the CVRs, all results should be very close to zero. If a receiver reports PSK detect or average levels, then the receiver is malfunctioning. HIGH SENSE 353 switches detection sensitivity of target antenna 275, 277 between high and normal. HIGH SENSE LED 355 and LIMIT SWITCH LED 359 display the status of the switches. RESET 361 resets AHU 274, 276, for example in case the algorithms lock-up.

FIFO Samples 363 indicates the number of acquisitions currently stored in the FIFO buffer of AHU 274, 276. Count 365 counts the iterations of internal software loops and displays no useful information except for troubleshooting. Array Size 367 indicates the size of one complete FIFO transfer. In one embodiment, the array comprises unsigned 8 bit numbers.

ACQC 371, UPLOAD 375 and ACQC & UPLOAD 379, and their corresponding numeric controls 373, 377 and 381, set the number of consecutive acquisition and upload commands sent to AHU 274, 276. ACQ Time Stamp 397 records the time when the last acquisition was performed.

Flags 387 provides feedback on the performance of AHU 274, 276. At start-up, the only flag that should be displayed is the FIFO empty flag which indicates that the FIFO buffer on the control card of the selected AHU is empty. The remaining flags indicate whether the FIFO buffer is full, there has been a communication error, AHU 274, 276 is busy or transferring data to the FIFO buffer or acquiring signals from the transmitters.

CARD TEST 391 tests the communication between the AHU detection cards, the AHU control cards and DPU1 271, 273. When activated, CARD TEST 391 causes the program to send a special acquisition command to AHU 274, 276. Instead of sending a command to acquire data, each detection card sends a predefined set of data to test the communications between DPU1 271, 273 and AHU 274, 276. All fourteen LEDs on Card Test 393, which represent each detection card, should be lit green if the cards and DPU1 271, 273 are working properly. Card Time Stamp 389 shows the time when the last card test was performed.

BMPT Calculations 399 displays characteristics of signals received from each receiver. The BMP column shows the receiver name or identification code, and the other columns show the percent of time video was above threshold, number of times video fell below threshold each second, PSK detect via PAV criteria, PSK detect via NPS criteria, PSK detect (combined or pooled), average video level and maximum video level.

TABLE 1

| | | |
|---|---|---|
| 353 | HIGH SENSE | Activate to switch sensitivity level between high and normal |
| 355 | HIGH SENSE LED | Indicate present sensitivity level |
| 357 | LIMIT SWITCH | Activate to switch limit switch on/off |
| 359 | LIMIT SWITCH LED | Indicate limit switch on/off |
| 361 | RESET | Activate to reset |
| 363 | FIFO Samples | Display number of FIFO samples |
| 365 | Count | Display number of counts |
| 367 | Array Size | Display array size |
| 369 | Status Byte | Display status byte |
| 371 | ACQC | Activate to start acquisition |
| 373 | ACQC | Set number of acquisitions |
| 375 | UPLOAD | Activate to start upload |
| 377 | UPLOAD | Set number of uploads |
| 379 | ACQC & UPLOAD | Activate to start acquisition and upload |
| 381 | ACQC & UPLOAD | Set number of acquisitions and uploads |
| 383 | Flags Time Stamp | Display the time stamp when flag data was obtained |
| 385 | UPDATE FLAGS | Activate to update flags |
| 387 | Flags | Display flag status for eight flags |
| 389 | Card Time Stamp | Display the time stamp of the last card test |
| 391 | CARD TEST | Activate to test card |
| 393 | Card Test | Display card status for 14 cards |
| 395 | EXIT | Activate to exit |
| 397 | ACQ Time Stamp | Display the time stamp of the last acquisition |
| 399 | BMPT calculations | Display data from acquisitions |
| 401 | Error in | Error control box shows errors and error sources, and enables assignment of error codes |
| 403 | Error out | Error control box shows errors and error sources, and enables assignment of error codes |

FIG. 29 shows multiple acquisition page 405. Multiple acquisition page 405 displays a plurality of objects, listed in Table 2, and one tab display with two options labeled "Table" and "Graph" for acquiring, loading, saving and analyzing AHU data. The operator can set parameters for acquiring data from receivers several times at regular time intervals without repositioning source antenna 261. The operator can also acquire and graph data. Number of ACQ 407 controls the value of the number of acquisitions that are consecutively taken. Time between ACQ 409 is the time in milliseconds between each of the multiple acquisitions. BMPT is an acronym for "receiver." Module Type 411 is the value, used in conjunction with BMPT 413, to select which receiver is used for statistical analysis. Statistic 415 controls which statistic will be used for statistical analysis. Notes 421 is a text field which allows the operator to input notes or comments that will be saved with multiple acquisitions data. When multiple acquisition data is loaded, the notes are also loaded.

LOAD 423 re-loads multiple acquisition data files and SAVE 425 saves multiple acquisition data files. In one embodiment, this functionality is deactivated when setting AHU parameters from the remote receiver subprograms of operations software 345.

START 427 initiates multiple acquisitions based on defined number of acquisitions and time between acquisitions input. PROCESS 431 initiates statistical analysis and display of statistical results for the defined receiver. The max and mean, and graph 435, are repopulated based on the module type, receiver and statistic inputs.

Table page 433 displays table 437 showing statistics of the receiver selected with Module Type 411 and BMPT 413 over the multiple acquisition set. Graph page 435 displays a plot of the statistic selected with Statistic 415 for the selected receiver versus time (milliseconds). Table 437 and the graph are refreshed when data is acquired, loaded, or prompted by activating PROCESS 431.

TABLE 2

| 407 | Number of ACQ | Set number of acquisitions |
|---|---|---|
| 409 | Time between ACQ | Set time between acquisitions |
| 411 | Module Type | Set module type |
| 413 | BMPT | Set BMPT |
| 415 | Statistic | Set statistic |
| 417 | Max | Display maximum value of statistic |
| 419 | Min | Display minimum value of statistic |
| 421 | Notes | Add notes |
| 423 | LOAD | Load dataset |
| 425 | SAVE | Save dataset |
| 427 | START | Start multiple acquisition process |
| 429 | Multiple Time Stamp | Display time stamp of start of multiple acquisition |
| 431 | PROCESS | Activate to process data |
| 433 | Table | Table tab |
| 435 | Graph | Graph tab |
| 437 | Multiple Table | Multiple acquisition table |

Figure 30:
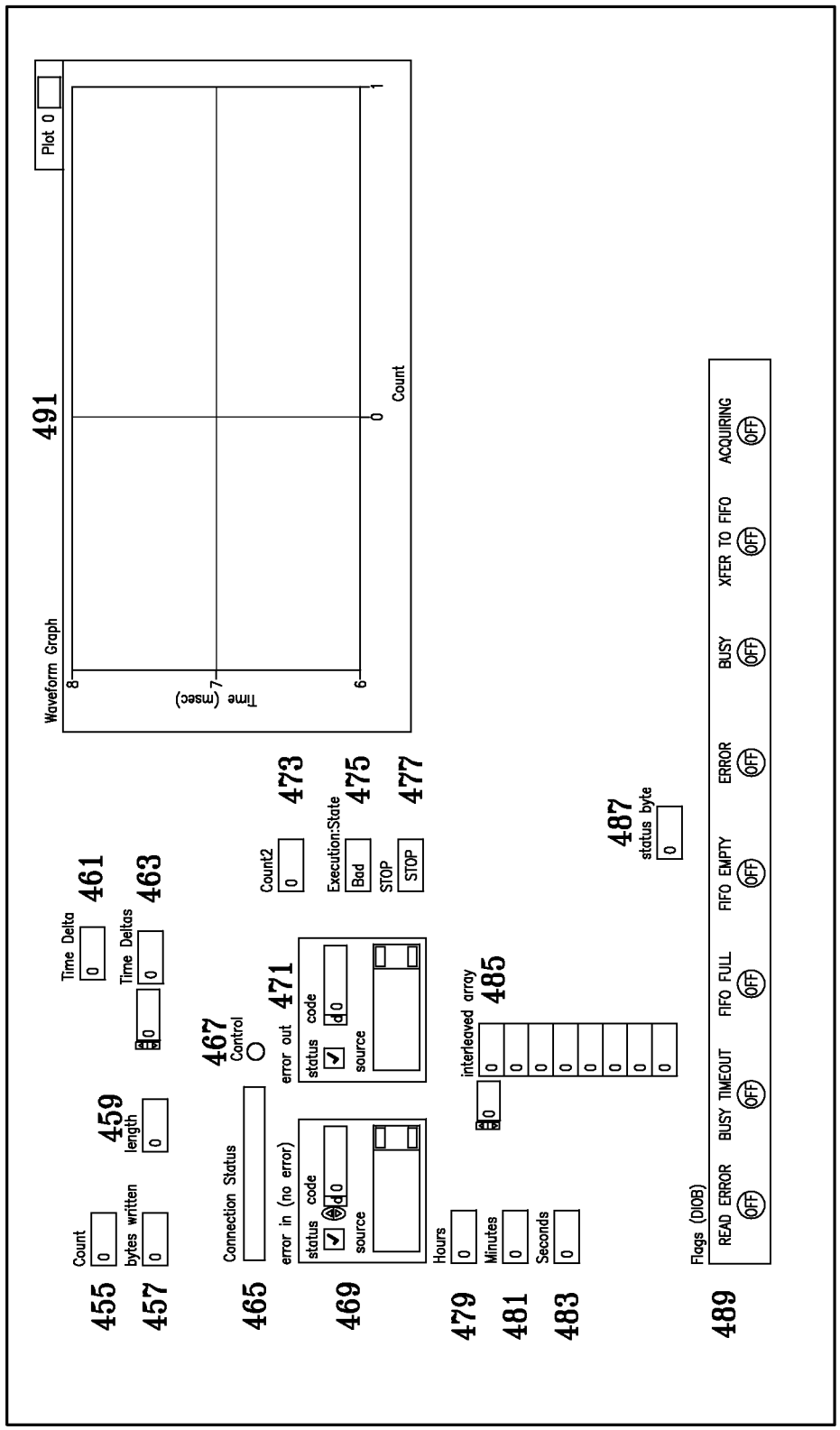
Figure 31:
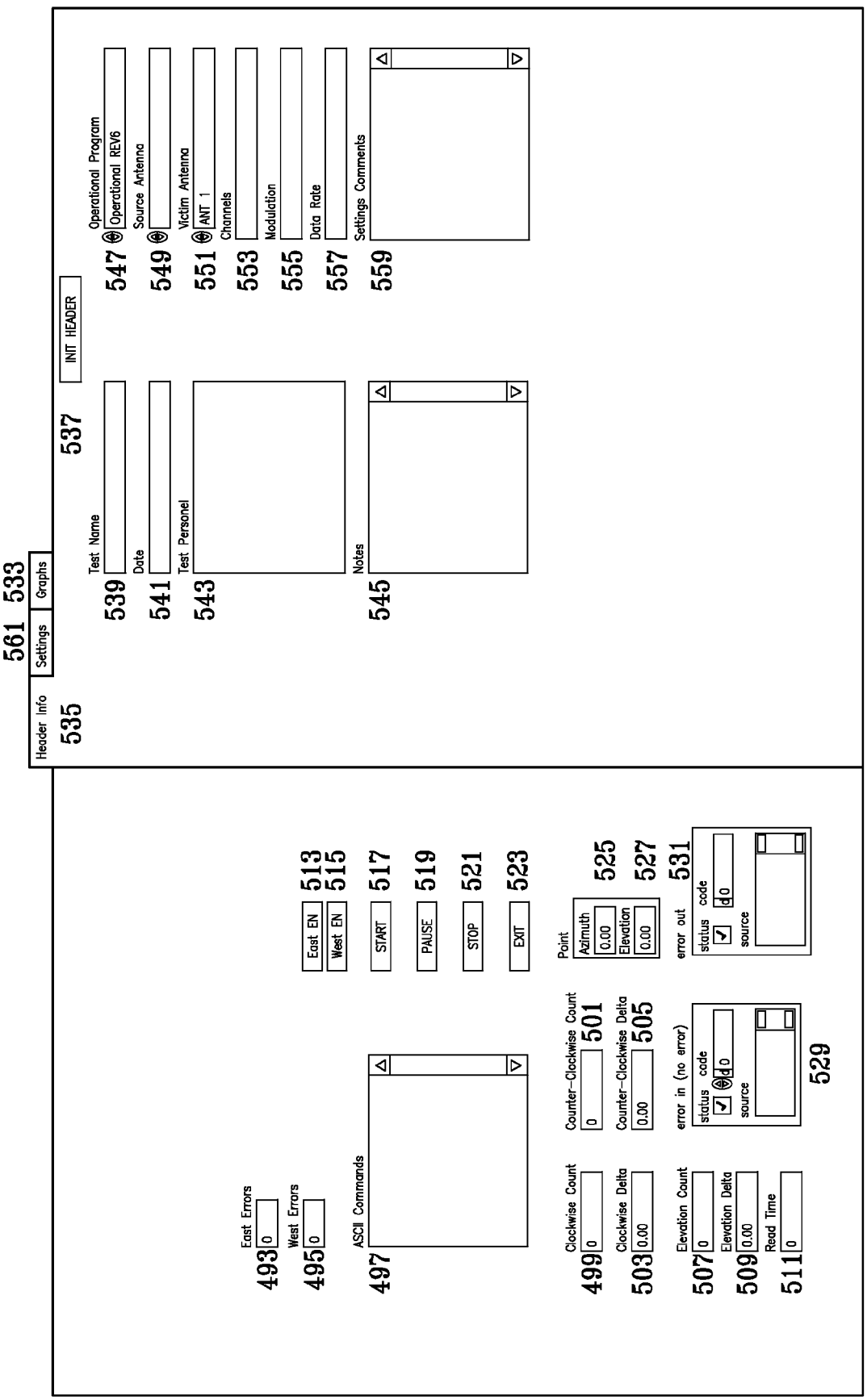

FIG. 30 shows a screen display of an AHU server page displaying a plurality of objects listed in Table 3. Generally, the AHU server page displays information about communications between the client and the server which may be used to troubleshoot performance, stop communications and reset AHU 274, 276. The AHU server page is displayed in DPU1 271, 273 when first and second remote receiver 335, 337 are activated in DPU2 265. The AHU server page is also displayed in DPU1 271, 273 during use of testing operations program 345.

Count 455 displays the number of times AHU 274, 276 is commanded to acquire data. Bites written 457 displays the number of bites written to the client for each data loop iteration. Length 459 displays the number of bites to be written to the client for each data loop iteration. Time delta 461 is the time in milliseconds to take data for one data loop iteration. Plan deltas 463 is the accumulated array of time delta. Connection Status 465 displays the connection status of DPU1 271, 273 and DPU2 265. Control LED 467, which may be true or false, indicates whether the remote connection has or does not have control. Error in 469 displays error information present before entering the routine. Error out 471 displays the errors present. Count2 473 counts the iterations of the remote control loop2 which monitors for activation of remote first and second receiver 331, 333. Execution: State 475 indicates whether errors are preventing the remote program from executing, whether the remote program is in memory but not running, and also whether the remote program is running. STOP 477 stops all loops. Hours 479, Minutes 481, and Seconds 483 display the amount of time in a data loop. Interleave array 485 is a U8 array of data taken every data loop iteration. Graph 491 displays counts versus time.

TABLE 3

| 455 | Count | Display count |
|---|---|---|
| 457 | bytes written | Display bytes written |
| 459 | length | Display length of bytes written |
| 461 | Time Delta | Display time delta |
| 463 | Time Deltas | Set number and amount of time deltas |
| 465 | Connection Status | Display connection status |
| 467 | Control | Display control status |
| 469 | Error in | Display status and assign status codes |
| 471 | Error out | Display status and assign status codes |
| 473 | Count2 | Counter for remote control loop iterations |
| 475 | Execution: State | Displays indications of remote control problems |
| 477 | STOP | Stops all loops |
| 479 | Hours | Display hours |
| 481 | Minutes | Display minutes |
| 483 | Seconds | Display seconds |
| 485 | Interleaved array | Set and display interleaved array |
| 487 | Status byte | Display status byte |
| 489 | Flags | Display flags |
| 491 | Waveform Graph | Display waveform graph |

FIGS. 31-34 disclose in greater detail the function and operation of one exemplary embodiment of operations program 345. Operations program 345 is used to set up and conduct tests as was previously described with reference to FIGS. 22-23. The functions of operations program 345 will now be summarized and later explained in detail. The operator selects Transmitter 335 from the main menu to open the program. During a test, the operator receives feedback as to the number of errors, source antenna location, and receiver versus PSK detect signals. The operator has the ability to pause or stop testing before the entire test range is complete. The program may be implemented in a variety of ways depending on the desired method of transmission of data between AHU 274, 276 and the system controller unit. The screen displays display a plurality of objects, listed in Table 4, and one tab display with three options labeled "Header Info," "Settings" and "Graphs."

The operator then selects Settings tab 561 (shown FIG. 32) and activates Keyboard 569 to enable keyboard mode. Enabling keyboard mode allows every key pressed on DPU2 to be sent to source antenna control system 263. Next, the operator activates source antenna 261, sets up transmission frequency, sets up transmitter attenuation to determine the power transmitted out of source antenna 261, and orients source antenna 261 to the desired starting position using the keyboard to adjust to azimuth start point and to adjust elevation start point. The operator then selects Header Info tab 535 (shown in FIG. 31) and fills the appropriate field to record test parameters. Alternatively, the operator may select Settings tab 561 to load previous test files. The operator then activates START 517 to begin the test.

In one embodiment, source antenna 261 may comprise two transmitters labeled "East" and "West". These labels are arbitrary and other labels, such as north/south, first/second, red/ blue and others may be used. East Errors 493 displays the number of errors during transmission from the East transmitter during the test event. West Errors 495 displays the number of errors during transmission from the West transmitter during a test event. ASCII Commands 497 displays strings of ASCII commands sent over to keyboard emulator 267. Clockwise Count 499 displays the current clockwise step number of source antenna 261 sweep dimension. Counter-Clockwise Count 501 displays the current counter-clockwise step number of source antenna 261 sweep dimension. Clockwise and Counter-Clockwise delta 503, 505 display the difference between source antenna pointing angles step of the primary sweep dimension when sweeping clockwise and counterclockwise, respectively. Elevation Count 507 displays the current elevation step number. Elevation Delta 509 displays the difference between source antenna elevation pointing angles. Read Time 511 displays in milliseconds the time required to read data from a TCP connection. East EN 513 and West EN 515 enable data transmission from the East and West transmitters. START 517 initiates testing.

Before tests actually begins, a pop-up window instructs the operator to verify that the system is properly set up. Upon confirmation, the test begins in accordance with defined settings. PAUSE 519 pauses a test in progress and resumes a paused test. STOP 521 stops testing. Azimuth 525 displays the desired source antenna azimuth pointing angle. Elevation 527 displays the desired antenna elevation pointing angle. Error in 529 displays error information present before entering the routine. Error out 531 displays errors present during operation of the program.

TABLE 4

| | | |
|---|---|---|
| 493 | East Errors | Display East Errors |
| 495 | West Errors | Display West Errors |
| 497 | ASCII Commands | Add ASCII Commands |
| 499 | Clockwise Count | Display Clockwise Count |
| 501 | Counter-Clockwise Count | Display Counter-Clockwise Count |
| 503 | Clockwise Delta | Display Clockwise Delta |
| 505 | Counter-Clockwise Delta | Display Counter-Clockwise Delta |
| 507 | Elevation Count | Display Elevation Count |
| 509 | Elevation Delta | Display Elevation Delta |
| 511 | Read Time | Display Read Time |
| 513 | East EN | Activate to enable East AHU transmissions |
| 515 | West EN | Activate to enable West AHU transmissions |
| 517 | START | Activate START |
| 519 | PAUSE | Activate PAUSE |
| 521 | STOP | Activate STOP |
| 523 | EXIT | Activate to exit |
| 525 | Azimuth | Display Azimuth |
| 527 | Elevation | Display Elevation |
| 529 | Error in | Display errors and set error codes |
| 531 | Error out | Display errors and set error codes |

The objects shown in the Header Info tab 535, shown in Table 5, will now be described. INIT HEADER 537 returns all controls and indicators in Header Info tab 535 to default settings. Test Name 539 enables the addition of a test name which will be used to create all the files associated with a test. Operations program 547 enables the operator to select a source antenna system which detection system 259 will interface with. This enables detection system 259 to select proper commands to send to source antenna control system 263 which may be different depending on different models. The remaining objects allow an operator to select system characteristics for historical reference and documentation purposes.

TABLE 5

| | | |
|---|---|---|
| 537 | INIT HEADER | Activate to reset all fields |
| 539 | Test Name | Set Test Name |
| 541 | Date | Set Date |
| 543 | Test Personel | Set Test Personel |
| 545 | Notes | Set Notes |
| 547 | Operational Program | Select Operational Program |
| 549 | Source Antenna | Select Source Antenna |
| 551 | Target Antenna | Select Victim Antenna |
| 553 | Channels | Set Channels |
| 555 | Modulation | Set Modulation |
| 557 | Data Rate | Set Data Rate |
| 559 | Settings Comments | Set Settings Comments |

Figure 32:
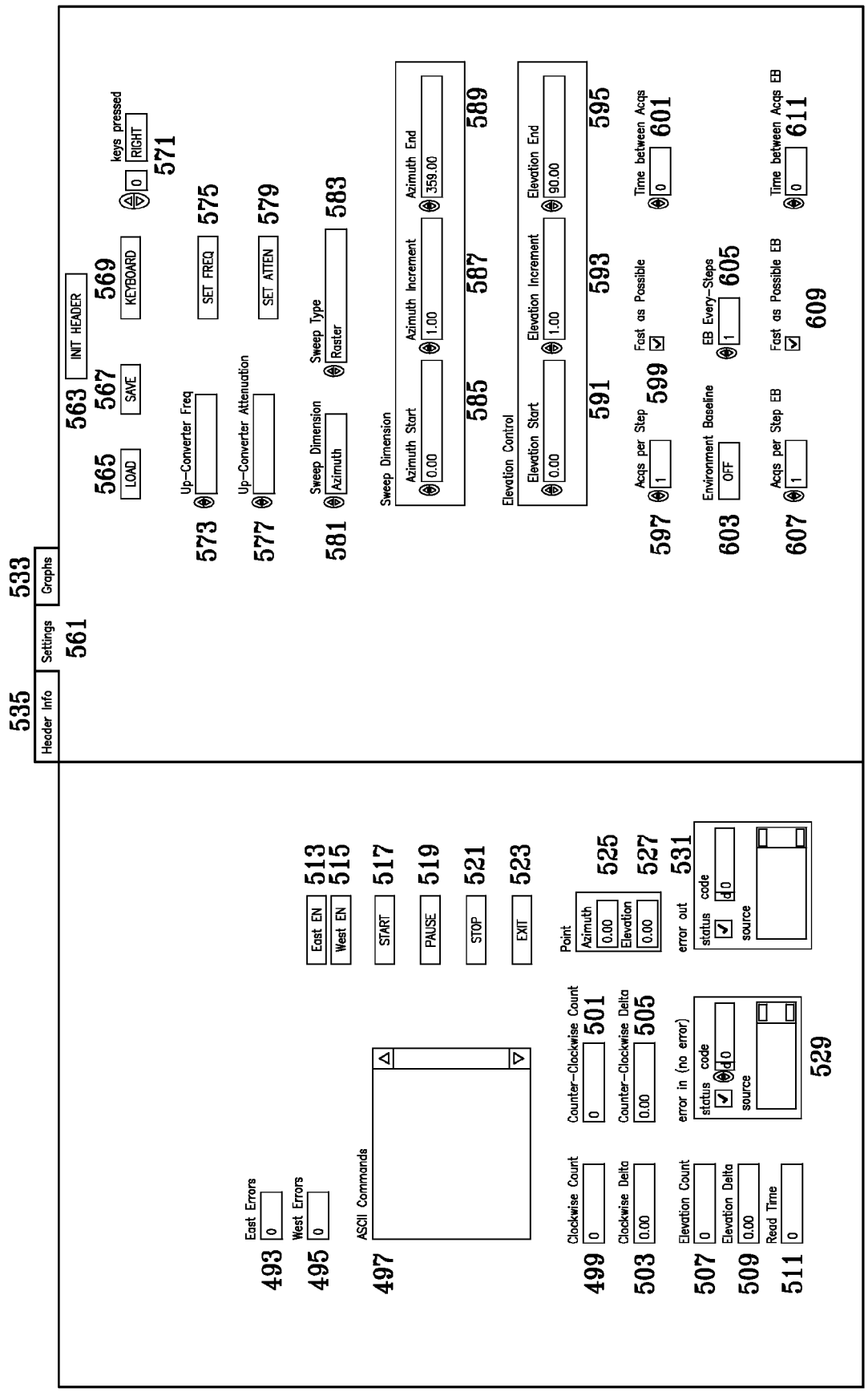

FIG. 32 illustrates Settings tab 561. Objects displayed in Settings tab 561 are listed in Table 6. LOAD 565 launches a browser to enable the operator to select an existing settings file to load. SAVE 567 enables the operator to save control settings in a settings file. KEYBOARD 569 enables the keyboard mode, which enables DPU2 265 to virtually replace the source antenna controller keyboard. All setting controls are disabled while in keyboard mode. Keys pressed 571, in the keyboard mode, show the current button or buttons being pressed on DPU2 265. If no buttons are being pressed, or if the system is not in keyboard mode, the indicator will be shaded and inactive.

UP Converter Freq 573 allows the operator to input a desired source antenna 261 frequency setting. The number will be recorded in the settings file for reference. The operator must manually send the command to the source antenna system by activating SET FREQ 575. Attenuation is set in the same manner as Up-converter frequency. The numeric control and checkbox controls listed in Table 6 are activated to set a scanning pattern. These parameters establish the sample points (range of positions of the source antenna) which may, in one embodiment, include sweep dimension, type, azimuth start, azimuth increment, azimuth end, elevation start, elevation increment, and elevation end. Sweep types may include circular, reverse circular, raster, and reverse raster, among others. These parameters also establish the number of acquisitions to be made at each sample point, whether to scan as fast as possible or to delay between acquisitions, whether to measure EB and, if so, how many acquisitions to capture, on what interval and how fast to do so. Only one EB acquisition step will be made per sweep if the selected number of sample points between EB acquisitions is greater than the number of antenna steps per sweep.

TABLE 6

| | |
|---|---|
| 563 | INIT HEADER |
| 565 | LOAD |
| 567 | SAVE |
| 569 | KEYBOARD |
| 571 | Keys Pressed |
| 573 | Up-Converter Freq |
| 575 | SET FREQ |
| 577 | Up-Converter Attenuation |
| 579 | SET ATTEN |
| 581 | Sweep Dimension |
| 583 | Sweep Type |
| 585 | Azimuth Start |
| 587 | Azimuth Increment |
| 589 | Azimuth End |
| 591 | Elevation Start |
| 593 | Elevation Increment |
| 595 | Elevation End |
| 597 | Acqs per Step |
| 599 | Fast as Possible |

TABLE 6-continued

| | |
|---|---|
| 601 | Time between Acqs |
| 603 | Environment Baseline |
| 605 | EB Every-Steps |
| 607 | Acqs per Step EB |
| 609 | Fast as Possible EB |
| 611 | Time between Acqs EB |

Figure 33:
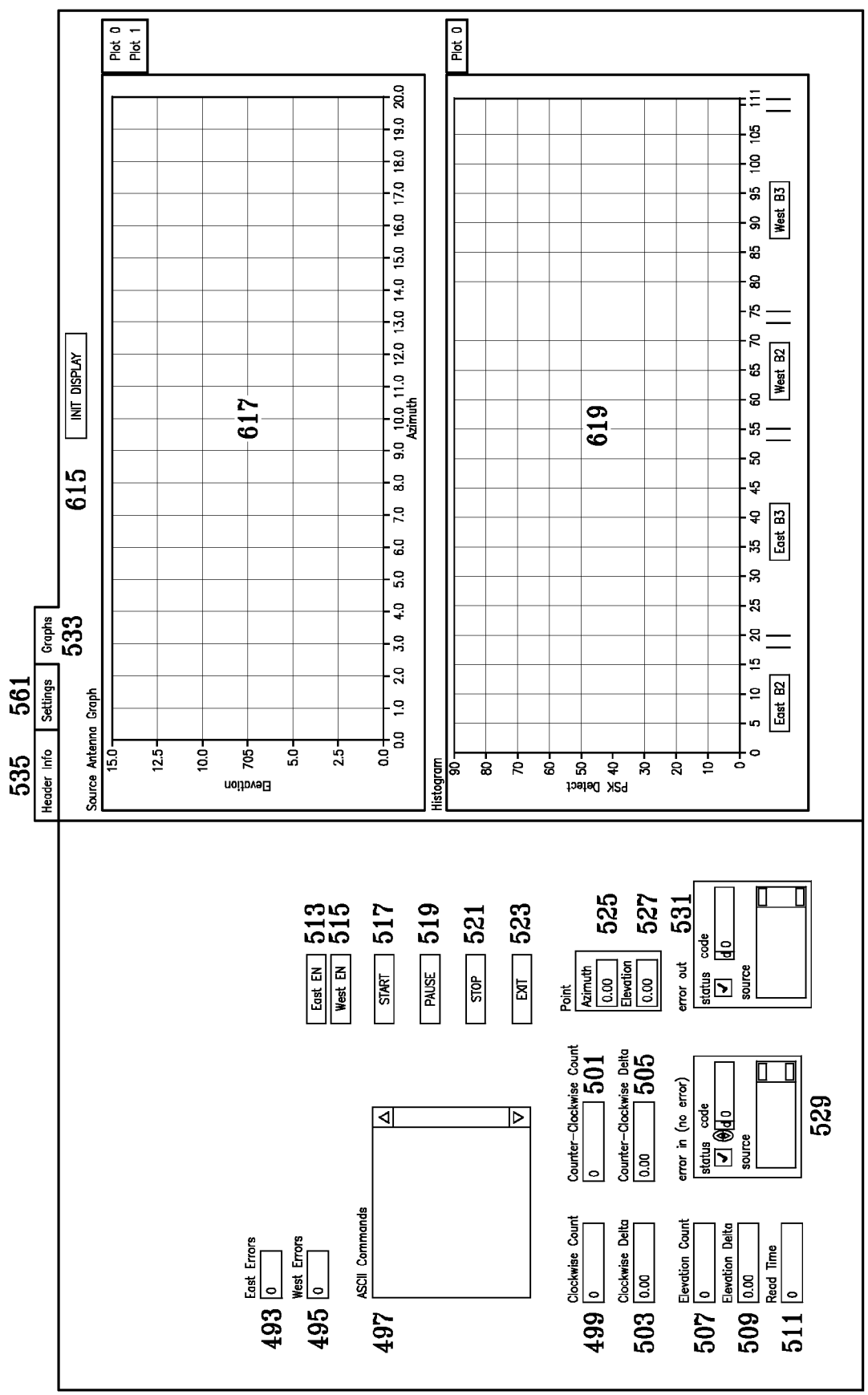

FIG. 33 is a screen display showing Graphs tab 533 and displaying a plurality of objects listed in Table 7. Objects INIT DISPLAY 615, plot 617 and plot 619 are shown. Upon activation of INIT DISPLAY 615, acquired data is plotted in plot 617, 619. Plot 617 displays the overall test duration status. A red dot is placed at every source antenna pointing angle (sample point) over the entire test range. White dots replace red dots as the source antenna scans the pattern to show what portion of the test has been accomplished and what portion is yet to be performed.

TABLE 7

| | | |
|---|---|---|
| 615 | INIT DISPLAY | Activate to initiate display |
| 617 | EL/AZ graph | Display orientation of source antenna |
| 619 | PSK Detect | Display histogram of PSK detect signal |

Figure 42:
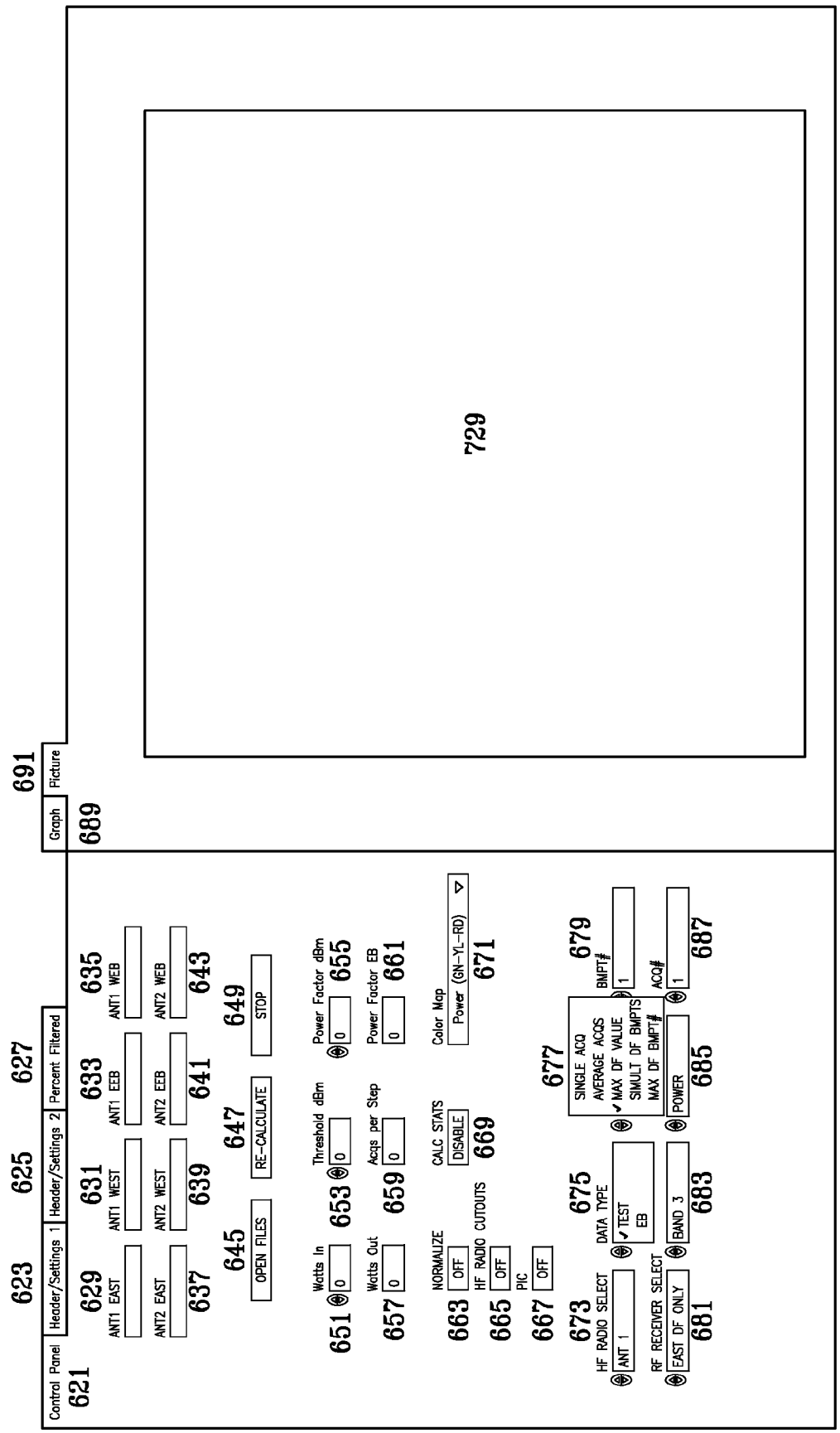
Figure 43:
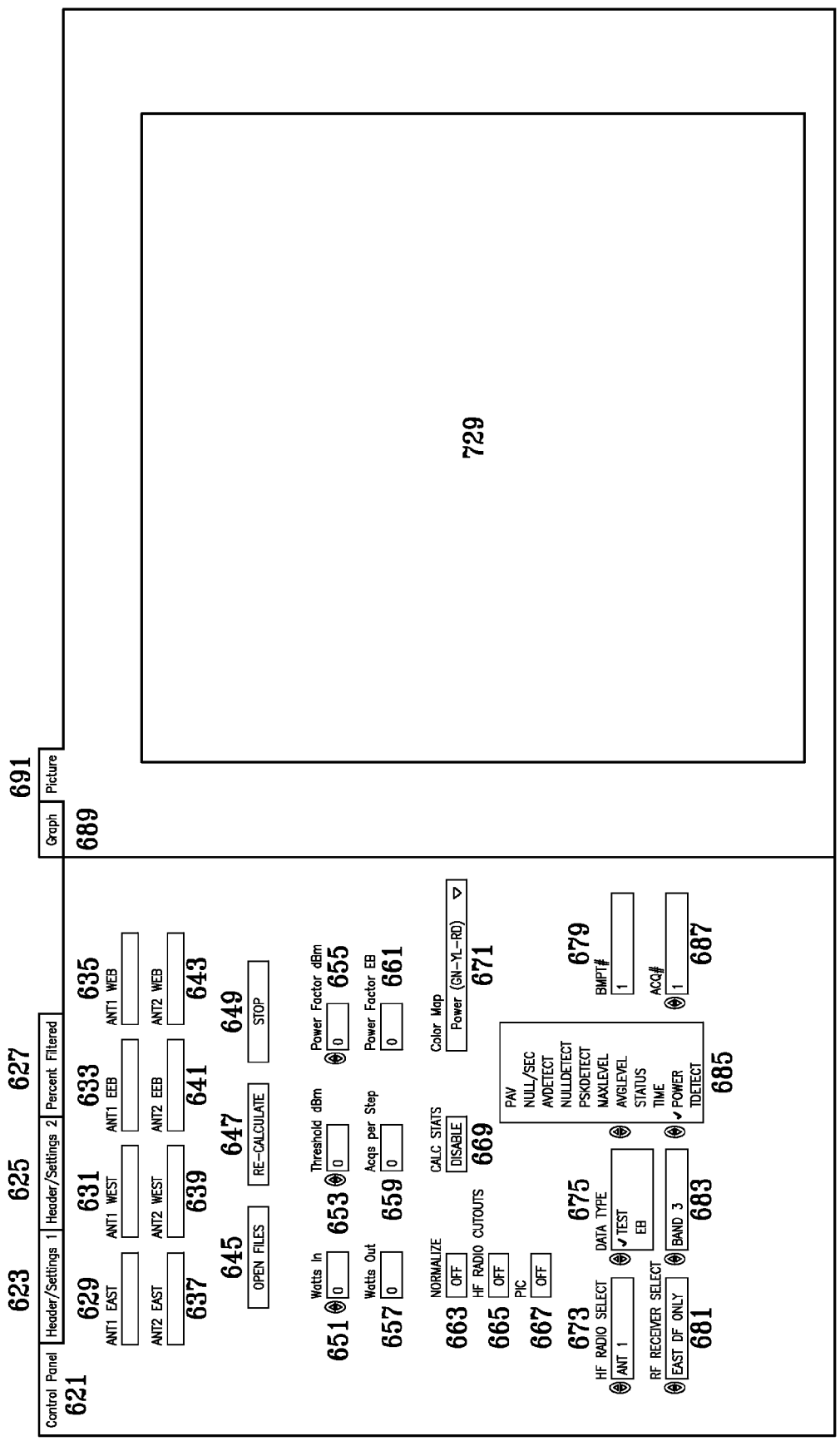
Figure 44:
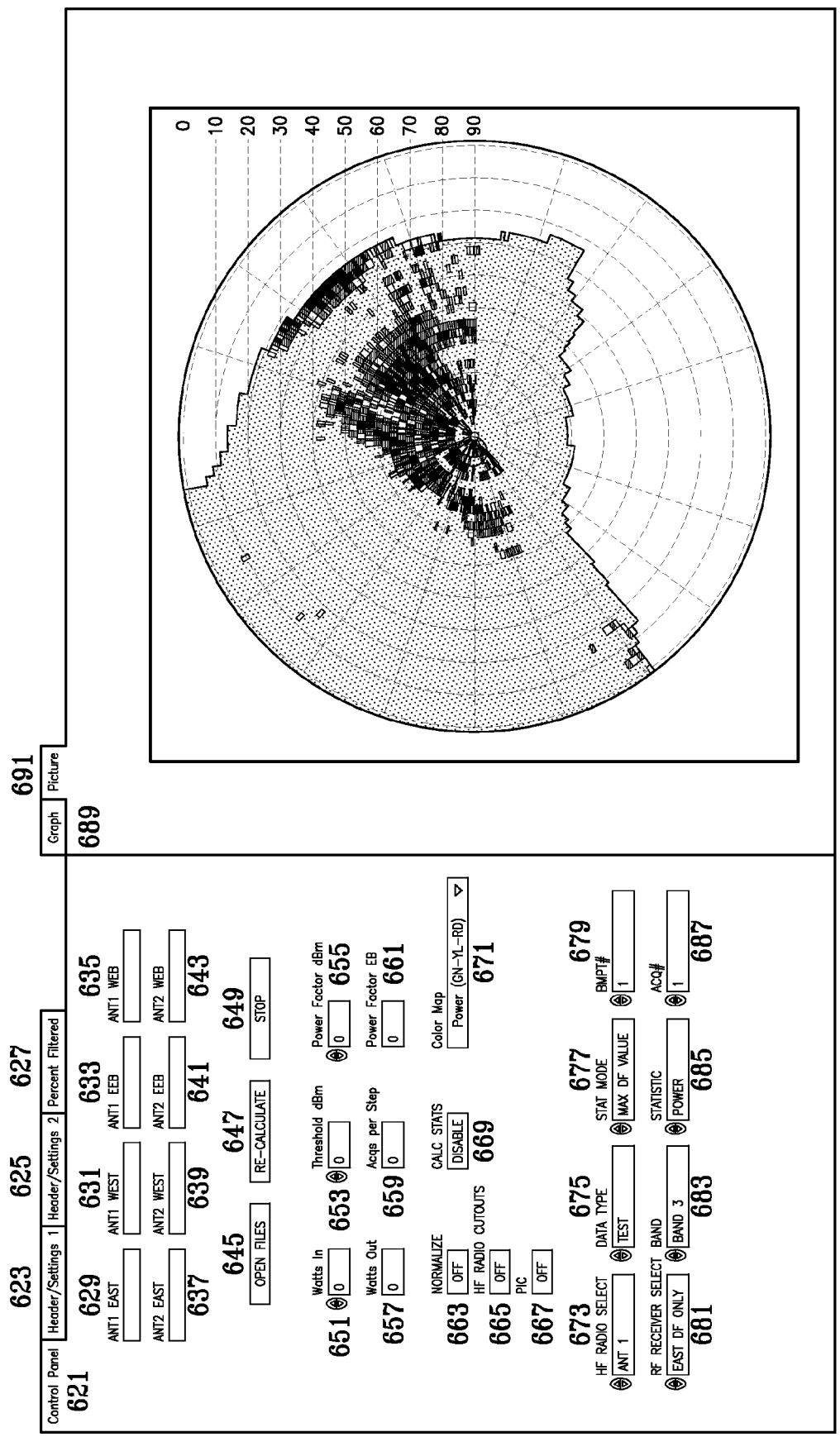
Figure 45:
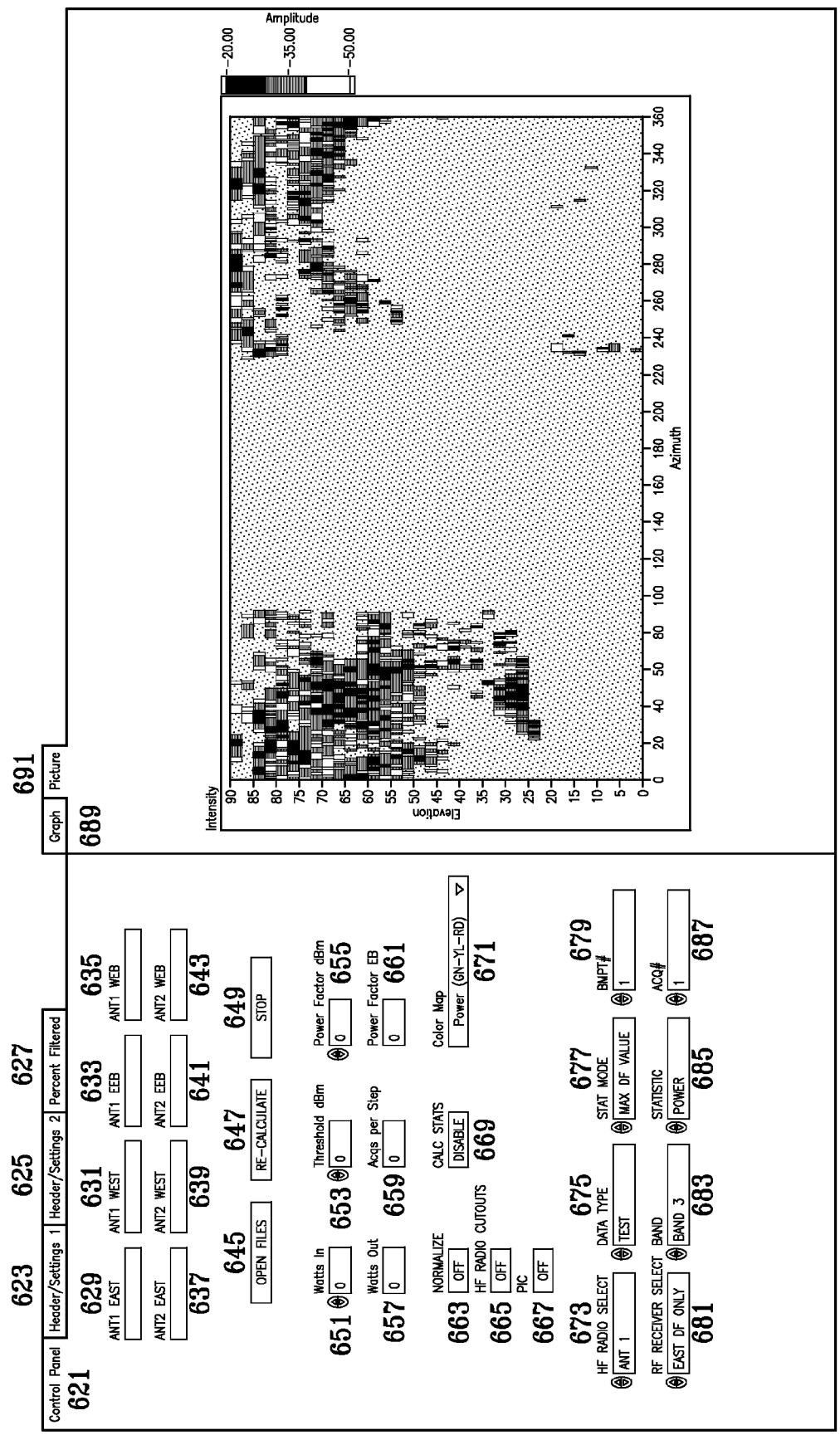

FIGS. 34-45 illustrate the functions of analysis program 343. FIGS. 34-43 illustrate how to select data for display, and FIGS. 44-45 illustrate data graphically in different formats. A plurality of objects including a tab display with four options labeled "Control Panel," "Header/Settings 1," "Header/Settings 2" and "Percent Filtered" and a second tab display with two options labeled "Graph" and "Picture" are provided via GUI 307 to facilitate data analysis. The operator may view test and system settings and may view a graphical display of the EMI or test data. Analysis involves analyzing and displaying EMI data by receiver and by band, showing EB data in the same way as EMI data is shown, changing the graphing display, showing receivers/antennas with highest EMI intensity at various AZ/EL levels and indicating how many receivers were simultaneously above the EMI threshold by AZ/EL level via a graph using filter settings. Analysis may also include sampling and displaying data by polar or rectangular graph form from one or all AZ/EL levels points using green, yellow, red colors to signify EMI intensity. Other symbols may be used to distinguish categories, e.g. high, medium, low, of intensity levels. For example, numbers and geometric shaped objects may be used.

Figure 34:
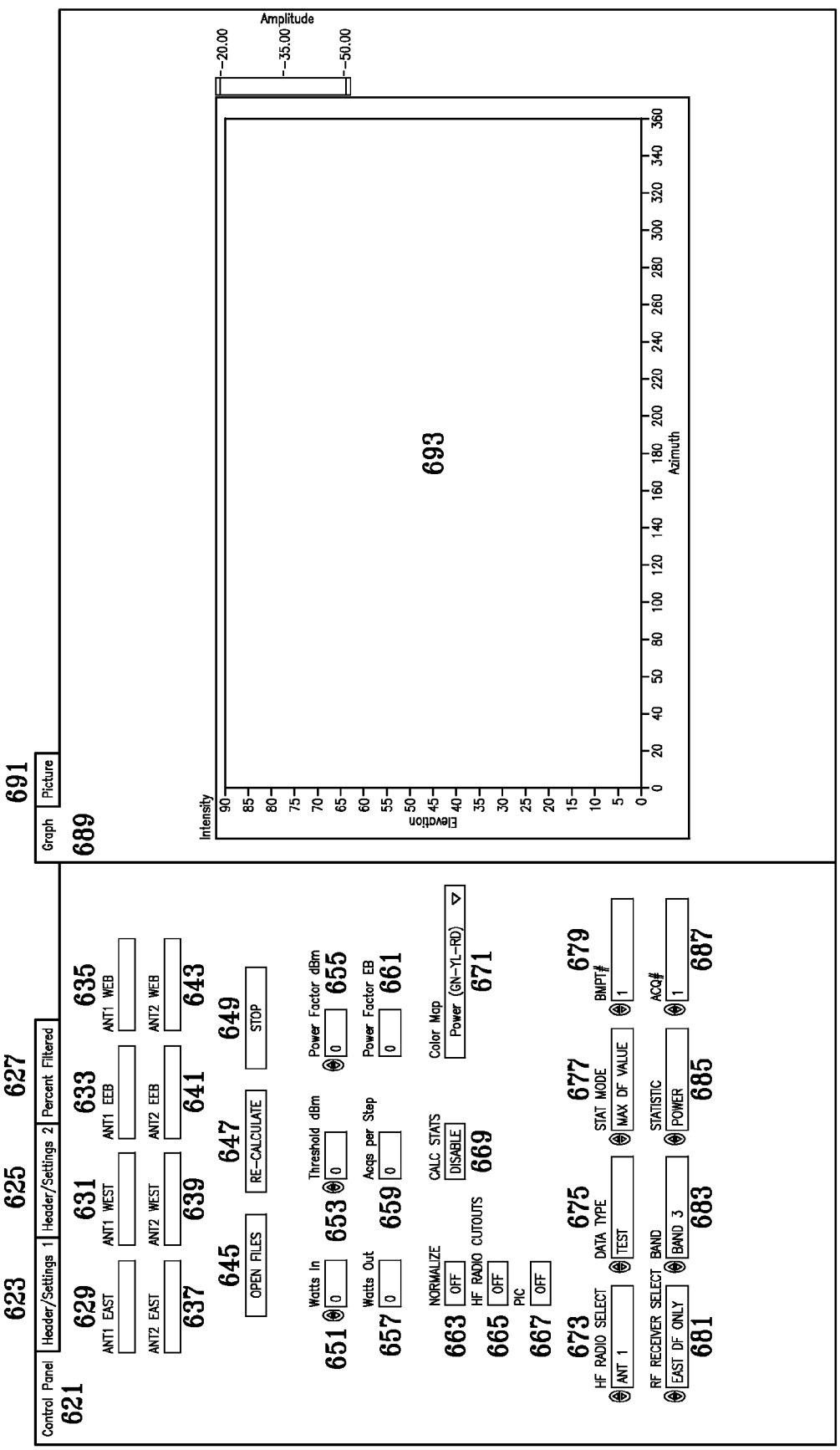

FIG. 34 is a screen display of control panel tab 621 illustrating objects for selecting receivers and display settings for data corresponding to a selected receiver. In an exemplary embodiment, data corresponding to a selected one of object 629, 631, 633, 635, 637, 639, 641, 643 may be analyzed by activating the object and then activating OPEN FILES 645. Object 629, 631, 633, 635, 637, 639, 641, 643 select data subsets corresponding to one of eight receivers labeled ANT1 EAST, ANT1 WEST, ANT1 EEB, ANT1 WEB, ANT2 EAST, ANT2 WEST, ANT2 EEB, ANT2 WEB. An antenna may include more or less receivers which may labeled in any way.

Data may be filtered by selecting preset values in object 651, 653, 655 corresponding to source and target antenna 261, 275, 277 transmission and reception values including such as, for example, power level (Watts in 651), threshold (threshold dBm 653), and power factor (power factor dBm 655). Object 657, 659, 661 display test characteristics set up as described above with reference to operations program 345 including, for example, power out, acquisitions per step, and EB power factor. RE-CALCULATE 647 resets the display of data and STOP 649 ends analysis based on a particular set of analysis parameters.

Data may be displayed in various ways by activating one or more of a plurality of objects. NORMALIZE 663 reduces graph variations (noise) by normalizing data, HF RADIO CUTOUTS 665 presents a cutout with the data. In one embodiment, a cutout is created by mapping AZ/EL points at which source antenna 261 does not transmit. The map of AZ/EL points may be stored in a text file having an extension ".cut" as described with reference to table 349 in FIG. 18. The file, or information to create it, may be provided by control unit 263 or may be created from the orientation data provided by DPU2 265 or may be created in any known manner. When EMI data is plotted against AZ/EL values, the cutout may be plotted in a distinguishable manner, for example using a different plotting color. EMI values above background noise are not expected at AZ/EL plot points corresponding to source antenna 261 orientations at which a transmission did not occur. Presence of such EMI values would indicate malfunction of a receiver, because the receiver appears to receive a target signal when such signal is known not to exist. Data from the malfunctioning receiver may be masked or removed from the plot by applying a filter as disclosed with reference to FIG. 37. PIC 667 disables or enables display of picture 729, shown in FIG. 38, and CALC STATS 669 enables and disables routines that calculate statistics, which may be useful to speed analysis. Color map 671 changes colors used to map data in picture 729. Object 673, 675, 677, 679, 681, 683, 685, 687 may be activated to select a specific receiver, data type, statistic and acquisition cluster number for display as illustrated in more detail below with reference to FIGS. 38-43. The labels for these objects vary with the type of antennas used.

Figure 35:
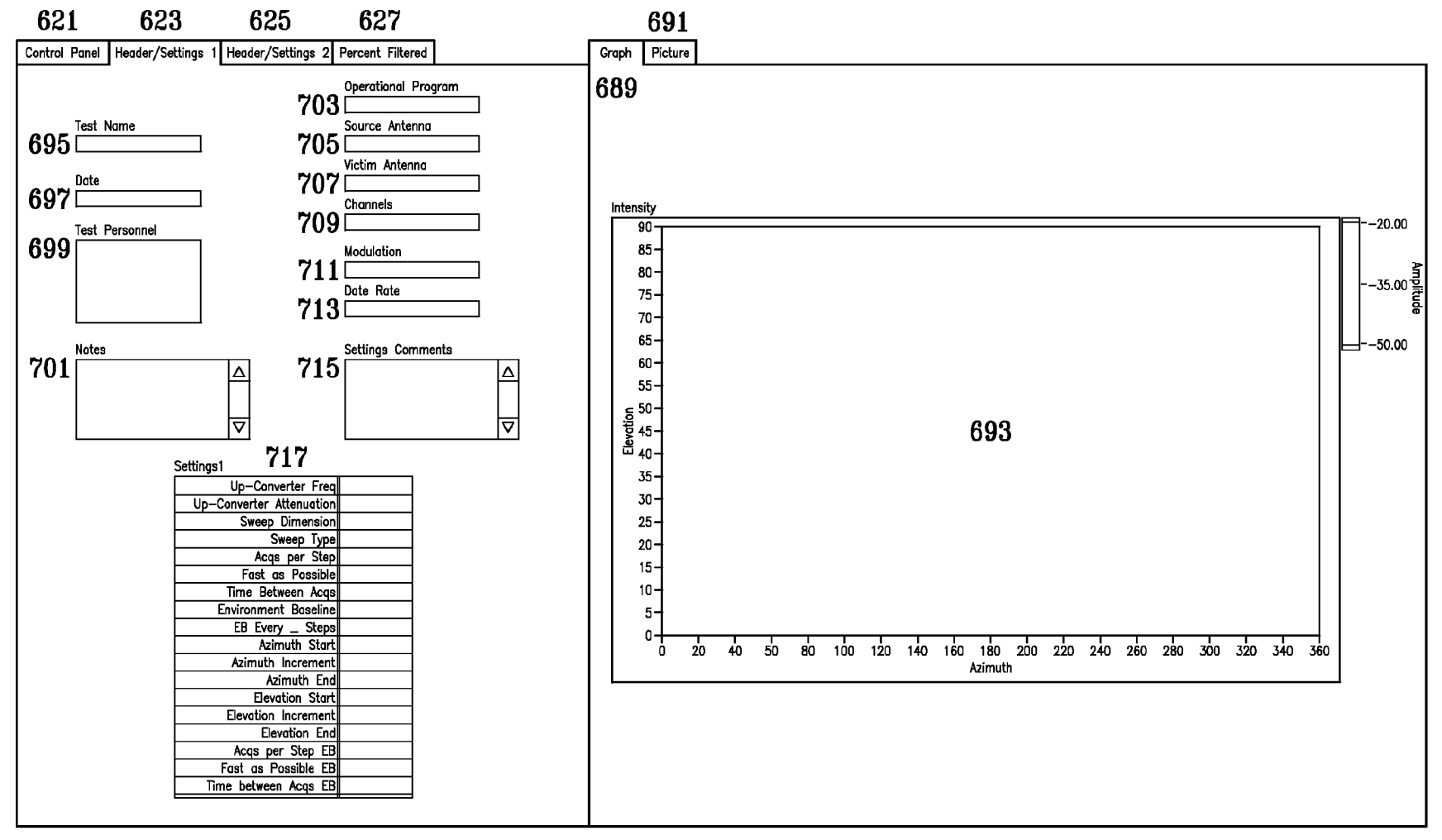
Figure 36:
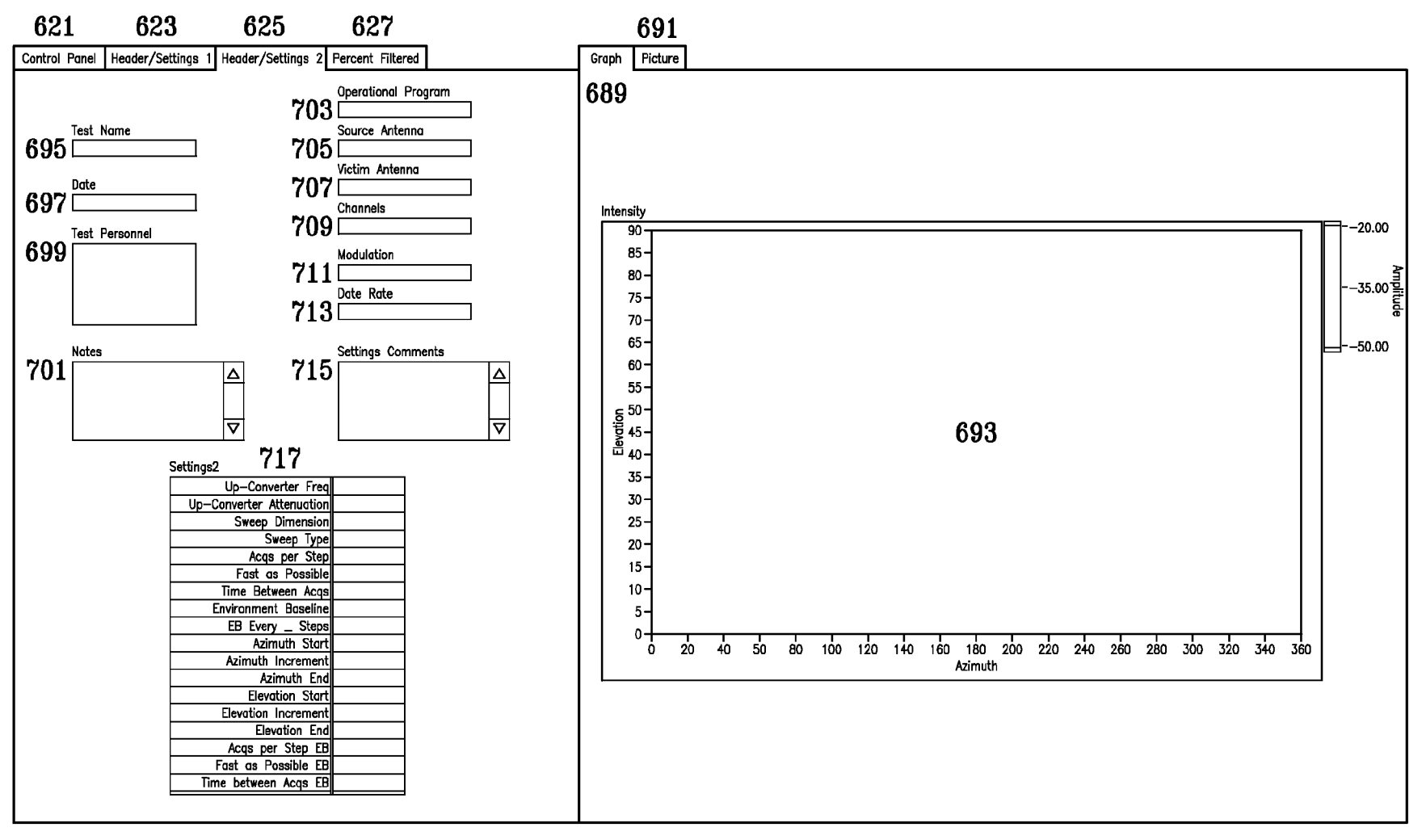

FIGS. 35 and 36 are screen displays of header/settings 1 tab 623 and header/settings 2 tab 625 illustrating objects displaying header settings and test settings corresponding to test data files having data obtained during transmission from one or a second transmitter in a source antenna 261. More or less tabs may be used depending on the number of transmitters used.

Figure 37:
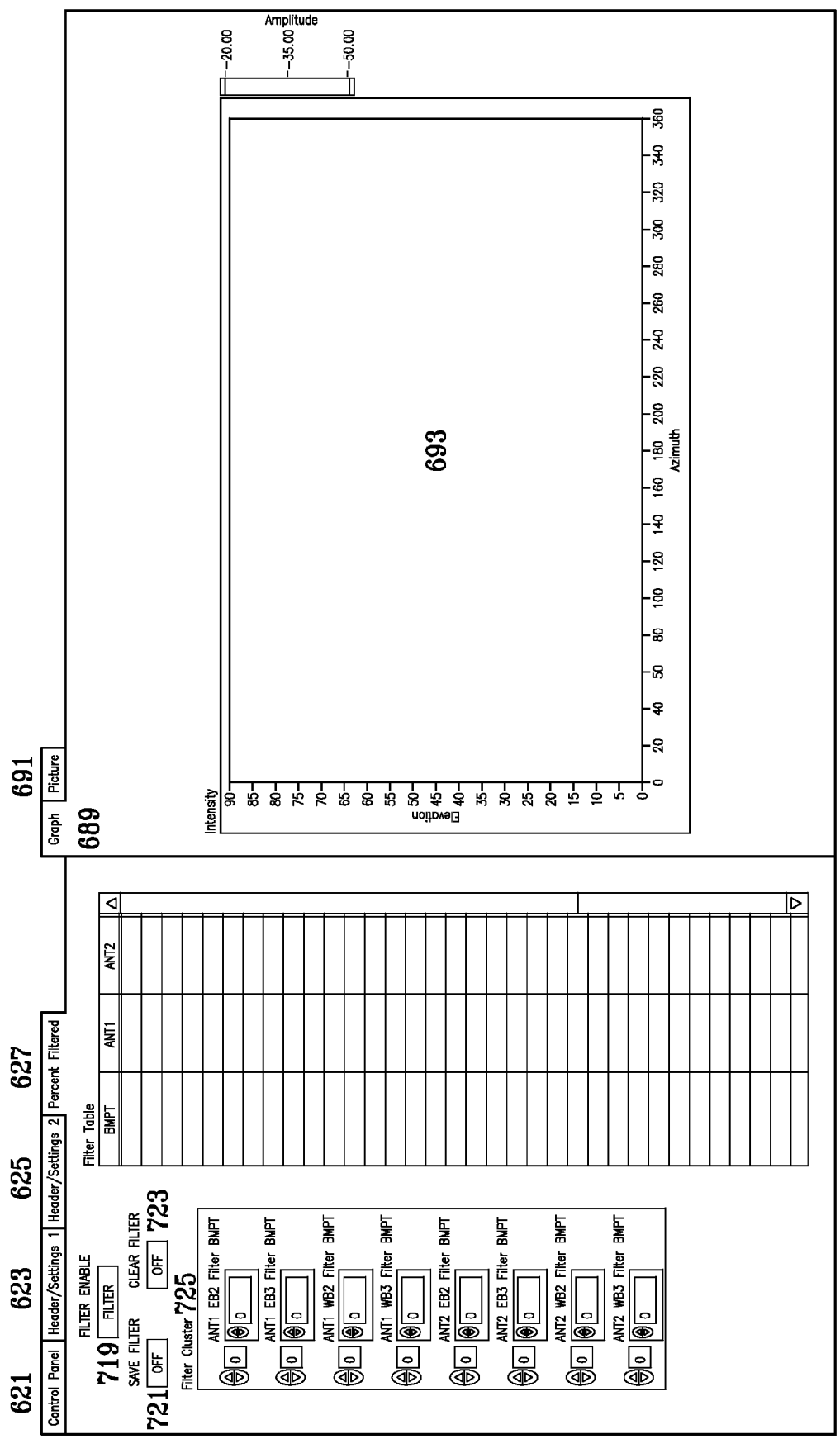

FIG. 37 is a screen display of percent filtered tab 627 displaying a plurality of objects for filtering data. Several forms of filtering may be applied. The Filter Table shows the percentage of data filtered for each transmitter/receiver combination which may be used to confirm that filtering is occurring. In one embodiment, filters may be applied to mask data from individual receivers. Data from each receiver may be first plotted along with a cutout to determine whether to filter the receiver's data. EMI data may comprise data from one or more receivers. Receivers may be provided which receive different types of target signals. Receivers may be oriented to receive from different directions a target signal which is the signal transmitted from source antenna 261. The target signal may bounce off a surface before being received by a receiver. Data from multiple receivers and from multiple target antennas may be plotted concurrently to obtain an image representing all of the EMI information received by them. If one or more receivers malfunction, data from the malfunctioning receiver may corrupt the EMI representation by presenting EMI values above background noise where none exist. A malfunctioning receiver may be identified by application of a cutout as described with reference to FIG. 34 and its data may be masked using a filter. In one embodiment, data is masked by changing the EMI value from a high value to the lowest value category or the lowest intensity value in the display. In another embodiment, data is masked by plotting masked data with an identifying color or symbol. In yet another embodiment, masked data is not plotted.

In another embodiment, data may also be filtered and masked by setting threshold parameters of detection cards based on the characteristics of various modulation types. When detecting PSK signals, for example, as described with reference to FIG. 14, a PSK detect signal is produced based on comparison of various counts related to active video received to predetermined parameters. The active video received count information may also be compared to predetermined parameters to filter data. A processing sequence and a user interface may be provided to adjust the predetermined parameter values to change filtering criteria. Masking may be applied in the manner described in relation to masking data from specific receivers. Alternatively, predetermined parameter values to filter data may be programmed based on experiential knowledge obtained using a particular detection system.

As described previously with reference to a PSK detection card, a PAV comparator compares a VAT count to a predetermined reference to produce an AV detect signal when the active video content exceeds the reference value, and a NULL comparator compares a NULL count to a second predetermined reference, or NPS reference, and produces a NULL detect signal when the signal exceeds the NPS reference. Another pair of threshold reference values, or filter values, may be set by a user interacting using a user interface to interact with a processing sequence. The processing sequence compares filter values to counts and filters data when filter values achieve a predetermined relationship related to the counts. Filtering may involve changing values of the AV detect signal, the Null detect signal and/or the EMI values. Filter values may be set higher or lower to customize how EMI values from the receiver are plotted. A signal representative of EMI level may be obtained from an exemplary detection portion as shown in FIG. 14 where both average and maximum EMI levels are output in addition to an AV detect signal, a percentage above video, or PAV, signal, a NULL detect signal, and a Nulls per second, or NPS, signal.

In one exemplary embodiment, a PAV filter may be created by setting a PAV filter value. A processing sequence compares the PAV filter value to the PAV signal and overrides the AV detect signal and the EMI value if the PAV signal exceeds the PAV filter value. For example, if the PAV filter value is set to 99%, the PAV detect signal and the average and max EMI levels may be masked to prevent presentation of EMI values corresponding to PAV signals exceeding 99%. This filtering technique may be useful when a receiver outputs a PAV signal equal to 100% for all AZ/EL points which may be highly improbable. In an analogous manner, a NPS filter may be created by setting a NPS filter value.

Filtering may be accomplished by enabling FILTER ENABLE 719 and specifying receivers whose data will be filtered. Dials or buttons or other interfaces may be provided to facilitate selection of receivers for filtering. A user interface displays Filter Cluster 725 showing eight groups of receivers formed based on transmitter and band configurations. Groups may be formed in other ways or not at all. A group may have any number of receivers, i.e. one, five, ten, fifteen, twenty and more receivers. Each receiver is assigned a number for convenience. Selection may be performed by activating one or several dials in Filter Cluster 725. The left-most dial in a group indicates how many receivers are filtered. The right-most dial in a group selects a receiver number. Initially, a user dials a receiver number, i.e. 3, so that the dials show "0, 3" to filter receiver number 3. To filter another receiver in the group, the user increments the left dial and selects a receiver number, i.e. 5, so that the dials show "1, 5". A processing sequence records the selected information and another processing sequence applies the selected information to change the intensity plot based on masking criteria.

Once dials in Filter Cluster 725 have been set, the settings can be saved to a filter file having extension ".flt", as described with reference to table 349 in FIG. 18, by activating SAVE FILTER 721. In the embodiment shown, one filter file is created which is used to filter the desired receivers when the filter is enabled. In another embodiment, a plurality of filter files may be created and the user may select from the plurality of filter files a desirable filter. CLEAR FILTER 723 resets the dials and removes filters.

Figure 38:
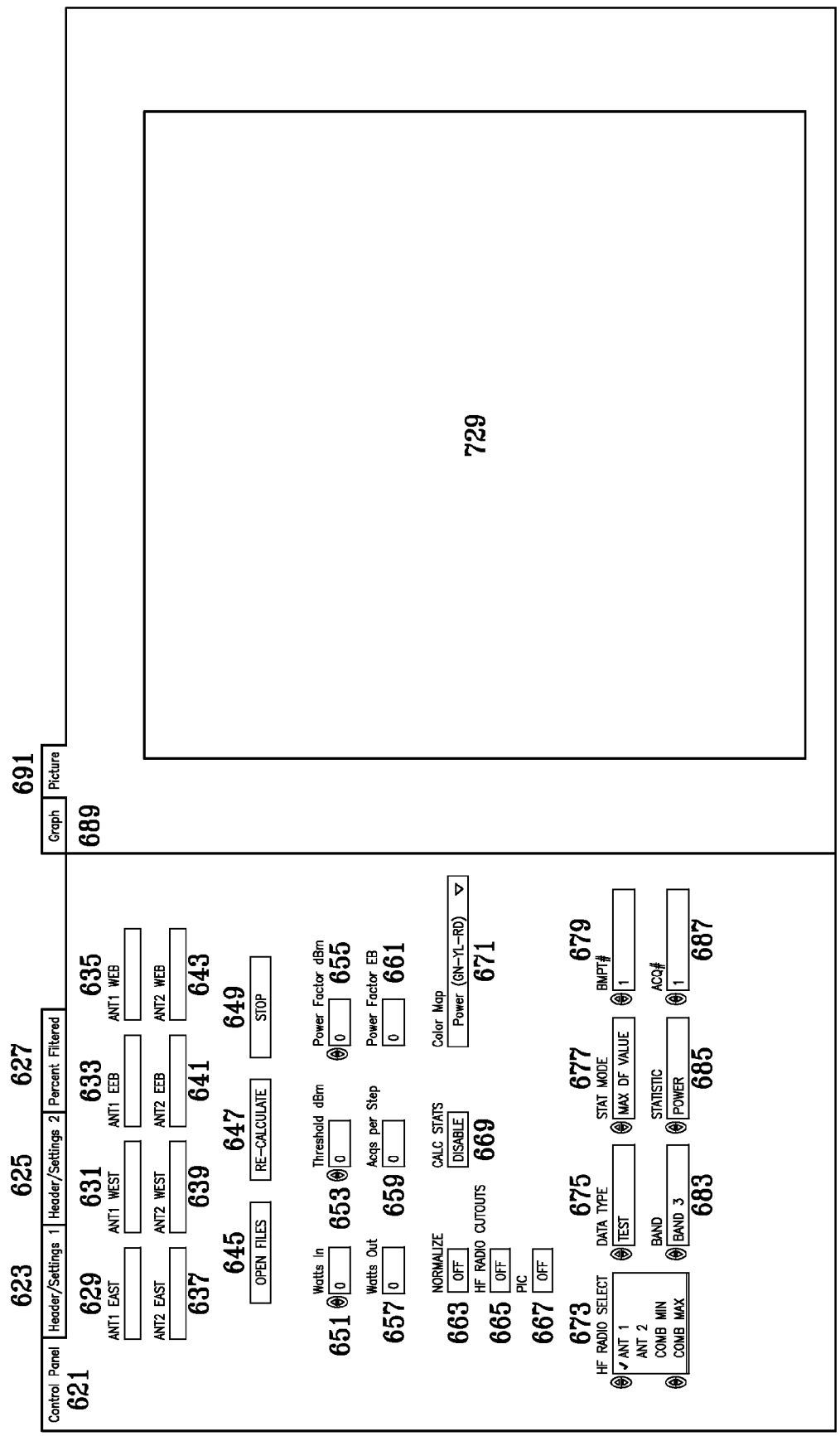
Figure 39:
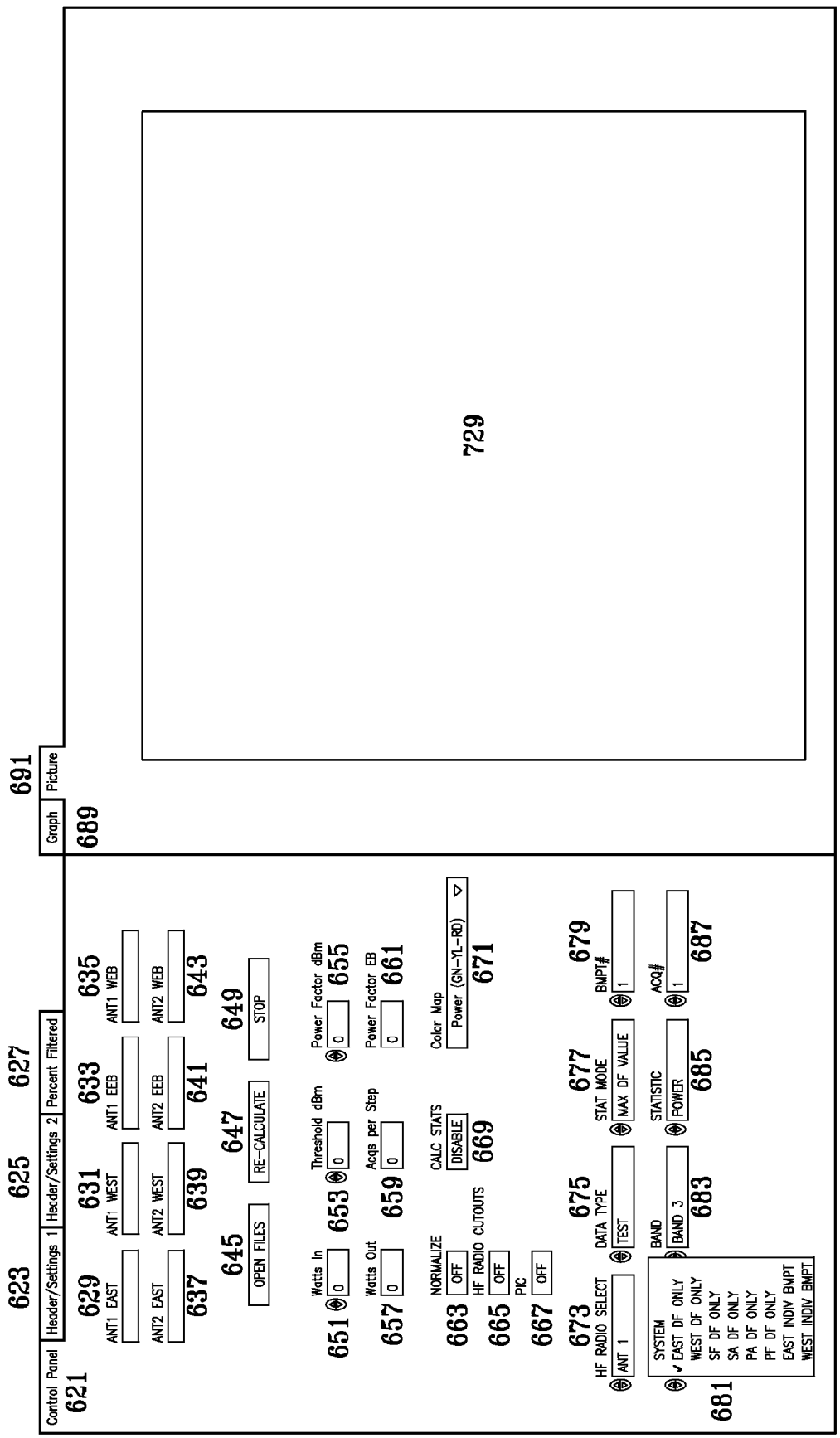

FIGS. 38-43 are screen displays of control panel 621 illustrating various options for selecting data subsets for display and analysis. HF RADIO SELECT 673 enables the operator to select subsets corresponding to each transmitter, combined low EMI values from both transmitters, or combined maximum EMI values from both transmitters. Selection of ANT 1 is shown in FIG. 38. RF RECEIVER SELECT 681 enables the operator to select subsets corresponding to all receivers (SYSTEM) or individual receivers. Selection of EAST DF ONLY is shown in FIG. 39. EAST DF ONLY is an exemplary label denoting an individual receiver is selected. Other exemplary labels include SA, SF, PA and PF representing starboard/port forward/aft directions in the case of vessels, and NE, NW, SE, SW representing fixed orientations.

Figure 40:
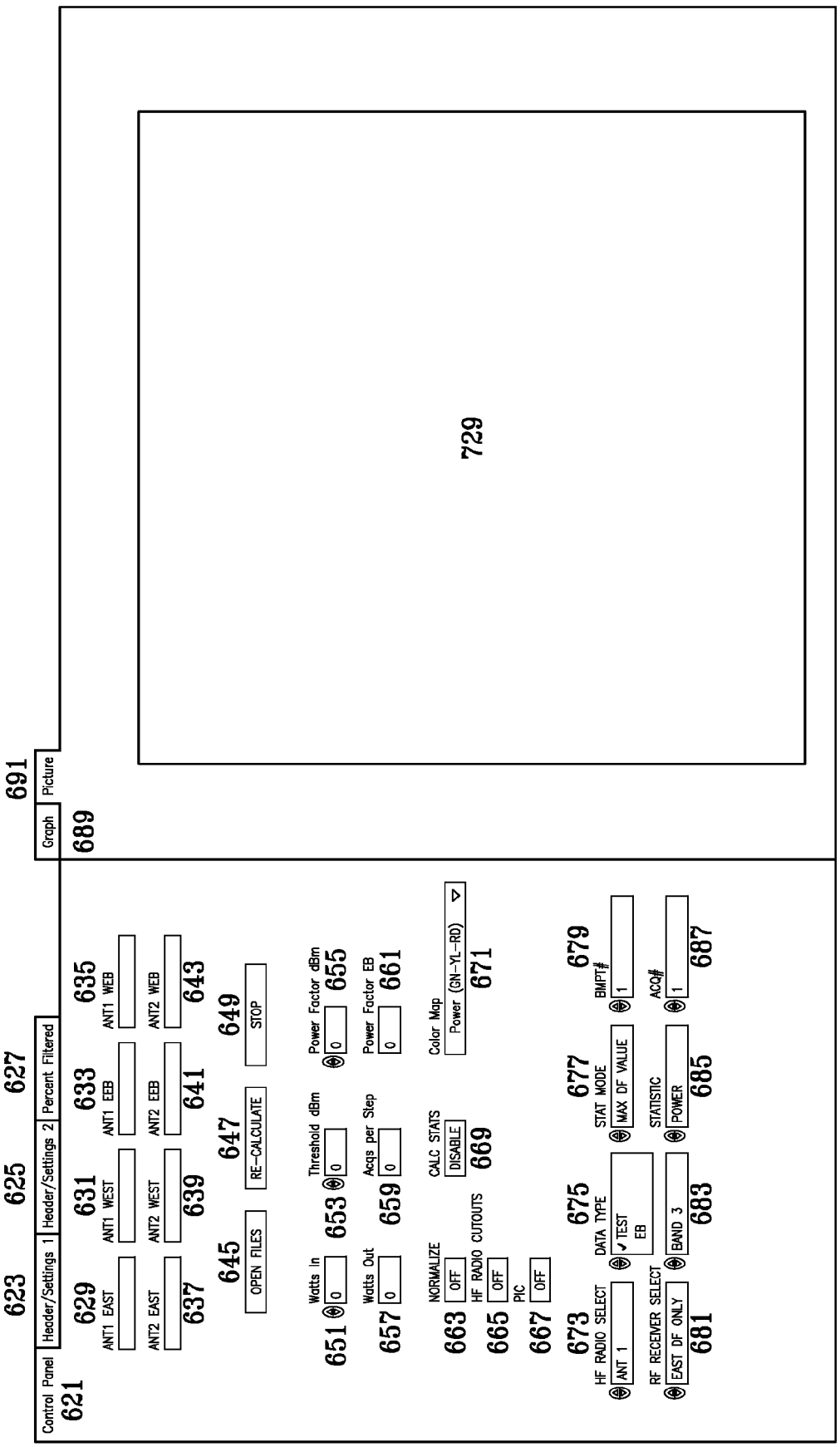
Figure 41:
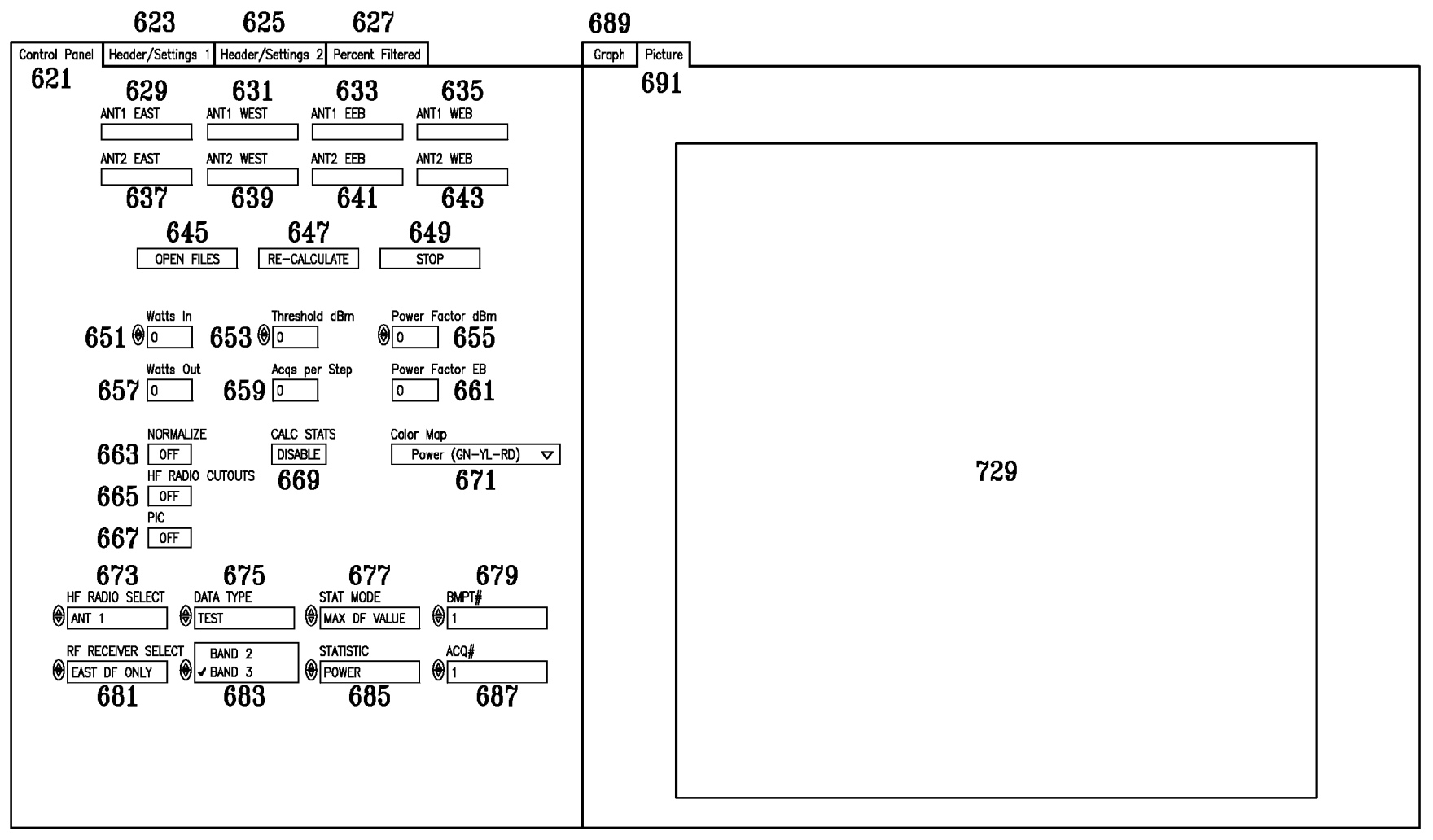

DATA TYPE 675 enables the operator to select subsets corresponding to test data with source antenna 261 activated or EB data. Selection of TEST data is shown in FIG. 40. BAND 683 enables the operator to select from a plurality of reception bands which a receiver may detect. Selection of BAND 3 is shown in FIG. 41. STAT MODE 677 enables the operator to select a subset of data for display based on the test modality, e.g. single acquisition or average of multiple acquisitions, maximum DF value, simultaneous DF receivers, and maximum number of DF receivers. DF is a label for a type of receiver and holds no particular meaning in relation to the invention. Selection of MAX DF VALUE is shown in FIG. 42. STATISTIC 685 enables the operator to select a statistic of the data for display. Selection of POWER, corresponding to the power level of a transmission from source antenna 261, is shown in FIG. 43.

FIG. 44 is a screen display of picture tab 691 displaying a data subset selected as described above with reference to FIGS. 38-43 in a polar coordinate graph. The graph includes a plurality of concentric elevation grid lines spaced in 10° intervals ranging from 0° to 90° and a plurality of radial azimuth grid lines spaced in 18° intervals ranging from 0° to 360°. EMI test data obtained from receiver EAST DF of ANT 1 receiving on BAND 3 is shown. As previously described, any subset of data may be presented in graphical form by selecting the appropriate parameters in control panel tab 621. Data obtained at each sample point may be displayed in color representing various intensity levels. Color Map 671 was selected therefore low intensity values are displayed in green, medium intensity is shown in yellow, and high intensity is shown in red in DPU1 or DPU2. In black and white, the screen display shows green as a white square, red as a black square, and yellow as a cross-hatched square. The graph shows that small amounts of EMI are generated when source antenna 261 transmits from an elevation below 40° at azimuth ranging between 72° to 360°. However, at an elevation between 20° and 30° at azimuth ranging between 36° and 54°, a number of consecutive high EMI values are shown.

FIG. 45 is a screen display of graph tab 689 displaying a data subset selected as described above with reference to FIGS. 38-43 in an orthogonal coordinate graph. The graph shows elevation on the vertical axis in 10° intervals ranging from 0° to 90° and azimuth on the horizontal axis in 18° intervals ranging from 0° to 360°. Data values obtained at each sample point are displayed in color representing various intensity levels. EMI with amplitude ranging between −40 and −50 dBm is displayed in green, amplitude ranging between −30 and −40 is shown in yellow, and amplitude ranging between −20 and −30 is shown in red in DPU1 or DPU2. In black and white, the screen display shows green as a white square, red as a black square, and yellow as a cross-hatched square. As before, the graph shows that small amounts of EMI are generated when source antenna 261 transmits from an elevation below 40° at an azimuth range between 72° to 360°. However, at an elevation between 20° and 30° at an azimuth range between 36° and 54°, a number of consecutive high EMI values are shown. The graphs also show no EMI at an azimuth range between 100° and 220°.

Report generation program 347 loads test data from test events and automatically creates a report document. Report generation functions are performed via a GUI in a manner similar to that shown above with reference to analysis program 343. All tasks performed by analysis program 343 may be reported. Templates may be used to create graphs and data may be exported via Microsoft word documents and Excel spreadsheets. A operator may create, access and store report templates While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A signal detection system for characterizing signals in a multiple signals environment comprising:
   a first plurality of non-transitory machine readable instructions stored on a first recording medium section comprising a first data processing portion adapted to output a first plurality of data including a plurality of transmission parameters adapted to control transmission of a first plurality of signals from a transmitter; and
   a second plurality of non-transitory machine readable instructions stored on a second recording medium section comprising a first signal processing portion adapted to receive a second plurality of signals and output a second plurality of data, said second plurality of signals corresponding to at least one of said first plurality of signals and a third plurality of signals, and said first signal processing portion including a predetermined value for detecting said second plurality of signals corresponding to said first plurality of signals and outputting said second plurality of data based on the power levels of said second plurality of signals corresponding to said first plurality of signals,
   wherein said first data processing portion receives said second plurality of data output from said first signal processing portion;
   wherein said first signal processing portion comprises an antenna hardware unit including:
   a second signal processing portion for outputting active signals and null signals based upon said power levels of said second plurality of signals corresponding to said first plurality of signals, wherein said active signals are relatively higher than said null signals by a first predetermined value;
   a third signal processing portion for detecting PSK modulated signals in said second plurality of signals, said third signal processing portion generating a third data determined based upon null signals per unit time, comparing said third data with a second predetermined value, and outputting a fourth data if said third data exceeds said second predetermined value; and
   a fourth signal processing portion for detecting PSK modulated signals in said secondary plurality of signals, said fourth signal processing portion generating a fifth data determined based upon said active signals, comparing said fifth data with a third predetermined value, and outputting a sixth data if said fifth data exceeds said third predetermined value,
   wherein said second plurality of data comprises at least one of said fourth data and said sixth data.

2. A signal detection system as in claim 1, wherein said first data processing portion combines said first plurality of data and said second plurality of data based on the time when said first plurality of signals was transmitted and said second plurality of signals was received.

3. A signal detection system as in claim 1, wherein said first data processing portion includes a first user interface adapted to receive a first plurality of configuration data and is further adapted to interact with a first processing sequence adapted to transmit said plurality of transmission parameters.

4. A signal detection system as in claim 3, wherein said first plurality of configuration data comprises radio frequency signal characteristics including at least one of power, transmitter attributes, receiver attributes, phase characteristics, location data, sampling signal data, filter data, antenna azimuth data, antenna elevation data, antenna movement data, receiver identifier, antenna interface card identifier, and sensitivity level.

5. A signal detection system as in claim 1, wherein said first data processing portion includes a second user interface adapted to interact with a second processing sequence adapted to receive said second plurality of data from said first signal processing portion.

6. A signal detection system as in claim 5, further including a second data processing portion adapted to pass data between said first data processing portion and said first signal processing portion.

7. A signal detection system as in claim 1, wherein said first data processing portion includes a memory and said first plurality of data and said second plurality data are stored in said memory.

8. A signal detection system as in claim 1, wherein said transmission parameters include transmitter orientation values and said first and second plurality of data represent a relationship between said second plurality of signals corresponding to said first plurality of signals and said transmitter orientation values.

9. A signal detection system as in claim 8, wherein said transmitter orientation values include altitude and azimuth values.

10. A signal detection system as in claim 8, further including a display device and a third processing sequence for representing said relationship in said display device.

11. A signal detection system as in claim 8, further including a plurality of category data based on the power levels of said second plurality of signals corresponding to said first plurality of signals and one or more iconic symbols selected to represent each of said category data.

12. A signal detection system as in claim 11, wherein each of said iconic symbols has a color representative of one of said category data.

13. A signal detection system as in claim 1, wherein said transmission parameters include a plurality of transmitter orientation values organized in a pattern.

14. A signal detection system as in claim 13, wherein said pattern is configured to change an orientation of said transmitter in a sequence of predetermined amounts.

15. A signal detection system as in claim 1, wherein said first predetermined value is determined based upon a power differential between transition states of said second plurality of signals.

16. A signal detection system as in claim 1, wherein said second predetermined value is determined based upon a relationship between active and null signals which is represented by a percentage of active signals over a sampling time period.

17. A signal detection system as in claim 16, wherein said percentage of active signals per unit time is set at a point at or between 70 to 95 percent.

18. A signal detection system as in claim 1, wherein said third predetermined value is determined based upon a state transition value which is characteristic of a specific modulation scheme.

19. A signal detection system as in claim 1, wherein said third and fifth data comprise a counter output.

20. A signal processing system as in claim 1, wherein said fourth and sixth data comprise a binary output.

21. A method for characterizing signals in a multiple signals environment comprising the steps of:
    outputting a first plurality of data including a plurality of transmission parameters that controls transmission of a first plurality of signals from a transmitter;
    receiving a second plurality of signals corresponding to at least one of said first plurality of signals and a third plurality of signals;
    detecting in said second plurality of signals said second plurality of signals corresponding to said first plurality of signals by comparing one or more characteristics of said second plurality of signals to one or more predetermined values;
    outputting a second plurality of data based on the power levels of said second plurality of signals corresponding to said first plurality of signals; and
    receiving said second plurality of data and associating said first plurality of data and said second plurality of data based on the time when said first plurality of signals was transmitted and said second plurality of signals was received;
    wherein said second plurality of signals comprise active signals and null signals where said active signals are relatively higher than said null signals by first predetermined value, and wherein said detecting step includes:
    outputting a third data determined based upon a number of null signals per unit time;
    comparing said third data with a second predetermined value and outputting a fourth data if said third data exceeds said second predetermined value;
    outputting a fifth data determined based upon a number of active signals per unit time; and
    comparing said fifth data with a third predetermined value and outputting a sixth data if said fifth data exceeds said third predetermined value.

22. A method of signal processing as in claim 21, wherein said first predetermined value is determined based upon a power differential between transition states of said second plurality of signals.

23. A method of signal processing as in claim 21, wherein said second predetermined value is determined based upon a relationship between active and null signals which is represented by a percentage of active signals per unit time.

24. A method of signal processing as in claim 23, wherein said percentage of active signals per unit time is set within a range from 70 to 95 percent.

25. A method of signal processing as in claim 21, wherein said third predetermined value is determined based upon a state transition value which is characteristic of a specific modulation scheme.

26. A method of signal processing as in claim 21, wherein said third and fifth data is a counter output.

27. A method of signal processing as in claim 21, wherein said fourth and sixth data comprise a binary output.

28. A method as in claim 21, wherein said transmission parameters include transmitter orientation values and said first and second plurality of data represent a relationship between said second plurality of signals corresponding to said first plurality of signals and said transmitter orientation values.

29. A method as in claim 28, wherein said transmitter orientation values include altitude and azimuth values.

30. A method as in claim 28, further including the step of representing said relationship in said display device.

\* \* \* \* \*